(12) United States Patent
Fujitomi et al.

(10) Patent No.: US 9,971,980 B2
(45) Date of Patent: May 15, 2018

(54) STANDARD WORK TIME UPDATING METHOD AND SYSTEM

(75) Inventors: Yosuke Fujitomi, Tokyo (JP); Ichiro Saito, Tokyo (JP); Shigemi Yamane, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 1238 days.

(21) Appl. No.: 13/822,868

(22) PCT Filed: Sep. 28, 2011

(86) PCT No.: PCT/JP2011/072140
§ 371 (c)(1),
(2), (4) Date: May 6, 2013

(87) PCT Pub. No.: WO2012/043605
PCT Pub. Date: Apr. 5, 2012

(65) Prior Publication Data
US 2013/0238381 A1  Sep. 12, 2013

(30) Foreign Application Priority Data

Sep. 30, 2010  (JP) ................................ 2010-220847

(51) Int. Cl.
*G06Q 10/06*  (2012.01)
*G06Q 50/04*  (2012.01)

(52) U.S. Cl.
CPC ....... *G06Q 10/06315* (2013.01); *G06Q 10/06* (2013.01); *G06Q 50/04* (2013.01);
(Continued)

(58) Field of Classification Search
CPC ............ G06Q 10/06; G06Q 10/06315; G06Q 10/06312; G06Q 50/04; G06Q 10/06398; Y02P 90/30
(Continued)

(56) References Cited

U.S. PATENT DOCUMENTS

2005/0055287 A1* 3/2005 Schmidtberg .......... G06Q 10/06
                                                           705/28
2005/0103354 A1* 5/2005 Miyauchi ............... A61B 6/032
                                                           128/898
(Continued)

FOREIGN PATENT DOCUMENTS

JP       11-72583      3/1999
JP       2985998       12/1999
(Continued)

OTHER PUBLICATIONS

Development of computerized tool for establishing the standard operation time schedule for power engineering works. Tung-Meng Chang; Chung-Hsiung Lan; Chien-Liang Wang. Monthly Journal of Taipower's Engineering 637: 139-44. Taiwan Power Co. (Sep. 2001). Abstract.*

(Continued)

*Primary Examiner* — Timothy Padot
(74) *Attorney, Agent, or Firm* — Wenderoth, Lind & Ponack, L.L.P.

(57) ABSTRACT

The purpose of the invention is to provide a standard work time updating method and system in which a work time is declared by a worker without requiring an observer or the like and the reliability of the updated data of standard work time can be prevented from being degraded due to a worker's false or erroneous declaration. To achieve this purpose, for example, the standard work time updating system is configured as follows. When a reliability determination unit (24) determines that a work time required for work and declared by a worker is not departed from a predetermined range in the work time data distribution of the work stored in a database, a standard work time for the work is updated to a standard work time calculated from the declared work time, and otherwise, the standard work time is not updated. In addition, when it is determined that a work area estimated (Continued)

by a work area estimation unit (23) matches a work area declared by a worker, a standard work time for the work is updated to the calculated standard work time, and otherwise, the standard work time is not updated.

8 Claims, 13 Drawing Sheets

(52) U.S. Cl.
CPC .. *G06Q 10/06312* (2013.01); *G06Q 10/06398* (2013.01); *Y02P 90/30* (2015.11)

(58) Field of Classification Search
USPC .............................................. 705/7.25, 7.42
See application file for complete search history.

(56) References Cited

U.S. PATENT DOCUMENTS

| | | | | |
|---|---|---|---|---|
| 2006/0048016 | A1* | 3/2006 | Reindler | G06Q 10/06 714/47.1 |
| 2008/0071609 | A1* | 3/2008 | Yanase | G06Q 10/06398 705/7.42 |
| 2009/0292581 | A1* | 11/2009 | Omiya | G06Q 10/06 705/7.14 |
| 2011/0276162 | A1* | 11/2011 | Nonaka | G06Q 10/109 700/100 |

FOREIGN PATENT DOCUMENTS

| | | |
|---|---|---|
| JP | 2001-195173 | 7/2001 |
| JP | 2006-302096 | 11/2006 |
| JP | 2010-61519 | 3/2010 |

OTHER PUBLICATIONS

Personnel tracking on construction sites using video cameras. J. Teizer and P.A. Vela. Advanced Engineering Informatics. 23 (2009) 452-462.*

International Search Report dated Dec. 20, 2011 in International (PCT) Application No. PCT/JP2011/072140.

International Preliminary Report on Patentability and Written Opinion of the International Searching Authority dated Apr. 18, 2013 in International (PCT) Application No. PCT/JP2011/072140.

* cited by examiner

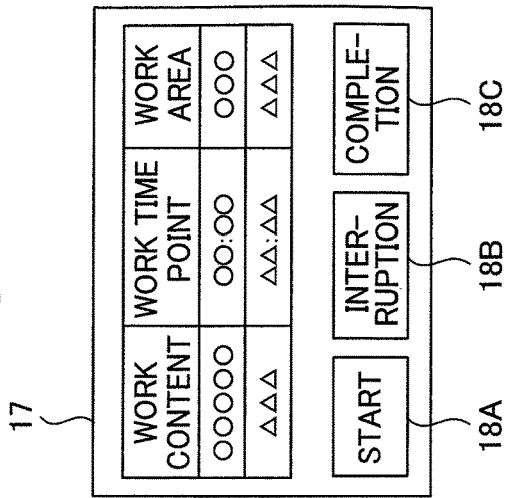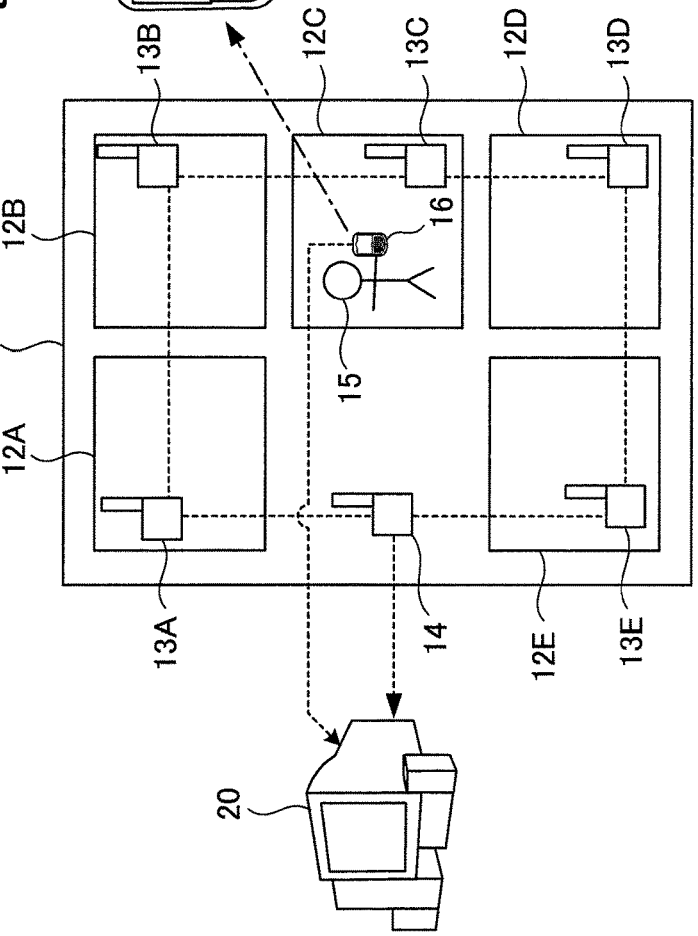

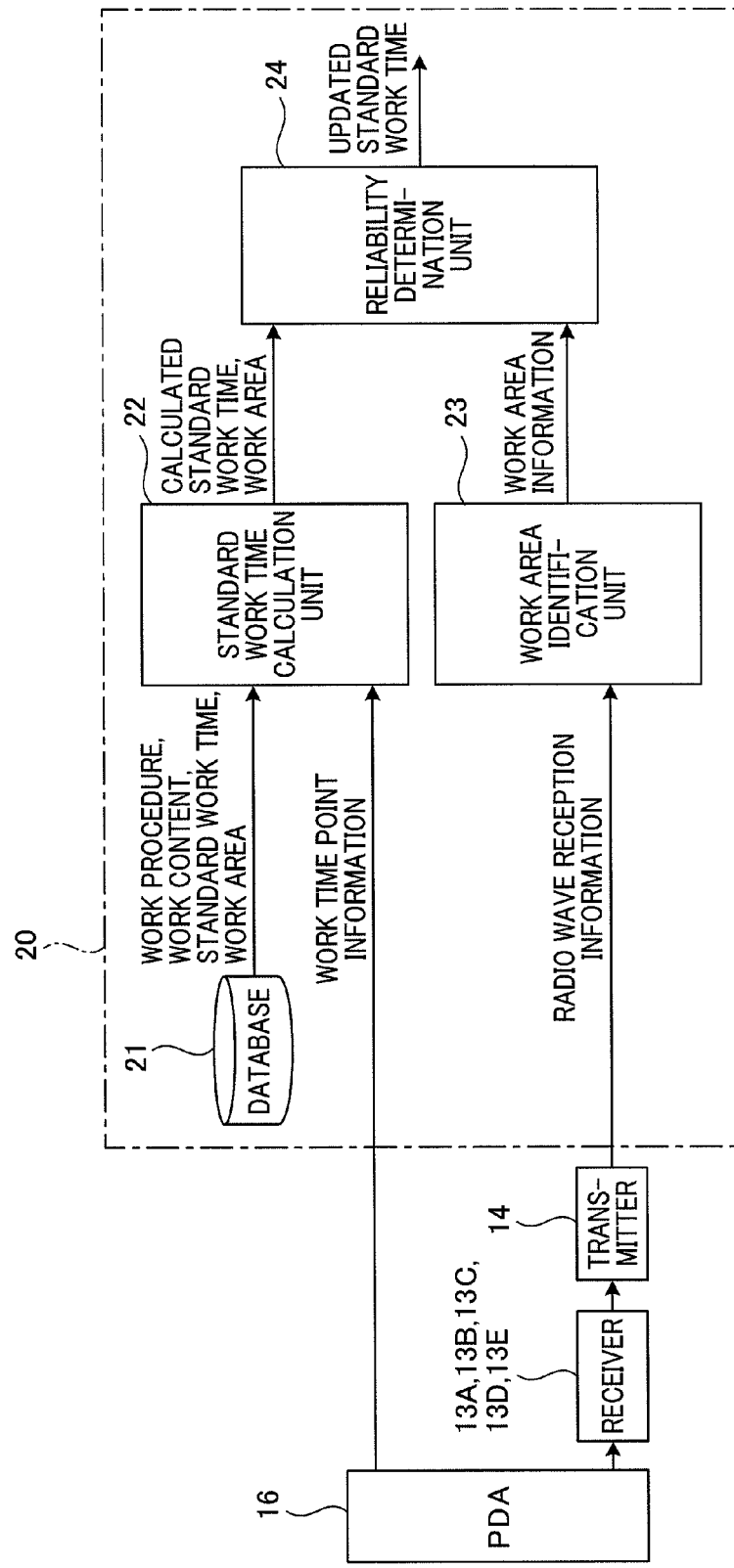

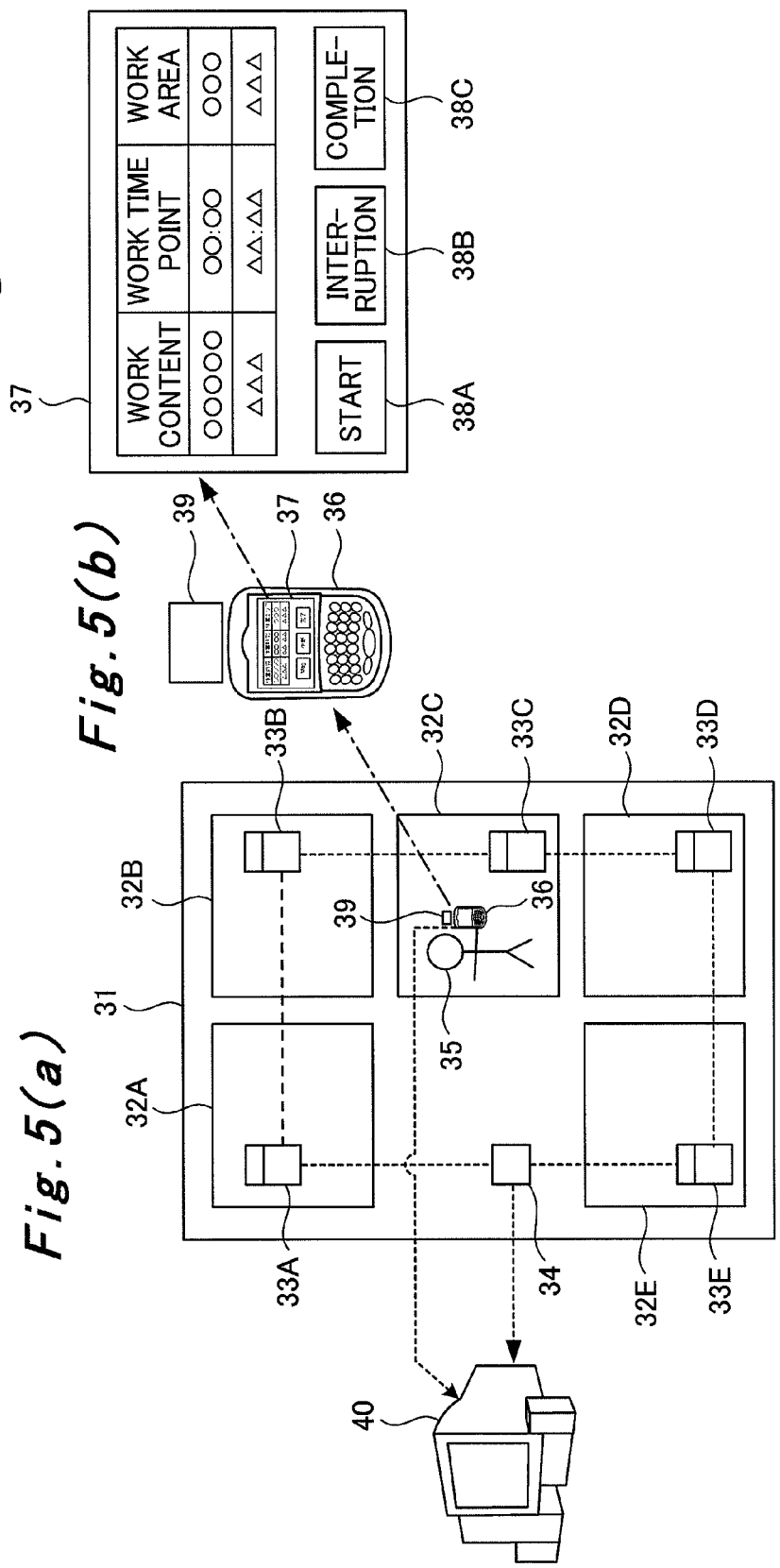

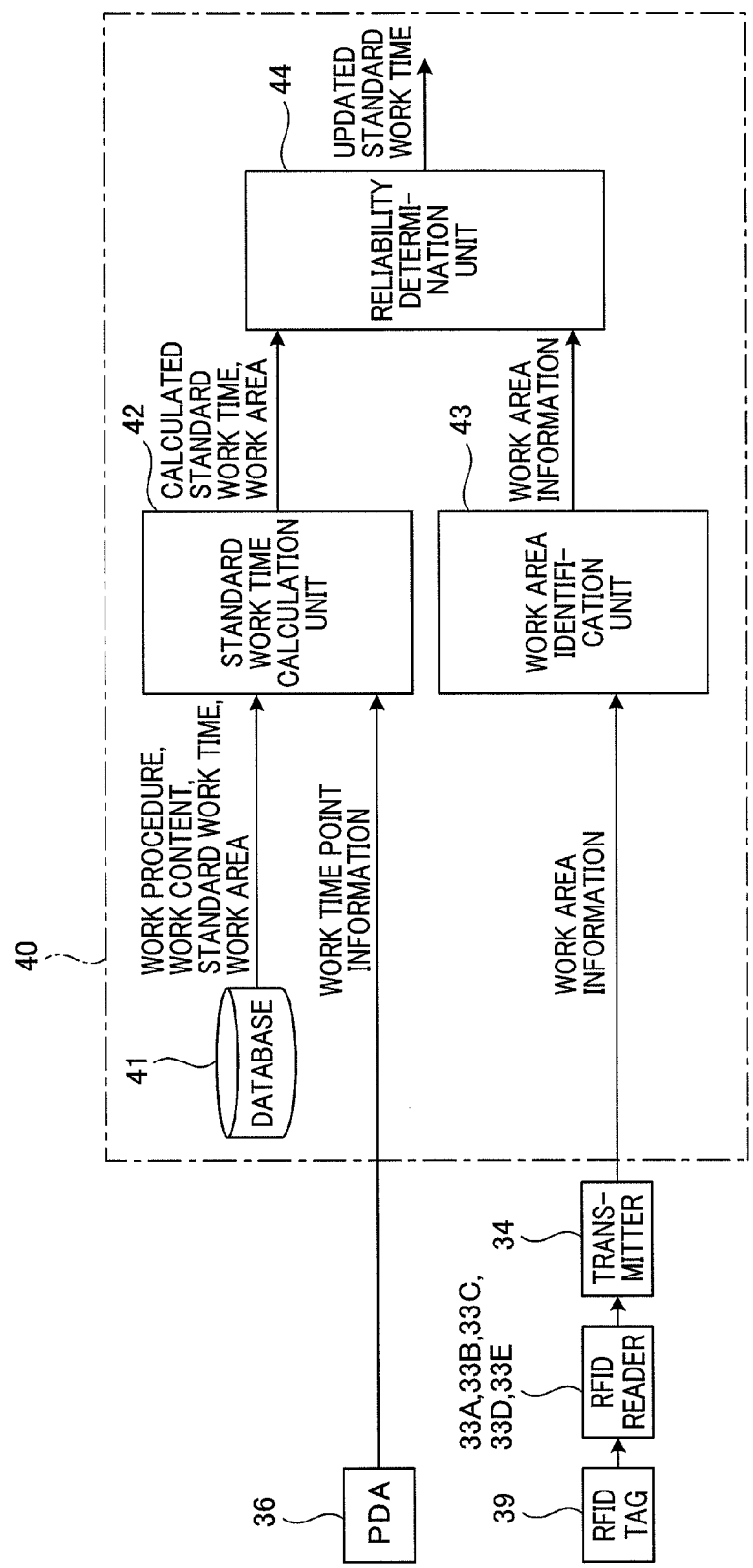

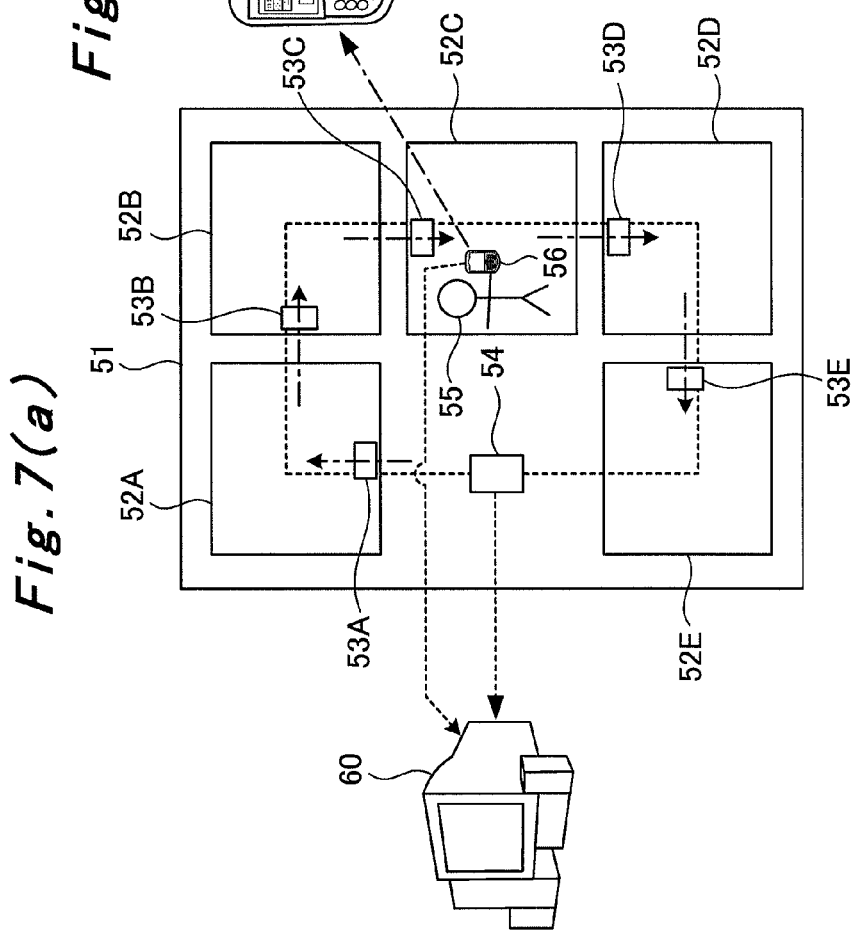
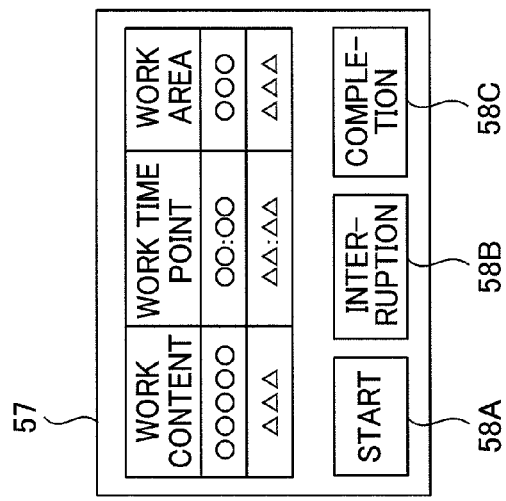

STANDARD WORK TIME UPDATING METHOD AND SYSTEM

TECHNICAL FIELD

The present invention relates to a standard work time updating method and a standard work time updating system for updating standard work times of workers.

BACKGROUND ART

In assembly work of a product such as an aircraft or a ship, work (for example, assembly work of a main wing of an aircraft and the like) performed by the workers is analyzed and classified into multiple work contents (for example, drilling work, screwing work, and the like). Standard work times are then determined for the respective work contents and work processes are thereby managed.

When the workers become skilled in the work, they can perform work in a shorter time. Moreover, there is a difference in work time depending on the skills of the workers. Accordingly, the standard work times of the respective work contents need to be updated each time the work is performed. Conventionally, there are the following two types of methods for updating the standard work times of the respective work contents.

The first method is a method for updating the standard work times of the respective work contents on the basis of work times of the work contents which are recorded by an observer or a classifier different from the workers. Specifically, the observer beside the workers observes work states of the workers and thereby measures and records the work times of the work contents by using a stopwatch or the like. Alternatively, the work of the workers is recorded by a camera or the like. Thereafter, the classifier analyzes the recorded work, classifies the recorded work into multiple work contents, and records the work times of the work contents. The standard work times of the respective work contents are then updated based on the work times of the work contents recorded by the observer or the classifier.

The second method is a method for updating the standard work times of the respective work contents on the basis of the work times of the work contents which are declared by the workers. Specifically, in a work process having predetermined work contents and work procedures thereof (the execution order of the work contents), each of the workers classifies the work contents while performing the work and records and declares the work times of the respective work contents by using a stopwatch, a PDA (Personal Digital Assistant) being a mobile information terminal, and the like. The standard work times of the respective work contents are then updated based on the declared work times of the work contents.

A conventional standard work time updating system using a stopwatch is described based on FIGS. 15 and 16. Part (a) of FIG. 15 is a configuration diagram of the conventional standard work time updating system, Part (b) of FIG. 15 is an enlarged view of the stopwatch, and Part (c) of FIG. 15 is an enlarged view of a display screen of the stopwatch. Moreover, FIG. 16 is a block diagram of the conventional standard work time updating system.

As shown in Part (a) of FIG. 15, an inside of an assembly station 1 in which assembly work of a product such as an aircraft or a ship is performed is divided into multiple (four in the illustrated example) work areas 2A, 2B, 2C, 2D, and 2E for respective multiple work contents. Workers 8 perform work of the work contents in the work areas 2A to 2E. At this time, in the work areas 2A to 2E, each of the workers 8 operates a stopwatch 3 carried by the worker 8 to record work time points (work start time point and work completion time point) of the work contents in a storage device included in the stopwatch 3 and thereby declares the work time points. As shown in Parts (b) and (c) of FIG. 15, the work content and the work time point (work start time point and work completion time point) are displayed in a display screen 4 of the stopwatch 3.

As shown in Parts (a) to (c) of FIG. 15 and FIG. 16, the work time points (work start time point and work completion time point) of the work contents which are recorded by using the stopwatch 3 are transmitted to a work time management server (personal computer) 5. The work time management server 5 includes a storage unit 6 in which the work procedures, the work contents, the standard work times, and the work areas are stored as a database and a standard work time calculation unit 7.

The standard work time calculation unit 7 obtains the work times (work completion time point−work start time point) of the work contents from the work time points (work start time point and work completion time point) of the work contents inputted from the stopwatches 3 of the workers 8, calculates an average value or the like of the work times for each of the work contents, and sets the calculated value as the standard work time of the work content. Then, when the calculated standard work times of the work contents are shorter than the standard work times of the work contents which are stored in the storage unit 7 as the database, the standard work time calculation unit 7 updates the standard work times of the work contents to the standard work contents of the work contents which are calculated by the standard work time calculation unit 7 and outputs the updated standard work times.

The Patent Document 1 listed below is given as an example of a prior art document disclosing a technique in which the workers each measure the work times of the respective work contents by using the stopwatch.

PRIOR ART DOCUMENT

Patent Document

Patent Document 1: Japanese Patent Application Publication No. Hei 11-72583

SUMMARY OF THE INVENTION

Problems to be Solved by the Invention

The first method out of the two types of methods for updating the standard work times of the respective work contents has such a disadvantage that the observer or the classifier different from the workers is required to update the standard work times.

On the contrary, the second method requires no observer or classifier. However, the second method has such a problem that, when the worker 8 makes a false or erroneous declaration upon declaring the work time point by using the stopwatch or the PDA, this declaration cannot be found out.

In view of the circumstances described above, an object of the present invention is to provide a standard work time updating method and a standard wok time updating system in which workers make declarations without an observer or a classifier and in which, even when the workers make a false or erroneous declaration, deterioration in reliability of update data of standard work times which is caused by declaration data of a work time having a low reliability is prevented by finding out the false or erroneous declaration.

Means for Solving the Problems

A standard work time updating method, according to a first aspect of the invention for solving the above problem, in which workers declare work time points of a work content performed by the workers in a work area in a station by using declaring means and a standard work time of the work content is updated based on work times obtained from the work time points of the work content which are declared by the workers, is characterized in that the method comprises causing reliability determination means to determine whether the work times obtained from the work time points of the work content which are declared by the workers each deviate from a predetermined range in a distribution of work time data of the work content which is stored in a database, when determining that none of the work times deviate from the predetermined range, the reliability determination means updates the standard work time of the work content to the standard work time calculated based on the work times obtained from the work time points of the work content which are declared by the workers, and when determining that any of the work times deviates from the predetermined range, the reliability determination means does not update the standard work time of the work content.

A standard work time updating method, according to a second aspect of the invention, in which workers declare work time points of a work content performed by the workers in a work area in a station by using declaring means and a standard work time of the work content is updated based on work times obtained from the work time points of the work content which are declared by the workers, is characterized in that the method comprises causing reliability determination means to determine whether the work times obtained from the work time points of the work content which are declared by the workers each deviate from a predetermined range in a distribution of work time data of the work content which is stored in a database, when determining that none of the work times deviate from the predetermined range, the reliability determination means updates the standard work time of the work content to the standard work time calculated based on the work times obtained from the work time points of the work content which are declared by the workers, and when determining that any of the work times deviates from the predetermined range, the reliability determination means updates the standard work time of the work content to the standard work time calculated based on the work times obtained from the work time points of the work content which are declared by the workers, exclusive of the work time determined to deviate from the predetermined range.

A standard work time updating method, according to a third aspect of the invention, in which workers declare work time points of a work content performed by the workers in a work area in a station by using declaring means and a standard work time of the work content is updated based on work times obtained from the work time points of the work content which are declared by the workers, is characterized in that the method comprises causing reliability determination means to determine whether the work times obtained from the work time points of the work content which are declared by the workers each exceed a predetermined value in a distribution of work time data of the work content which is stored in a database, when determining that none of the work times exceed the predetermined value, the reliability determination means updates the standard work time of the work content to the standard work time calculated based on the work times obtained from the work time points of the work content which are declared by the workers, and when determining that any of the work times exceeds the predetermined value, the reliability determination means does not update the standard work time of the work content.

A standard work time updating method, according to a fourth aspect of the invention, in which workers declare work time points of a work content performed by the workers in a work area in a station by using declaring means and a standard work time of the work content is updated based on work times obtained from the work time points of the work content which are declared by the workers, is characterized in that the method comprises causing reliability determination means to determine whether the work times obtained from the work time points of the work content which are declared by the workers each exceed a predetermined value in a distribution of work time data of the work content which is stored in a database, when determining that none of the work times exceed the predetermined value, the reliability determination means updates the standard work time of the work content to the standard work time calculated based on the work times obtained from the work time points of the work content which are declared by the workers, and when determining that any of the work times exceeds the predetermined value, the reliability determination means updates the standard work time of the work content to the standard work time calculated based on the work times obtained from the work time points of the work content which are declared by the workers, exclusive of the work time determined to exceed the predetermined value.

A standard work time updating method, according to a fifth aspect of the invention, in which workers declare work time points of a work content performed by the workers in a work area in a station by using declaring means and a standard work time of the work content is updated based on work times obtained from the work time points of the work content which are declared by the workers, is characterized in that the method comprises:

calculating a standard work time on the basis of the work times obtained from the work time points of the work content which are declared by the workers and the work times of the work content which are stored in a database; and updating the standard work time of the work content to the calculated standard work time.

A standard work time updating method, according to a sixth aspect of the invention, in which workers declare work time points of a work content performed by the workers in work areas in a station by using declaring means and a standard work time of the work content is updated based on work times obtained from the work time points of the work content which are declared by the workers, is characterized in that the method comprises:
    causing work area identification means to identify in which one of the work areas each of the workers exists; and
    causing reliability determination means to determine whether identified work areas identified by the work area identification means coincide with declared work areas declared by the workers by use of the declaring means, when determining that the identified areas coincide with the declared work areas, the reliability determination means updates the standard work time of the work content to the standard work time calculated based on the work times obtained from the work time points of the work content which are declared by the workers, and when determining that any of the identified work areas does not coincide with a corresponding one of the declared work areas, the reliability determination means does not update the standard work time of the work content.

A standard work time updating method, according to a seventh aspect of the invention, in which workers declare work time points of a work content performed by the workers in work areas in a station by using declaring means and a standard work time of the work content is updated based on work times obtained from the work time points of the work content which are declared by the workers, is characterized in that the method comprises:
causing work area identification means to identify in which one of the work areas each of the workers exists; and
causing reliability determination means to determine whether identified work areas identified by the work area identification means coincide with declared work areas declared by the workers by use of the declaring means,
when determining that the identified areas coincide with the declared work areas, the reliability determination means updates the standard work time of the work content to the standard work time calculated based on the work times obtained from the work time points of the work content which are declared by the workers, and
when determining that any of the identified work areas does not coincide with a corresponding one of the declared work areas, the reliability determination means updates the standard work time of the work content to the standard work time calculated based on the work times obtained from the work time points of the work content which are declared by the workers, exclusive of the work time for which the identified work area does not coincide with the declared work area.

A standard work time updating method according to an eighth aspect of the invention is characterized in that, in the sixth or seventh aspect of the invention of the standard work time updating method, the work area identification means includes:

receivers provided in multiple spots in the station and configured to receive radio waves transmitted from the declaring means; and a work area identification unit configured to identify in which one of the work areas each of the workers exists on the basis of radio wave reception information from the receivers.

A standard work time updating method according to a ninth aspect of the invention is characterized in that, in the sixth or seventh aspect of the invention of the standard work time updating method, the work area identification means includes:

RFID tags provided in the declaring means;

RFID readers installed in the work areas and configured to read records of the RFID tags and transmit work area information; and a work area identification unit configured to identify in which one of the work areas each of the workers exists on the basis of the work area information transmitted from the RFID readers.

A standard work time updating method according to a tenth aspect of the invention is characterized in that, in the sixth or seventh aspect of the invention of the standard work time updating method, the work area identification means includes:

photoelectric sensors installed at entrances of the work areas and configured to detect the workers entering the work areas; and a work area identification unit configured to identify in which one of the work areas each of the workers exists on the basis of worker detection information from the photoelectric sensors.

A standard work time updating method, according to an eleventh aspect of the invention, in which workers declare work time points of a work content performed by the workers in work areas in a station by using declaring means and a standard work time of the work content is updated based on work times obtained from the work time points of the work content which are declared by the workers, characterized in that the method comprises:
causing work content identification means to identify the work content performed by each of the workers; and
causing reliability determination means to determine whether an identified work content identified by the work content identification means coincides with a declared work content declared by the worker by use of the declaring means,
when determining that the identified work content coincides with the declared work content, the reliability determination means updates the standard work time of the work content to the standard work time calculated based on the work times obtained from the work time points of the work content which are declared by the workers, and
when determining that the identified work content does not coincide with the declared work content, the reliability determination means does not update the standard work time of the work content.

A standard work time updating method, according to a twelfth aspect of the invention, in which workers declare work time points of a work content performed by the workers in work areas in a station by using declaring means and a standard work time of the work content is updated based on work times obtained from the work time points of the work content which are declared by the workers, characterized in that the method comprises:
causing work content identification means to identify the work content performed by each of the workers; and
causing reliability determination means to determine whether an identified work content identified by the work content identification means coincides with a declared work content declared by the worker by use of the declaring means,
when determining that the identified work content coincides with the declared work content, the reliability determination means updates the standard work time of the work content to the standard work time calculated based on the work times obtained from the work time points of the work content which are declared by the workers, and when determining that the identified work content does not coincide with the declared work content, the reliability determination means updates the standard work time of the work content to the standard work time calculated based on the work times obtained from the work time points of the work content which are declared by the workers, exclusive of the work time for which the identified work content does not coincide with the declared work content.

A standard work time updating method according to a thirteenth aspect of the invention is characterized in that, in the eleventh or twelfth aspect of the invention of the standard work time updating method, the work content identification means includes:

work tool usage information acquisition means for acquiring work tool usage information by detecting work tools used by the workers; and a work area identification unit configured to identify the work content performed by each of the workers on the basis of the work tool usage information from the work tool usage information acquisition means.

A standard work time updating method according to a fourteenth aspect of the invention is characterized in that, in the thirteenth aspect of the invention of the standard work time updating method, the work tool usage information acquisition means is photoelectric sensors which are installed in work tool tables installed in the work areas to be capable of detecting the work tools placed on the work tool tables and which are configured to transmit OFF signals as the work tool usage information, the OFF signals obtained when the work tools are picked up from the work tool tables by the workers.

A standard work time updating method according to a fifteenth aspect of the invention is characterized in that, in the thirteenth aspect of the invention of the standard work time updating method, the work tool usage information acquisition means is electric power meters configured to measure power consumptions of the work tools and transmit measured signals of the power consumptions as the work tool usage information.

A standard work time updating method according to a sixteenth aspect of the invention is characterized in that, in the thirteenth aspect of the invention of the standard work time updating method, the work tool usage information acquisition means includes:

cameras installed to be capable of capturing images of the work tools on work tool tables installed in the work areas; and image processing means for determining whether the work tools have disappeared from the work tool tables by performing image processing on the images captured by the cameras and for obtaining the work tool usage information by determining whether the work tools have disappeared from the work tool tables.

A standard work time updating method according to a seventeenth aspect of the invention is characterized in that, in the thirteenth aspect of the invention of the standard work time updating method, the work tool usage information acquisition means includes:

RFID tags provided in the work tools; and

RFID readers configured to read records in the RFID tags and transmit the read records as the work tool usage information.

A standard work time updating method according to an eighteenth aspect of the invention is characterized in that, in the thirteenth aspect of the invention of the standard work time updating method, the work tool usage information acquisition means is piezoelectric sensors provided in work tool tables installed in the work areas in such a way that loads of the work tools act on the piezoelectric sensors when the work tools are placed on the work tool tables, the piezoelectric sensors configured to detect that the work tools are picked up from the work tool tables by the workers and transmit work tool detection signals as the work tool usage information.

A standard work time updating method, according to a nineteenth aspect of the invention, in which workers declare work time points of a work content performed by the workers in work areas in a station by using declaring means and a standard work time of the work content is updated based on work times obtained from the work time points of the work content which are declared by the workers, characterized in that the method comprises:

causing a plurality of reliability determination means to determine whether the work times obtained from the work time points of the work content which are declared by the workers are reliable;

calculating the standard work time by performing weighted average calculation on an average value of the work times subjected to reliability determination by the plurality of reliability determination means; and updating the standard work time of the work content to the calculated standard work time, and when any of the work times is determined to be unreliable by any of the plurality of reliability determination means, the weighted average calculation is performed with a weighting factor set to 0, the weighting factor being one for the average value of the work times subjected to the reliability determination by the any reliability determination means.

A standard work time updating method according to a twentieth aspect of the invention is characterized in that, in the nineteenth aspect of the invention of the standard work time updating method, the plurality of reliability determination means are a plurality of reliability determination means selected from:

first reliability determination means for determining whether the work times obtained from the work time points of the work content which are declared by the workers each deviate from a predetermined range in a distribution of work time data of the work content which is stored in a database;

second reliability determination means for determining whether the work times obtained from the work time points of the work content which are declared by the workers each exceed a predetermined value in a distribution of work time data of the work content which is stored in the database;

third reliability determination means for determining whether identified work areas which are identified by work area identification means and in which the workers exist coincide with declared work areas declared by the workers by use of the declaring means; and fourth reliability determination means for determining whether an identified work content identified by the work content identification means and performed by the workers coincides with a declared work content declared by the workers by use of the declaring means.

A standard work time updating system, according to a twenty-first aspect of the invention, in which workers declare work time points of a work content performed by the workers in a work area in a station by using declaring means and a standard work time of the work content is updated based on work times obtained from the work time points of the work content which are declared by the workers, is characterized in that the system comprises reliability determination means for determining whether the work times obtained from the work time points of the work content which are declared by the workers each deviate from a predetermined range in a distribution of work time data of the work content which is stored in a database, when determining that none of the work times deviate from the predetermined range, the reliability determination means updates the standard work time of the work content to the standard work time calculated based on the work times obtained from the work time points of the work content which are declared by the workers, and when determining that any of the work times deviates from the predetermined range, the reliability determination means does not update the standard work time of the work content.

A standard work time updating system, according to a twenty-second aspect of the invention, in which workers declare work time points of a work content performed by the workers in a work area in a station by using declaring means and a standard work time of the work content is updated based on work times obtained from the work time points of the work content which are declared by the workers, is characterized in that the system comprises reliability determination means for determining whether the work times obtained from the work time points of the work content which are declared by the workers each deviate from a predetermined range in a distribution of work time data of the work content which is stored in a database, when determining that none of the work times deviate from the predetermined range, the reliability determination means updates the standard work time of the work content to the standard work time calculated based on the work times obtained from the work time points of the work content which are declared by the workers, and when determining that any of the work times deviates from the predetermined range, the reliability determination means updates the standard work time of the work content to the standard work time calculated based on the work times obtained from the work time points of the work content which are declared by the workers, exclusive of the work time determined to deviate from the predetermined range.

A standard work time updating system, according to a twenty-third aspect of the invention, in which workers declare work time points of a work content performed by the workers in a work area in a station by using declaring means and a standard work time of the work content is updated based on work times obtained from the work time points of the work content which are declared by the workers, is characterized in that the system comprises reliability determination means for determining whether the work times obtained from the work time points of the work content which are declared by the workers each exceed a predetermined value in a distribution of work time data of the work content which is stored in a database, when determining that none of the work times exceed the predetermined value, the reliability determination means updates the standard work time of the work content to the standard work time calculated based on the work times obtained from the work time points of the work content which are declared by the workers, and when determining that any of the work times exceeds the predetermined value, the reliability determination means does not update the standard work time of the work content.

A standard work time updating system, according to a twenty-fourth aspect of the invention, in which workers declare work time points of a work content performed by the workers in a work area in a station by using declaring means and a standard work time of the work content is updated based on work times obtained from the work time points of the work content which are declared by the workers, is characterized in that the system comprises reliability determination means for determining whether the work times obtained from the work time points of the work content which are declared by the workers each exceed a predetermined value in a distribution of work time data of the work content which is stored in a database, when determining that none of the work times exceed the predetermined value, the reliability determination means updates the standard work time of the work content to the standard work time calculated based on the work times obtained from the work time points of the work content which are declared by the workers, and when determining that any of the work times exceeds the predetermined value, the reliability determination means updates the standard work time of the work content to the standard work time calculated based on the work times obtained from the work time points of the work content which are declared by the workers, exclusive of the work time determined to be exceeding the predetermined value.

A standard work time updating system, according to a twenty-fifth aspect of the invention, in which workers declare work time points of a work content performed by the workers in a work area in a station by using declaring means and a standard work time of the work content is updated based on work times obtained from the work time points of the work content which are declared by the workers, is characterized in that the system comprises update processing means for calculating a standard work time on the basis of the work times obtained from the work time points of the work content which are declared by the workers and the work times of the work content which are stored in a database, and thereby updating the standard work time of the work content to the calculated standard work time.

A standard work time updating system, according to a twenty-sixth aspect of the invention, in which workers declare work time points of a work content performed by the workers in work areas in a station by using declaring means and a standard work time of the work content is updated based on work times obtained from the work time points of the work content which are declared by the workers, is characterized in that the system comprises:
    work area identification means for identifying in which one of the work areas each of the workers exists; and
    reliability determination means for determining whether identified work areas identified by the work area identification means coincide with declared work areas declared by the workers by use of the declaring means, when determining that the identified areas coincide with the declared work areas, the reliability determination means updates the standard work time of the work content to the standard work time calculated based on the work times obtained from the work time points of the work content which are declared by the workers, and when determining that any of the identified work areas does not coincide with a corresponding one of the declared work areas, the reliability determination means does not update the standard work time of the work content.

A standard work time updating system, according to a twenty-seventh aspect of the invention, in which workers declare work time points of a work content performed by the workers in work areas in a station by using declaring means and a standard work time of the work content is updated based on work times obtained from the work time points of the work content which are declared by the workers, is characterized in that the system comprises:
work area identification means for identifying in which one of the work areas each of the workers exists; and
reliability determination means for determining whether identified work areas identified by the work area identification means coincide with declared work areas declared by the workers by use of the declaring means, when determining that the identified areas coincide with the declared work areas, the reliability determination means updates the standard work time of the work content to the standard work time calculated based on the work times obtained from the work time points of the work content which are declared by the workers, and when determining that any of the identified work areas does not coincide with a corresponding one of the declared work areas, the reliability determination means updates the standard work time of the work content to the standard work time calculated based on the work times obtained from the work time points of the work content which are declared by the workers, exclusive of the work time for which the identified work area does not coincide with the declared work area.

A standard work time updating system according to a twenty-eighth aspect of the invention is characterized in that, in the twenty-sixth or twenty-seventh aspect of the invention of the standard work time updating method, the work area identification means includes:
receivers provided in multiple spots in the station and configured to receive radio waves transmitted from the declaring means; and
a work area identification unit configured to identify in which one of the work areas each of the workers exists on the basis of radio wave reception information from the receivers.

A standard work time updating system according to a twenty-ninth aspect of the invention is characterized in that, in the twenty-sixth or twenty-seventh aspect of the invention of the standard work time updating method, the work area identification means includes:
RFID tags provided in the declaring means;
RFID readers installed in the work areas and configured to read records of the RFID tags and transmit work area information; and a work area identification unit configured to identify in which one of the work areas each of the workers exists on the basis of the work area information transmitted from the RFID readers.

A standard work time updating system according to a thirtieth aspect of the invention is characterized in that, in the twenty-sixth or twenty-seventh aspect of the invention of the standard work time updating method, the work area identification means includes:
photoelectric sensors installed at entrances of the work areas and configured to detect the workers entering the work areas; and
a work area identification unit configured to identify in which one of the work areas each the workers exists on the basis of worker detection information from the photoelectric sensors.

A standard work time updating system, according to a thirty-first aspect of the invention, in which workers declare work time points of a work content performed by the workers in work areas in a station by using declaring means and a standard work time of the work content is updated based on work times obtained from the work time points of the work content which are declared by the workers, characterized in that the system comprises:
causing work content identification means to identify the work content performed by each of the workers; and
causing reliability determination means to determine whether an identified work content identified by the work content identification means coincides with a declared work content declared by the worker by use of the declaring means, when determining that the identified work content coincides with the declared work content, the reliability determination means updates the standard work time of the work content to the standard work time calculated based on the work times obtained from the work time points of the work content which are declared by the workers, and when determining that the identified work content does not coincide with the declared work content, the reliability determination means does not update the standard work time of the work content.

A standard work time updating system, according to a thirty-second aspect of the invention, in which workers declare work time points of a work content performed by the workers in work areas in a station by using declaring means and a standard work time of the work content is updated based on work times obtained from the work time points of the work content which are declared by the workers, characterized in that the system comprises:
causing work content identification means to identify the work content performed by each of the workers; and
causing reliability determination means to determine whether an identified work content identified by the work content identification means coincides with a declared work content declared by the worker by use of the declaring means, when determining that the identified work content coincides with the declared work content, the reliability determination means updates the standard work time of the work content to the standard work time calculated based on the work times obtained from the work time points of the work content which are declared by the workers, and when determining that the identified work content does not coincide with the declared work content, the reliability determination means updates the standard work time of the work content to the standard work time calculated based on the work times obtained from the work time points of the work content which are declared by the workers, exclusive of the work time for which the identified work content does not coincide with the declared work content.

A standard work time updating system according to a thirty-third aspect of the invention is characterized in that, in the thirty-first or thirty-second aspect of the invention of the standard work time updating method, the work content identification means includes:

work tool usage information acquisition means for acquiring work tool usage information by detecting work tools used by the workers; and a work area identification unit configured to identify the work content performed by each of the workers on the basis of the work tool usage information from the work tool usage information acquisition means.

A standard work time updating system according to a thirty-fourth aspect of the invention is characterized in that, in the thirty-third aspect of the invention of the standard work time updating method, the work tool usage information acquisition means is photoelectric sensors which are installed in work tool tables installed in the work areas to be capable of detecting the work tools placed on the work tool tables and which are configured to transmit OFF signals as the work tool usage information, the OFF signals obtained when the work tools are picked up from the work tool tables by the workers.

A standard work time updating system according to a thirty-fifth aspect of the invention is characterized in that, in the thirty-third aspect of the invention of the standard work time updating method, the work tool usage information acquisition means is electric power meters configured to measure power consumptions of the work tools and transmit measured signals of the power consumptions as the work tool usage information.

A standard work time updating system according to a thirty-sixth aspect of the invention is characterized in that, in the thirty-third aspect of the invention of the standard work time updating method, the work tool usage information acquisition means includes:

cameras installed to be capable of capturing images of the work tools on a work tool tables installed in the work areas; and image processing means for determining whether the work tools have disappeared from the work tool tables by performing image processing on the images captured by the cameras and for obtaining the work tool usage information by determining whether the work tools have disappeared from the work tool tables.

A standard work time updating system according to a thirty-seventh aspect of the invention is characterized in that, in the thirty-third aspect of the invention of the standard work time updating method, the work tool usage information acquisition means includes:

RFID tags provided in the work tools; and

RFID readers configured to read records in the RFID tags and transmit the read records as the work tool usage information.

A standard work time updating system according to a thirty-eighth aspect of the invention is characterized in that, in the thirty-third aspect of the invention of the standard work time updating method, the work tool usage information acquisition means is piezoelectric sensors provided in work tool tables installed in the work areas in such a way that loads of the work tools act on the piezoelectric sensors when the work tools are placed on the work tool tables, the piezoelectric sensors configured to detect that the work tools are picked up by the workers from the work tool tables and transmit work tool detection signals as the work tool usage information.

A standard work time updating system, according to a thirty-ninth aspect of the invention, in which workers declare work time points of a work content performed by the workers in work areas in a station by using declaring means and a standard work time of the work content is updated based on work times obtained from the work time points of the work content which are declared by the workers, characterized in that the system comprises:

causing a plurality of reliability determination means to determine whether the work times obtained from the work time points of the work content which are declared by the workers are reliable;

causing update processing means to calculate the standard work time by performing weighted average calculation on an average value of the work times subjected to reliability determination by the plurality of reliability determination means, and thereby updating the standard work time of the work content to the calculated standard work time, and when any of the work times is determined to be unreliable by any of the plurality of reliability determination means, the update processing means performs the weighted average calculation with a weighting factor set to 0, the weighting factor being one for the average value of the work times subjected to the reliability determination by the any reliability determination means.

A standard work time updating system according to a fortieth aspect of the invention is characterized in that, in the thirty-ninth aspect of the invention of the standard work time updating method, the plurality of reliability determination means are a plurality of reliability determination means selected from:

first reliability determination means for determining whether the work times obtained from the work time points of the work content which are declared by the workers each deviate from a predetermined range in a distribution of work time data of the work content which is stored in a database;

second reliability determination means for determining whether the work times obtained from the work time points of the work content which are declared by the workers each exceed a predetermined value in a distribution of work time data of the work content which is stored in the database;

third reliability determination means for determining whether identified work areas which are identified by work area identification means and in which the workers exist coincide with declared work areas declared by the workers by use of the declaring means; and fourth reliability determination means for determining whether an identified work content identified by the work content identification means and performed by the workers coincides with a declared work content declared by the workers by use of the declaring means.

Effect of the Invention

The standard work time updating method, according to the first aspect of the invention, in which workers declare work time points of a work content performed by the workers in a work area in a station by using declaring means and a standard work time of the work content is updated based on work times obtained from the work time points of the work content which are declared by the workers, is characterized in that the method comprises causing reliability determination means to determine whether the work times obtained from the work time points of the work content which are declared by the workers each deviate from a predetermined range in a distribution of work time data of the work content which is stored in a database, when determining that none of the work times deviate from the predetermined range, the reliability determination means updates the standard work time of the work content to the standard work time calculated based on the work times obtained from the work time points of the work content which are declared by the workers, and when determining that any of the work times deviates from the predetermined range, the reliability determination means does not update the standard work time of the work content. Accordingly, the workers can make declaration without an observer or a classifier. In addition, when a false or erroneous declaration is made by the workers, it is possible to find out this declaration and to cancel the update of the standard work time. This prevents the update of the standard work time on the basis of the declaration data of the work time having a low reliability. Hence, the reliability of the update data of the standard work time is improved.

The standard work time updating method, according to the second aspect of the invention, in which workers declare work time points of a work content performed by the workers in a work area in a station by using declaring means and a standard work time of the work content is updated based on work times obtained from the work time points of the work content which are declared by the workers, is characterized in that the method comprises causing reliability determination means to determine whether the work times obtained from the work time points of the work content which are declared by the workers each deviate from a predetermined range in a distribution of work time data of the work content which is stored in a database, when determining that none of the work times deviate from the predetermined range, the reliability determination means updates the standard work time of the work content to the standard work time calculated based on the work times obtained from the work time points of the work content which are declared by the workers, and when determining that any of the work times deviates from the predetermined range, the reliability determination means updates the standard work time of the work content to the standard work time calculated based on the work times obtained from the work time points of the work content which are declared by the workers, exclusive of the work time determined to deviate from the predetermined range. Accordingly, the workers can make declaration without an observer or a classifier. In addition, when a false or erroneous declaration is made by the workers, it is possible to find out this declaration and to update the standard work time after the declaration data of the work time having a low reliability is excluded. This prevents the update of the standard work time on the basis of the declaration data of the work time having a low reliability. Hence, the reliability of the update data of the standard work time is improved.

The standard work time updating method, according to the third aspect of the invention, in which workers declare work time points of a work content performed by the workers in a work area in a station by using declaring means and a standard work time of the work content is updated based on work times obtained from the work time points of the work content which are declared by the workers, is characterized in that the method comprises causing reliability determination means to determine whether the work times obtained from the work time points of the work content which are declared by the workers each exceed a predetermined value in a distribution of work time data of the work content which is stored in a database, when determining that none of the work times exceed the predetermined value, the reliability determination means updates the standard work time of the work content to the standard work time calculated based on the work times obtained from the work time points of the work content which are declared by the workers, and when determining that any of the work times exceeds the predetermined value, the reliability determination means does not update the standard work time of the work content. Accordingly, the workers can make declaration without an observer or a classifier. In addition, when a false or erroneous declaration is made by the workers, it is possible to find out this declaration and to cancel the update of the standard work time. This prevents the update of the standard work time on the basis of the declaration data of the work time having a low reliability. Hence, the reliability of the update data of the standard work time is improved.

The standard work time updating method, according to the fourth aspect of the invention, in which workers declare work time points of a work content performed by the workers in a work area in a station by using declaring means and a standard work time of the work content is updated based on work times obtained from the work time points of the work content which are declared by the workers, is characterized in that the method comprises causing reliability determination means to determine whether the work times obtained from the work time points of the work content which are declared by the workers each exceed a predetermined value in a distribution of work time data of the work content which is stored in a database, when determining that none of the work times exceed the predetermined value, the reliability determination means updates the standard work time of the work content to the standard work time calculated based on the work times obtained from the work time points of the work content which are declared by the workers, and when determining that any of the work times exceeds the predetermined value, the reliability determination means updates the standard work time of the work content to the standard work time calculated based on the work times obtained from the work time points of the work content which are declared by the workers, exclusive of the work time determined to exceed the predetermined value. Accordingly, the workers can make declaration without an observer or a classifier. In addition, when a false or erroneous declaration is made by the workers, it is possible to find out this declaration and to update the standard work time after the declaration data of the work time having a low reliability is excluded. This prevents the update of the standard work time on the basis of the declaration data of the work time having a low reliability. Hence, the reliability of the update data of the standard work time is improved.

The standard work time updating method, according to the fifth aspect of the invention, in which workers declare work time points of a work content performed by the workers in a work area in a station by using declaring means and a standard work time of the work content is updated based on work times obtained from the work time points of the work content which are declared by the workers, is characterized in that the method comprises: calculating a standard work time on the basis of the work times obtained from the work time points of the work content which are declared by the workers and the work times of the work content which are stored in a database; and updating the standard work time of the work content to the calculated standard work time. In this method, even when there is data having a low reliability in the declared work time data of the workers, it is possible to reduce the effect of the declared work time data having a low reliability on the update data of the standard work time. This is because the standard work time is calculated by using not only the declared work time data but also the work time data stored in the database. This prevents (reduces) deterioration in reliability of the update data of the standard work time which is caused by the declared data of the work time having a low reliability. Hence, the reliability of the update data of the standard work time is improved.

The standard work time updating method, according to the sixth aspect of the invention, in which workers declare work time points of a work content performed by the workers in work areas in a station by using declaring means and a standard work time of the work content is updated based on work times obtained from the work time points of the work content which are declared by the workers, is characterized in that the method comprises: causing work area identification means to identify in which one of the work areas each of the workers exists; and causing reliability determination means to determine whether identified work areas identified by the work area identification means coincide with declared work areas declared by the workers by use of the declaring means, when determining that the identified areas coincide with the declared work areas, the reliability determination means updates the standard work time of the work content to the standard work time calculated based on the work times obtained from the work time points of the work content which are declared by the workers, and when determining that any of the identified work areas does not coincide with a corresponding one of the declared work areas, the reliability determination means does not update the standard work time of the work content. Accordingly, the workers can make declaration without an observer or a classifier. In addition, when a false or erroneous declaration is made by the workers, it is possible to find out this declaration and to cancel the update of the standard work time. This prevents the update of the standard work time on the basis of the declaration data of the work time having a low reliability. Hence, the reliability of the update data of the standard work time is improved.

The standard work time updating method, according to the seventh aspect of the invention, in which workers declare work time points of a work content performed by the workers in work areas in a station by using declaring means and a standard work time of the work content is updated based on work times obtained from the work time points of the work content which are declared by the workers, is characterized in that the method comprises: causing work area identification means to identify in which one of the work areas each of the workers exists; and causing reliability determination means to determine whether identified work areas identified by the work area identification means coincide with declared work areas declared by the workers by use of the declaring means, when determining that the identified areas coincide with the declared work areas, the reliability determination means updates the standard work time of the work content to the standard work time calculated based on the work times obtained from the work time points of the work content which are declared by the workers, and when determining that any of the identified work areas does not coincide with a corresponding one of the declared work areas, the reliability determination means updates the standard work time of the work content to the standard work time calculated based on the work times obtained from the work time points of the work content which are declared by the workers, exclusive of the work time for which the identified work area does not coincide with the declared work area. Accordingly, the workers can make declaration without an observer or a classifier. In addition, when a false or erroneous declaration is made by the workers, it is possible to find out this declaration and to update the standard work time after the declaration data of the work time having a low reliability is excluded. This prevents the update of the standard work time on the basis of the declaration data of the work time having a low reliability. Hence, the reliability of the update data of the standard work time is improved.

The standard work time updating method according to the eighth aspect of the invention is characterized in that, in the sixth or seventh aspect of the invention of the standard work time updating method, the work area identification means includes: receivers provided in multiple spots in the station and configured to receive radio waves transmitted from the declaring means; and a work area identification unit configured to identify in which one of the work areas each of the workers exists on the basis of radio wave reception information from the receivers. Accordingly, it is possible to surely identify in which one of the work areas each of the workers exists, with a simple configuration.

The standard work time updating method according to the ninth aspect of the invention is characterized in that, in the sixth or seventh aspect of the invention of the standard work time updating method, the work area identification means includes: RFID tags provided in the declaring means; RFID readers installed in the work areas and configured to read records of the RFID tags and transmit work area information; and a work area identification unit configured to identify in which one of the work areas each of the workers exists on the basis of the work area information transmitted from the RFID readers. Accordingly, it is possible to surely identify in which one of the work areas each of the workers exists, with a simple configuration.

The standard work time updating method according to the tenth aspect of the invention is characterized in that, in the sixth or seventh aspect of the invention of the standard work time updating method, the work area identification means includes: photoelectric sensors installed at entrances of the work areas and configured to detect the workers entering the work areas; and a work area identification unit configured to identify in which one of the work areas each of the workers exists on the basis of worker detection information from the photoelectric sensors. Accordingly, it is possible to surely identify in which one of the work areas each of the workers exists, with a simple configuration.

The standard work time updating method, according to the eleventh aspect of the invention, in which workers declare work time points of a work content performed by the workers in work areas in a station by using declaring means and a standard work time of the work content is updated based on work times obtained from the work time points of the work content which are declared by the workers, characterized in that the method comprises: causing work content identification means to identify the work content performed by each of the workers; and causing reliability determination means to determine whether an identified work content identified by the work content identification means coincides with a declared work content declared by the worker by use of the declaring means, when determining that the identified work content coincides with the declared work content, the reliability determination means updates the standard work time of the work content to the standard work time calculated based on the work times obtained from the work time points of the work content which are declared by the workers, and when determining that the identified work content does not coincide with the declared work content, the reliability determination means does not update the standard work time of the work content. Accordingly, the workers can make declaration without an observer or a classifier. In addition, when a false or erroneous declaration is made by the workers, it is possible to find out this declaration and to cancel the update of the corresponding standard work time. This prevents the update of the standard work times on the basis of the declaration data of the work time having a low reliability. Hence, the reliability of the update data of the standard work times is improved.

The standard work time updating method, according to the twelfth aspect of the invention, in which workers declare work time points of a work content performed by the workers in work areas in a station by using declaring means and a standard work time of the work content is updated based on work times obtained from the work time points of the work content which are declared by the workers, characterized in that the method comprises: causing work content identification means to identify the work content performed by each of the workers; and causing reliability determination means to determine whether an identified work content identified by the work content identification means coincides with a declared work content declared by the worker by use of the declaring means, when determining that the identified work content coincides with the declared work content, the reliability determination means updates the standard work time of the work content to the standard work time calculated based on the work times obtained from the work time points of the work content which are declared by the workers, and when determining that the identified work content does not coincide with the declared work content, the reliability determination means updates the standard work time of the work content to the standard work time calculated based on the work times obtained from the work time points of the work content which are declared by the workers, exclusive of the work time for which the identified work content does not coincide with the declared work content. Accordingly, the workers can make declaration without an observer or a classifier. In addition, when a false or erroneous declaration is made by the workers, it is possible to find out this declaration and to update the standard work times after the declaration data of the work time having a low reliability is excluded. This prevents the update of the standard work times on the basis of the declaration data of the work time having a low reliability. Hence, the reliability of the update data of the standard work times is improved.

The standard work time updating method according to the thirteenth aspect of the invention is characterized in that, in the eleventh or twelfth aspect of the invention of the standard work time updating method, the work content identification means includes: work tool usage information acquisition means for acquiring work tool usage information by detecting work tools used by the workers; and a work area identification unit configured to identify the work content performed by each of the workers on the basis of the work tool usage information from the work tool usage information acquisition means. Accordingly, it is possible to surely identify the work content performed by each of the workers, with a simple configuration.

The standard work time updating method according to the fourteenth aspect of the invention is characterized in that, in the thirteenth aspect of the invention of the standard work time updating method, the work tool usage information acquisition means is photoelectric sensors which are installed in work tool tables installed in the work areas to be capable of detecting the work tools placed on the work tool tables and which are configured to transmit OFF signals as the work tool usage information, the OFF signals obtained when the work tools are picked up from the work tool tables by the workers. Accordingly, the work tool usage information can be surely obtained with a simple configuration. Moreover, since it is possible to know the usage states of the work tools, whether the work tools are put away can be also determined.

The standard work time updating method according to the fifteenth aspect of the invention is characterized in that, in the thirteenth aspect of the invention of the standard work time updating method, the work tool usage information acquisition means is electric power meters configured to measure power consumptions of the work tools and transmit measured signals of the power consumptions as the work tool usage information. Accordingly, the work tool usage information can be surely obtained with a simple configuration. Moreover, since it is possible to know the usage states of the work tools, whether the work tools are put away can be also determined.

The standard work time updating method according to the sixteenth aspect of the invention is characterized in that, in the thirteenth aspect of the invention of the standard work time updating method, the work tool usage information acquisition means includes: cameras installed to be capable of capturing images of the work tools on work tool tables installed in the work areas; and image processing means for determining whether the work tools have disappeared from the work tool tables by performing image processing on the images captured by the cameras and for obtaining the work tool usage information by determining whether the work tools have disappeared from the work tool tables. Accordingly, the work tool usage information can be surely obtained with a simple configuration. Moreover, since it is possible to know the usage states of the work tools, whether the work tools are put away can be also determined.

The standard work time updating method according to the seventeenth aspect of the invention is characterized in that, in the thirteenth aspect of the invention of the standard work time updating method, the work tool usage information acquisition means includes: RFID tags provided in the work tools; and RFID readers configured to read records in the RFID tags and transmit the read records as the work tool usage information. Accordingly, the work tool usage information can be surely obtained with a simple configuration. Moreover, since it is possible to know the usage states of the work tools, whether the work tools are put away can be also determined.

The standard work time updating method according to the eighteenth aspect of the invention is characterized in that, in the thirteenth aspect of the invention of the standard work time updating method, the work tool usage information acquisition means is piezoelectric sensors provided in work tool tables installed in the work areas in such a way that loads of the work tools act on the piezoelectric sensors when the work tools are placed on the work tool tables, the piezoelectric sensors configured to detect that the work tools are picked up from the work tool tables by the workers and transmit work tool detection signals as the work tool usage information. Accordingly, the work tool usage information can be surely obtained with a simple configuration. Moreover, since it is possible to know the usage states of the work tools, whether the work tools are put away can be also determined.

The standard work time updating method, according to the nineteenth aspect of the invention, in which workers declare work time points of a work content performed by the workers in work areas in a station by using declaring means and a standard work time of the work content is updated based on work times obtained from the work time points of the work content which are declared by the workers, characterized in that the method comprises: causing a plurality of reliability determination means to determine whether the work times obtained from the work time points of the work content which are declared by the workers are reliable; calculating the standard work time by performing weighted average calculation on an average value of the work times subjected to reliability determination by the plurality of reliability determination means; and updating the standard work time of the work content to the calculated standard work time, and when any of the work times is determined to be unreliable by any of the plurality of reliability determination means, the weighted average calculation is performed with a weighting factor set to 0, the weighting factor being one for the average value of the work times subjected to the reliability determination by the any reliability determination means. Accordingly, the workers can make declaration without an observer or a classifier. In addition, when a false or erroneous declaration is made by the workers, any of the multiple reliability determination means can find out this declaration. Then, the standard work times can be updated after the declaration data of the work time having a low reliability is excluded. This prevents the update of the standard work times on the basis of the declaration data of the work time having a low reliability. Hence, the reliability of the update data of the standard work times is improved.

The standard work time updating method according to the twentieth aspect of the invention is characterized in that, in the nineteenth aspect of the invention of the standard work time updating method, the plurality of reliability determination means are a plurality of reliability determination means selected from: first reliability determination means for determining whether the work times obtained from the work time points of the work content which are declared by the workers each deviate from a predetermined range in a distribution of work time data of the work content which is stored in a database; second reliability determination means for determining whether the work times obtained from the work time points of the work content which are declared by the workers each exceed a predetermined value in a distribution of work time data of the work content which is stored in the database; third reliability determination means for determining whether identified work areas which are identified by work area identification means and in which the workers exist coincide with declared work areas declared by the workers by use of the declaring means; and fourth reliability determination means for determining whether an identified work content identified by the work content identification means and performed by the workers coincides with a declared work content declared by the workers by use of the declaring means. Accordingly, the workers can make declaration without an observer or a classifier. In addition, when a false or erroneous declaration is made by the workers, any of the first to fourth reliability determination means can find out this declaration. Then, the standard work times can be updated after the declaration data of the work time having a low reliability is excluded. This prevents the update of the standard work times on the basis of the declaration data of the work time having a low reliability. Hence, the reliability of the update data of the standard work times is improved.

The standard work time updating system, according to the twenty-first aspect of the invention, in which workers declare work time points of a work content performed by the workers in a work area in a station by using declaring means and a standard work time of the work content is updated based on work times obtained from the work time points of the work content which are declared by the workers, is characterized in that the system comprises reliability determination means for determining whether the work times obtained from the work time points of the work content which are declared by the workers each deviate from a predetermined range in a distribution of work time data of the work content which is stored in a database, when determining that none of the work times deviate from the predetermined range, the reliability determination means updates the standard work time of the work content to the standard work time calculated based on the work times obtained from the work time points of the work content which are declared by the workers, and when determining that any of the work times deviates from the predetermined range, the reliability determination means does not update the standard work time of the work content. Accordingly, the workers can make declaration without an observer or a classifier. In addition, when a false or erroneous declaration is made by the workers, it is possible to find out this declaration and to cancel the update of the standard work time. This prevents the update of the standard work time on the basis of the declaration data of the work time having a low reliability. Hence, the reliability of the update data of the standard work time is improved.

The standard work time updating system, according to the twenty-second aspect of the invention, in which workers declare work time points of a work content performed by the workers in a work area in a station by using declaring means and a standard work time of the work content is updated based on work times obtained from the work time points of the work content which are declared by the workers, is characterized in that the system comprises reliability determination means for determining whether the work times obtained from the work time points of the work content which are declared by the workers each deviate from a predetermined range in a distribution of work time data of the work content which is stored in a database, when determining that none of the work times deviate from the predetermined range, the reliability determination means updates the standard work time of the work content to the standard work time calculated based on the work times obtained from the work time points of the work content which are declared by the workers, and when determining that any of the work times deviates from the predetermined range, the reliability determination means updates the standard work time of the work content to the standard work time calculated based on the work times obtained from the work time points of the work content which are declared by the workers, exclusive of the work time determined to deviate from the predetermined range. Accordingly, the workers can make declaration without an observer or a classifier. In addition, when a false or erroneous declaration is made by the workers, it is possible to find out this declaration and to update the standard work time after the declaration data of the work time having a low reliability is excluded. This prevents the update of the standard work time on the basis of the declaration data of the work time having a low reliability. Hence, the reliability of the update data of the standard work time is improved.

The standard work time updating system, according to the twenty-third aspect of the invention, in which workers declare work time points of a work content performed by the workers in a work area in a station by using declaring means and a standard work time of the work content is updated based on work times obtained from the work time points of the work content which are declared by the workers, is characterized in that the system comprises reliability determination means for determining whether the work times obtained from the work time points of the work content which are declared by the workers each exceed a predetermined value in a distribution of work time data of the work content which is stored in a database, when determining that none of the work times exceed the predetermined value, the reliability determination means updates the standard work time of the work content to the standard work time calculated based on the work times obtained from the work time points of the work content which are declared by the workers, and when determining that any of the work times exceeds the predetermined value, the reliability determination means does not update the standard work time of the work content. Accordingly, the workers can make declaration without an observer or a classifier. In addition, when a false or erroneous declaration is made by the workers, it is possible to find out this declaration and to cancel the update of the standard work time. This prevents the update of the standard work time on the basis of the declaration data of the work time having a low reliability. Hence, the reliability of the update data of the standard work time is improved.

The standard work time updating system, according to the twenty-fourth aspect of the invention, in which workers declare work time points of a work content performed by the workers in a work area in a station by using declaring means and a standard work time of the work content is updated based on work times obtained from the work time points of the work content which are declared by the workers, is characterized in that the system comprises reliability determination means for determining whether the work times obtained from the work time points of the work content which are declared by the workers each exceed a predetermined value in a distribution of work time data of the work content which is stored in a database, when determining that none of the work times exceed the predetermined value, the reliability determination means updates the standard work time of the work content to the standard work time calculated based on the work times obtained from the work time points of the work content which are declared by the workers, and when determining that any of the work times exceeds the predetermined value, the reliability determination means updates the standard work time of the work content to the standard work time calculated based on the work times obtained from the work time points of the work content which are declared by the workers, exclusive of the work time determined to be exceeding the predetermined value. Accordingly, the workers can make declaration without an observer or a classifier. In addition, when a false or erroneous declaration is made by the workers, it is possible to find out this declaration and to update the standard work time after the declaration data of the work time having a low reliability is excluded. This prevents the update of the standard work time on the basis of the declaration data of the work time having a low reliability. Hence, the reliability of the update data of the standard work time is improved.

The standard work time updating system, according to the twenty-fifth aspect of the invention, in which workers declare work time points of a work content performed by the workers in a work area in a station by using declaring means and a standard work time of the work content is updated based on work times obtained from the work time points of the work content which are declared by the workers, is characterized in that the system comprises update processing means for calculating a standard work time on the basis of the work times obtained from the work time points of the work content which are declared by the workers and the work times of the work content which are stored in a database, and thereby updating the standard work time of the work content to the calculated standard work time. In this method, even when there is data having a low reliability in the declared work time data of the workers, it is possible to reduce the effect of the declared work time data having a low reliability on the update data of the standard work time. This is because the standard work time is calculated by using not only the declared work time data but also the work time data stored in the database. This prevents (reduces) deterioration in reliability of the update data of the standard work time which is caused by the declared data of the work time having a low reliability. Hence, the reliability of the update data of the standard work time is improved.

The standard work time updating system, according to the twenty-sixth aspect of the invention, in which workers declare work time points of a work content performed by the workers in work areas in a station by using declaring means and a standard work time of the work content is updated based on work times obtained from the work time points of the work content which are declared by the workers, is characterized in that the system comprises: work area identification means for identifying in which one of the work areas each of the workers exists; and reliability determination means for determining whether identified work areas identified by the work area identification means coincide with declared work areas declared by the workers by use of the declaring means, when determining that the identified areas coincide with the declared work areas, the reliability determination means updates the standard work time of the work content to the standard work time calculated based on the work times obtained from the work time points of the work content which are declared by the workers, and when determining that any of the identified work areas does not coincide with a corresponding one of the declared work areas, the reliability determination means does not update the standard work time of the work content. Accordingly, the workers can make declaration without an observer or a classifier. In addition, when a false or erroneous declaration is made by the workers, it is possible to find out this declaration and to cancel the update of the standard work time. This prevents the update of the standard work time on the basis of the declaration data of the work time having a low reliability. Hence, the reliability of the update data of the standard work time is improved.

The standard work time updating system, according to the twenty-seventh aspect of the invention, in which workers declare work time points of a work content performed by the workers in work areas in a station by using declaring means and a standard work time of the work content is updated based on work times obtained from the work time points of the work content which are declared by the workers, is characterized in that the system comprises: work area identification means for identifying in which one of the work areas each of the workers exists; and reliability determination means for determining whether identified work areas identified by the work area identification means coincide with declared work areas declared by the workers by use of the declaring means, when determining that the identified areas coincide with the declared work areas, the reliability determination means updates the standard work time of the work content to the standard work time calculated based on the work times obtained from the work time points of the work content which are declared by the workers, and when determining that any of the identified work areas does not coincide with a corresponding one of the declared work areas, the reliability determination means updates the standard work time of the work content to the standard work time calculated based on the work times obtained from the work time points of the work content which are declared by the workers, exclusive of the work time for which the identified work area does not coincide with the declared work area. Accordingly, the workers can make declaration without an observer or a classifier. In addition, when a false or erroneous declaration is made by the workers, it is possible to find out this declaration and to update the standard work time after the declaration data of the work time having a low reliability is excluded. This prevents the update of the standard work time on the basis of the declaration data of the work time having a low reliability. Hence, the reliability of the update data of the standard work time is improved.

The standard work time updating system according to the twenty-eighth aspect of the invention is characterized in that, in the twenty-sixth or twenty-seventh aspect of the invention of the standard work time updating method, the work area identification means includes: receivers provided in multiple spots in the station and configured to receive radio waves transmitted from the declaring means; and a work area identification unit configured to identify in which one of the work areas each of the workers exists on the basis of radio wave reception information from the receivers. Accordingly, it is possible to surely identify in which one of the work areas each of the workers exists, with a simple configuration.

The standard work time updating system according to the twenty-ninth aspect of the invention is characterized in that, in the twenty-sixth or twenty-seventh aspect of the invention of the standard work time updating method, the work area identification means includes: RFID tags provided in the declaring means; RFID readers installed in the work areas and configured to read records of the RFID tags and transmit work area information; and a work area identification unit configured to identify in which one of the work areas each of the workers exists on the basis of the work area information transmitted from the RFID readers. Accordingly, it is possible to surely identify in which one of the work areas each of the workers exists, with a simple configuration.

The standard work time updating system according to the thirtieth aspect of the invention is characterized in that, in the twenty-sixth or twenty-seventh aspect of the invention of the standard work time updating method, the work area identification means includes: photoelectric sensors installed at entrances of the work areas and configured to detect the workers entering the work areas; and a work area identification unit configured to identify in which one of the work areas each the workers exists on the basis of worker detection information from the photoelectric sensors. Accordingly, it is possible to surely identify in which one of the work areas each of the workers exists, with a simple configuration.

The standard work time updating system, according to the thirty-first aspect of the invention, in which workers declare work time points of a work content performed by the workers in work areas in a station by using declaring means and a standard work time of the work content is updated based on work times obtained from the work time points of the work content which are declared by the workers, characterized in that the system comprises: causing work content identification means to identify the work content performed by each of the workers; and causing reliability determination means to determine whether an identified work content identified by the work content identification means coincides with a declared work content declared by the worker by use of the declaring means, when determining that the identified work content coincides with the declared work content, the reliability determination means updates the standard work time of the work content to the standard work time calculated based on the work times obtained from the work time points of the work content which are declared by the workers, and when determining that the identified work content does not coincide with the declared work content, the reliability determination means does not update the standard work time of the work content. Accordingly, the workers can make declaration without an observer or a classifier. In addition, when a false or erroneous declaration is made by the workers, it is possible to find out this declaration and to cancel the update of the corresponding standard work time. This prevents the update of the standard work times on the basis of the declaration data of the work time having a low reliability. Hence, the reliability of the update data of the standard work times is improved.

The standard work time updating system, according to the thirty-second aspect of the invention, in which workers declare work time points of a work content performed by the workers in work areas in a station by using declaring means and a standard work time of the work content is updated based on work times obtained from the work time points of the work content which are declared by the workers, characterized in that the system comprises: causing work content identification means to identify the work content performed by each of the workers; and causing reliability determination means to determine whether an identified work content identified by the work content identification means coincides with a declared work content declared by the worker by use of the declaring means, when determining that the identified work content coincides with the declared work content, the reliability determination means updates the standard work time of the work content to the standard work time calculated based on the work times obtained from the work time points of the work content which are declared by the workers, and when determining that the identified work content does not coincide with the declared work content, the reliability determination means updates the standard work time of the work content to the standard work time calculated based on the work times obtained from the work time points of the work content which are declared by the workers, exclusive of the work time for which the identified work content does not coincide with the declared work content. Accordingly, the workers can make declaration without an observer or a classifier. In addition, when a false or erroneous declaration is made by the workers, it is possible to find out this declaration and to update the standard work time after the declaration data of the work time having a low reliability is excluded. This prevents the update of the standard work times on the basis of the declaration data of the work time having a low reliability. Hence, the reliability of the update data of the standard work times is improved.

The standard work time updating system according to the thirty-third aspect of the invention is characterized in that, in the thirty-first or thirty-second aspect of the invention of the standard work time updating method, the work content identification means includes: work tool usage information acquisition means for acquiring work tool usage information by detecting work tools used by the workers; and a work area identification unit configured to identify the work content performed by each of the workers on the basis of the work tool usage information from the work tool usage information acquisition means. Accordingly, it is possible to surely identify the work content performed by each of the workers, with a simple configuration.

The standard work time updating system according to the thirty-fourth aspect of the invention is characterized in that, in the thirty-third aspect of the invention of the standard work time updating method, the work tool usage information acquisition means is photoelectric sensors which are installed in work tool tables installed in the work areas to be capable of detecting the work tools placed on the work tool tables and which are configured to transmit OFF signals as the work tool usage information, the OFF signals obtained when the work tools are picked up from the work tool tables by the workers. Accordingly, the work tool usage information can be surely obtained with a simple configuration. Moreover, since it is possible to know the usage states of the work tools, whether the work tools are put away can be also determined.

The standard work time updating system according to the thirty-fifth aspect of the invention is characterized in that, in the thirty-third aspect of the invention of the standard work time updating method, the work tool usage information acquisition means is electric power meters configured to measure power consumptions of the work tools and transmit measured signals of the power consumptions as the work tool usage information. Accordingly, the work tool usage information can be surely obtained with a simple configuration. Moreover, since it is possible to know the usage states of the work tools, whether the work tools are put away can be also determined.

The standard work time updating system according to the thirty-sixth aspect of the invention is characterized in that, in the thirty-third aspect of the invention of the standard work time updating method, the work tool usage information acquisition means includes: cameras installed to be capable of capturing images of the work tools on a work tool tables installed in the work areas; and image processing means for determining whether the work tools have disappeared from the work tool tables by performing image processing on the images captured by the cameras and for obtaining the work tool usage information by determining whether the work tools have disappeared from the work tool tables. Accordingly, the work tool usage information can be surely obtained with a simple configuration. Moreover, since it is possible to know the usage states of the work tools, whether the work tools are put away can be also determined.

The standard work time updating system according to the thirty-seventh aspect of the invention is characterized in that, in the thirty-third aspect of the invention of the standard work time updating method, the work tool usage information acquisition means includes: RFID tags provided in the work tools; and RFID readers configured to read records in the RFID tags and transmit the read records as the work tool usage information. Accordingly, the work tool usage information can be surely obtained with a simple configuration. Moreover, since it is possible to know the usage states of the work tools, whether the work tools are put away can be also determined.

The standard work time updating system according to the thirty-eighth aspect of the invention is characterized in that, in the thirty-third aspect of the invention of the standard work time updating method, the work tool usage information acquisition means is piezoelectric sensors provided in work tool tables installed in the work areas in such a way that loads of the work tools act on the piezoelectric sensors when the work tools are placed on the work tool tables, the piezoelectric sensors configured to detect that the work tools are picked up by the workers from the work tool tables and transmit work tool detection signals as the work tool usage information. Accordingly, the work tool usage information can be surely obtained with a simple configuration. Moreover, since it is possible to know the usage states of the work tools, whether the work tools are put away can be also determined.

The standard work time updating system, according to the thirty-ninth aspect of the invention, in which workers declare work time points of a work content performed by the workers in work areas in a station by using declaring means and a standard work time of the work content is updated based on work times obtained from the work time points of the work content which are declared by the workers, characterized in that the system comprises: causing a plurality of reliability determination means to determine whether the work times obtained from the work time points of the work content which are declared by the workers are reliable; causing update processing means to calculate the standard work time by performing weighted average calculation on an average value of the work times subjected to reliability determination by the plurality of reliability determination means, and thereby updating the standard work time of the work content to the calculated standard work time, and when any of the work times is determined to be unreliable by any of the plurality of reliability determination means, the update processing means performs the weighted average calculation with a weighting factor set to 0, the weighting factor being one for the average value of the work times subjected to the reliability determination by the any reliability determination means. Accordingly, the workers can make declaration without an observer or a classifier. In addition, when a false or erroneous declaration is made by the workers, any of the multiple reliability determination means can find out this declaration. Then, the standard work times can be updated after the declaration data of the work time having a low reliability is excluded. This prevents the update of the standard work times on the basis of the declaration data of the work time having a low reliability. Hence, the reliability of the update data of the standard work times is improved.

The standard work time updating system according to the fortieth aspect of the invention is characterized in that, the plurality of reliability determination means are a plurality of reliability determination means selected from: first reliability determination means for determining whether the work times obtained from the work time points of the work content which are declared by the workers each deviate from a predetermined range in a distribution of work time data of the work content which is stored in a database; second reliability determination means for determining whether the work times obtained from the work time points of the work content which are declared by the workers each exceed a predetermined value in a distribution of work time data of the work content which is stored in the database; third reliability determination means for determining whether identified work areas which are identified by work area identification means and in which the workers exist coincide with declared work areas declared by the workers by use of the declaring means; and fourth reliability determination means for determining whether an identified work content identified by the work content identification means and performed by the workers coincides with a declared work content declared by the workers by use of the declaring means. Accordingly, the workers can make declaration without an observer or a classifier. In addition, when a false or erroneous declaration is made by the workers, any of the first to fourth reliability determination means can find out this declaration. Then, the standard work time can be updated after the declaration data of the work time having a low reliability is excluded. This prevents the update of the standard work times on the basis of the declaration data of the work time having a low reliability. Hence, the reliability of the update data of the standard work times is improved.

BRIEF DESCRIPTION OF THE DRAWINGS

FIG. 1 Part (a) is a configuration diagram of a standard work time updating system in Embodiment 1 of the present invention, Part (b) is an enlarged view of a PDA, and Part (c) is an enlarged view of a display screen of the PDA.

FIG. 2 is a block diagram of the standard work time updating system in Embodiment 1 of the present invention.

FIG. 5 Part (a) is a configuration diagram of a standard work time updating system in Embodiment 2 of the present invention, Part (b) is an enlarged view of a PDA, and Part (c) is an enlarged view of a display screen of the PDA.

FIG. 6 is a block diagram of the standard work time updating system in Embodiment 2 of the present invention.

FIG. 7 Part (a) is a configuration diagram of a standard work time updating system in Embodiment 3 of the present invention, Part (b) is an enlarged view of a PDA, and Part (c) is an enlarged view of a display screen of the PDA.

MODE FOR CARRYING OUT THE INVENTION

Figure 3:
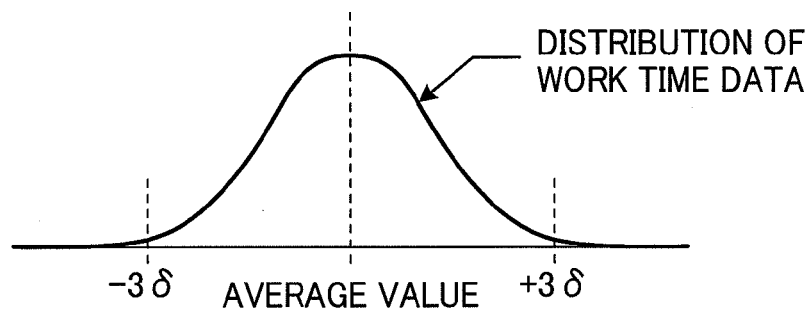
FIG. 3 is an explanation graph showing a predetermined range in a distribution of work time data.

Embodiments of the present invention are described below in detail on the basis of the drawings.
<Embodiment 1>
As shown in part (a) of FIG. 1, an inside of an assembly station 11 in which assembly work of a product such as an aircraft or a ship is performed is divided into multiple (four in the illustrated example) work areas 12A, 12B, 12C, 12D, and 12E for respective multiple work contents. Workers 15 perform work of the work contents in the work areas 12A to 12E.

At this time, in the work areas 12A to 12E, each of the workers 15 operates a PDA 16 (declaring means) carried by the worker 15 to record work time points (work start time point and work completion time point) of the respective work contents in a storage device included in the PDA 16. As shown in Parts (b) and (c) of FIG. 1, the work content, the work time point (work start time point and work completion time point), and the work area are displayed in a display screen 17 of the PDA 16. In addition, operation buttons 18A, 18B, and 18C respectively for start, interruption, and completion of work are also displayed in the display screen 17.

Specifically, when the worker 15 performs touch operation on the start button 18A at the start of the work of a certain work content, the work start time point of the work contents is recorded in the PDA 16 and is displayed in the display screen 17. Moreover, when the worker 15 performs touch operation on the completion button 18C at the completion of the work of a certain work content, the work completion time point of the work content is recorded in the PDA 16 and is displayed in the display screen 17. When the worker 15 performs touch operation on the interruption button 18B for some reason during the work of a certain work content, the recording of the work time point of the work content is cancelled.

In Embodiment 1, multiple receivers 13A, 13B, 13C, 13D, and 13E and a transmitter 14 are installed in the station 11. The receivers 13A to 13E are installed respectively in the work areas 12A to 12E and the transmitter 14 is installed in a place other than the work areas 12A to 12E.

Meanwhile, the PDA 16 (specifically, a transmitter mounted on the PDA 16) carried by each worker 15 transmits a radio wave to the receivers 13A to 13E. When receiving the radio wave transmitted from the PDA 16, each of the receivers 13A to 13E transmits radio wave reception information thereof to the transmitter 14 wirelessly or by a wire. The transmitter 14 transmits the radio wave reception information to a work time management server (personal computer) 20.

Figure 4:
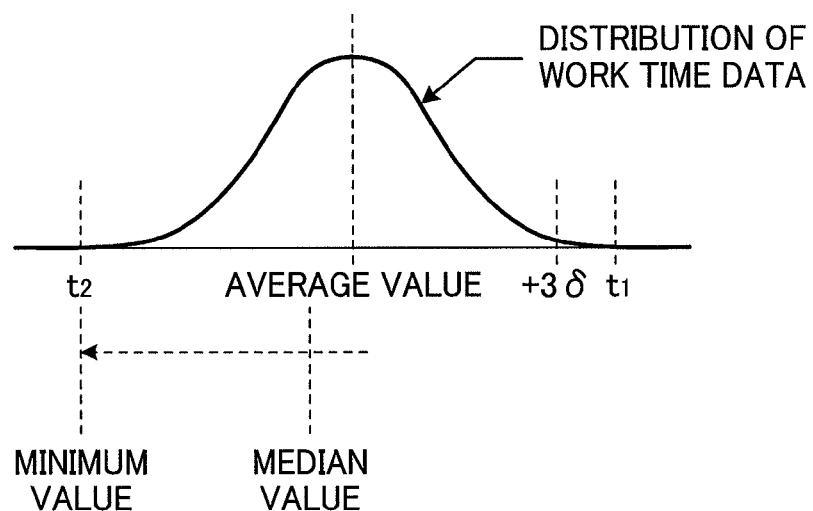
FIG. 4 is an explanation graph showing a predetermined value in the distribution of the work time data.

As shown in Parts (a) to (c) of FIG. 1 and FIG. 2, information such as the work time points (work start time point and work completion time point) of the work contents recorded by the PDA 16 (i.e. information on the work contents, the work time points, and the work areas declared (transmitted) by the worker 15 by using the PDA 16) is transmitted to the work time management server 20. The work time management server 20 has a storage unit 21 in which work procedures, the work contents, standard work times, the work areas, and the like are stored as a database, a standard work time calculation unit 22, a work area identification unit 23, and a reliability determination unit 24 (reliability determining means, update processing means). Data of the standard work time recorded in the database is calculated for each work content as an average value (or, alternatively, a minimum value, a median value, or the like: see FIG. 4) of the work times, on the basis of data of the past work times of the work content which is stored as the database. Note that, the functions of the standard work time calculation unit 22, the work area identification unit 23, and the reliability determination unit 24 are implemented by software (program) and are executed by a CPU (central processing unit) of the work time management server 20.

The standard work time calculation unit 22 obtains the work time (work completion time point−work start time point) of each work content from the information (i.e. the information on the work content and the work time point) on the work time point (work start time point and work completion time point) of the work content which is inputted from the PDA 16 of each worker 15. The standard work time calculation unit 22 then calculates the average value (or, alternatively, a minimum value, a median value, or the like) of the work times for each work content and sets the calculated value as the standard work time of the work content. In this case, when there is work time data greatly deviating from the average value (i.e. work time data having a low reliability), the average value is greatly affected by this greatly-deviating work time data. In view of this, it is preferable to use the median value which is relatively less affected by the greatly-deviating work time data. Moreover, when the calculated standard work times of the respective work contents are shorter than the standard work times of the work contents which are stored in the storage unit 21 as the database, the standard work time calculation unit 22 outputs the calculated standard work times of the work contents to the reliability determination unit 24 as the standard work times for update. Moreover, the data on the work areas declared (transmitted from the PDAs 16) by the workers 15 is also outputted to the reliability determination unit 24 via the standard work time calculation unit 22.

The work area identification unit 23 identifies in which of the work areas 12A to 12E each of the PDAs 16 (i.e. the workers 15 carrying the PDAs 16) exists, on the basis of the radio wave reception information transmitted from the receivers 13A to 13E via the transmitter 14, by using a TDOA (Time Difference of Arrival) method, a RSSI (Received Signal Strength Indicator) method, or the like, and then outputs information on the identified work areas to the reliability determination unit 24. In other words, the receivers 13A to 13E, the work area identification unit 23, and the like form work area identification means. The TDOA method is a method in which the position of each PDA 16 is measured by a three-point method from differences in arrival times of the radio wave transmitted from the PDA 16 at the receivers 13A to 13E. The RSSI method is a method in which the position of each PDA 16 is measured by using the strength of the radio wave transmitted from the PDA 16 and received by each of the receivers 13A to 13E.

The reliability determination unit 24 determines whether the work times of the work contents which are obtained from the work time points of the work contents declared (transmitted from the PDAs 16) by the workers 15 each deviate from a predetermined range (range of ±3σ in the example of FIG. 3: σ is a standard deviation) in distribution of the work time data of a corresponding one of the work contents which is stored in the database (first reliability determination means). When determining that none of the work times (declared work times) deviate from the predetermined range for each work content, the reliability determination unit 24 updates the standard work times of the work contents to the standard work times of the work contents which is calculated by the standard work time calculation unit 22 and outputs the updated standard work times. Meanwhile, when determining that any of the work times (declared work times) deviates from the predetermined range for any of work contents, the reliability determination unit 24 does not update the standard work time of the relevant work content to the standard work time of the relevant work content which is calculated by the standard work time calculation unit 22 and leaves the standard work time of the relevant work content to be the standard work time of the relevant work content which is recorded as the database.

Moreover, the reliability determination unit 24 determines whether the work areas (actual work areas) identified by the work area identification unit 23 coincide with the work areas declared by the workers 15 (third reliability determination means).

When the work areas identified by the work area identification unit 23 coincide with the work areas declared by the workers 15 in the determination, the information on the work time points declared by the workers 15 is reliable. Accordingly, when determining that the work areas identified by the work area identification unit 23 coincide with the work areas declared by the workers 15, the reliability determination unit 24 updates the standard work times of the work contents to the standard work times of the work contents which are calculated by the standard work time calculation unit 22 and outputs the updated standard work times.

Meanwhile, when any of the work areas identified by the work area identification unit 23 does not coincide with a corresponding one of the work areas declared by the workers 15, the information on the work time point which is related to the non-coincident work area and which is declared by the worker 15 may be a false or erroneous input by the worker 15 and is unreliable. Accordingly, when determining that any of the work areas identified by the work area identification unit 23 does not coincide with the corresponding work area declared by the worker 15, the reliability determination unit 24 does not update the standard work time of the work content related to the non-coincident work area to the standard work time of the work content which is calculated by the standard work time calculation unit 22 and leave the standard work time to be the standard work time of the work content which is recorded as the database.

The following processes may be performed in the reliability determination unit 24 in addition to the processes described above.

For example, the reliability determination unit 24 determines whether the work times of the work contents which are obtained from the work time points of the work contents declared (transmitted from the PDA 16) by the workers 15 each deviate from the predetermined range (range of ±3σ) in distribution of the work time data of a corresponding one of the work contents which is stored in the database (first reliability determination means). When determining that none of the work times (declared work times) deviate from the predetermined range for each work content, the reliability determination unit 24 updates the standard work times of the work contents to the standard work times of the work contents which are calculated by the standard work time calculation unit 22 (i.e. the standard work times calculated based on all of the work times declared for each of the work contents) and outputs the updated standard work times. Meanwhile, when determining that any of the work times (declared work times) deviates from the predetermined range for any of the work contents, the reliability determination unit 24 updates the standard work times of the work contents to the standard work times calculated based on the work times obtained from the work time points of the work contents declared by the workers 15, exclusive of the work time determined to deviate from the predetermined range. The reliability determination unit 24 then outputs the updated standard work time.

Moreover, the following processes may be performed. The reliability determination unit 24 determines whether the work times of the work contents which are obtained from the work time points of the work contents declared (transmitted from the PDAs 16) by the workers 15 each exceed a predetermined value (+3σ in the example of FIG. 4: σ is a standard deviation) in distribution of the work time data of a corresponding one of the work contents which is stored in the database (second reliability determination means). When determining that none of the work times (declared work times) exceed the predetermined value for each work content, the reliability determination unit 24 updates the standard work times of the work contents to the standard work times of the work contents calculated by the standard work time calculation unit 22 and outputs the updated standard work times. Meanwhile, when determining that any of the work times (declared work times: for example, a work time $t_1$ shown in FIG. 4) exceeds the predetermined value for any of the work contents, the reliability determination unit 24 does not update the standard work times of the relevant work content to the standard work time of the relevant work content which is calculated by the standard work time calculation unit 22 and leaves the standard work time to be the standard work time of the relevant work content which is recorded as the database.

Furthermore, the following processes may be performed. The reliability determination unit 24 determines whether the work times of the work contents which are obtained from the work time points of the work contents declared (transmitted from the PDAs 16) by the worker 15 each exceed a predetermined value (+3σ) in distribution of the work time data of a corresponding one of the work contents which is stored in the database (second reliability determination means). When determining that none of the work times (declared work times) exceed the predetermined range for each work content, the reliability determination unit 24 updates the standard work times of the work contents to the standard work times of the work contents which are calculated by the standard work time calculation unit 22 and outputs the updated standard work times. Meanwhile, when determining that any of the work times (declared work times) exceeds the predetermined value for any of the work contents, the reliability determination unit 24 updates the standard work times of the work contents to the standard work times calculated based on the work times obtained from the work time points of the work contents declared by the workers 15, exclusive of the work time determined to exceed the predetermined value. The reliability determination unit 24 then outputs the updated standard work time.

In addition the following processed may be performed. The reliability determination unit 24 (functioning as the update processing means in this case) calculates the standard work times on the basis of the work times of the work contents which are obtained from the work time points of the work contents declared by the workers 15 and the work times of the work contents which are stored in the database and updates the standard work times of the work contents to the calculated standard work times.

Moreover, the following processes may be performed. The reliability determination unit 24 determines whether the identified work areas identified by the work area identification unit 23 coincide with the declared work areas declared by the workers 15 by use of the declaring means (PDAs 16) (third reliability determination means). When determining that the identified work areas coincide with the declared work areas, the reliability determination unit 24 updates the standard work time of the work contents to the standard work times of the work contents which are calculated by the standard work time calculation unit 22 and outputs the updated standard work times. Meanwhile, when determining that any of the identified work areas does not coincide with a corresponding one of the declared work areas, the reliability determination unit 24 updates the standard work time of the work content related to the non-coincident work area to the standard work time calculated based on the work times obtained from the work time points of the work content declared by the worker 15, exclusive of the work time for which the identified work area does not coincide with the declared work area. The reliability determination unit 24 then outputs the updated standard work time.

Moreover, in the case of simultaneously performing the update processing for the standard work times on the basis of the reliability determinations of the first to third reliability determination means, the processes may be performed, for example, in such a way that the priorities are set for these reliability determination means in advance. When there is a difference in the update data of the standard work time between the first to third reliability determination means, the update data of the standard work time of the reliability determination means with a higher priority is used and the update processing is performed based on this update data. Instead, the update processes may be performed such that the average value, the median value, or the smallest value of the pieces of update data of the standard work time in the first to third reliability determination means is calculated and the update processing is performed based on this calculated value.

Furthermore, in the case of simultaneously performing the reliability determinations of the first to third reliability determination means, standard work times (update data) may be calculated by performing weighted average calculation.

Specifically, the reliability determination unit 24 simultaneously performs: the reliability determination by the first reliability determination means for determining whether the work times of the work contents which are obtained from the work time points of the work contents declared by the workers 15 each deviate from the predetermined range (range of ±3σ) in the distribution of work time data of a corresponding one of the work contents which is stored in the database; the reliability determination by the second reliability determination means for determining whether the work times obtained from the work time points of the work contents declared by the workers 15 each exceed the predetermined value (+3σ) in the distribution of work time data of a corresponding one of the work contents which is stored in the database; and the reliability determination by the third reliability determination means for determining whether the identified work areas which are identified by the work area identification unit 23 and in which the workers 15 exist coincide with the declared work areas declared by the workers 15 by use of the declaring means (PDAs 16).

Then, the reliability determination unit 24 calculates the standard work times by performing the weighted average calculation on the average values of the work times subjected to the reliability determinations by the first to third reliability determination means and updates the standard work time of the work contents to the calculated standard work times. Moreover, when determining that any of the work times is unreliable by any of the first to third reliability determination means, the reliability determination unit 24 performs the weighted average calculation with a weighting factor set to 0, the weighting factor being one for the average value of the work times subjected to the reliability determination by the any reliability determination means.

Specifically, in the first reliability determination means, when any of the work times of the work contents which are obtained from the work time points of the work contents declared by the workers 15 is determined to deviate from the predetermined range (range of ±3σ) in the distribution of work time data of a corresponding one of the work contents which is stored in the database, the weighted average calculation for updating the standard work time of the relevant work content is performed with the weighting factor set to 0, the weighting factor being one for the average value of the work times (declared work times) of the relevant work content which are subjected to the reliability determination by the first reliability determination means. In the second reliability determination means, when any of the work times which are obtained from the work time points of the work contents declared by the workers 15 is determined to exceed the predetermined value (+3σ) in the distribution of work time data of a corresponding one of the work contents which is stored in the database, the weighted average calculation for updating the standard work time of the relevant work content is performed with the weighting factor set to 0, the weighting factor being one for the average value of the work times (declared work times) of the relevant work content which are subjected to the reliability determination by the second reliability determination means. In the third reliability determination means, when any of the identified work areas which are identified by the work area identification unit 23 and in which the workers 15 exist is determined to not coincide with a corresponding one of the declared work areas declared by the workers 15 by use of the declaring means (PDAs 16), the weighted average calculation for updating the standard work time of the relevant work content is performed with the weighting factor set to 0, the weighting factor being one for the average value of the work times (declared work times) of the relevant work content which are subjected to the reliability determination by the third reliability determination means.

A specific example is described in further detail. When data of the work times (declared work times) of each of the work contents which are subjected to the reliability determination by the first to third reliability determination means is $x_i \pm \delta_i$, the weighting factor $w_i$ for the average value $x_i$ of the work times subjected to the reliability determination by the first to third reliability determination means is obtained by using Formula (1) shown below. Here, δ is a standard deviation showing scattering of the work times of each work content. Moreover, i=1, 2, . . . , n is satisfied and n=3 is satisfied in this example. Specifically, the first reliability means is i=1, the second reliability means is i=2, and the third reliability means is i=3.

[Formula 1]

$$w_i = \frac{1}{\delta_i^2} \quad (1)$$

Then, the weighted average calculation is performed by using Formula (2) shown below on the average value $x_i$ of the work times of each work content which are subjected to the reliability determination by the first to third reliability determination means and the standard work time (weighted average value) $x_{wav}$ is thereby calculated. The average work time of each work content is then updated to the calculated standard work time $x_{wav}$. Moreover, when any of the work times is determined to be unreliable by any of the first to third reliability determination means at this time, the weighted average calculation is performed with the scattering (standard deviation) δ of the work times subjected to the reliability determination by the any reliability determination means set to ∞ and with the weighting factor $w_i$ for the average value $x_i$ of the work times subjected to the reliability determination by this reliability determination means set to 0.

[Formula 2]

$$x_{wav} = \frac{\sum_{i=1}^{n} w_i x_i}{\sum_{i=1}^{n} w_i} \quad (2)$$

Note that the work times of each work content which are newly measured in this update and the standard work time updated based on these work times are stored in the storage unit 21 as a database used for the next standard work time update. At this time, data of the work time deviating from the predetermined range, data of the work time exceeding the predetermined value, and the like are also stored in the storage unit 21.

As described above, the standard work time updating system of Embodiment 1 is a standard work time updating system having a configuration in which the workers 15 declare the work time points of the work contents performed by the workers 15 in the work areas 12A to 12E in the station 11 by using the declaring means (PDAs 16) and the standard work times of the respective work contents are updated based on the work times obtained from the work time points of the work contents which are declared by the workers 15, characterized in that the system includes the reliability determination means (reliability determination unit 24) for determining whether the work times obtained from the work time points of the work contents which are declared by the workers 15 each deviate from the predetermined range (range of ±3σ) in the distribution of work time data of a corresponding one of the work contents which is stored in a database, when determining that none of the work times (declared work times) deviate from the predetermined range, the reliability determination means updates the standard work times of the work contents to the standard work times calculated based on the work times obtained from the work time points of the work contents which are declared by the workers 15, and when determining that any of the work times (declared work times) deviates from the predetermined range, the reliability determination means does not update the standard work time of the relevant work content. Accordingly, the workers 15 can make declaration without an observer or a classifier. In addition, when a false or erroneous declaration is made by the workers 15, the system can find out this declaration and cancel the update of the standard work time. This prevents the update of the standard work times on the basis of the declaration data of the work time having a low reliability. Hence, the reliability of the update data of the standard work times is improved.

In addition, as described above, the standard work time updating system of Embodiment 1 is a standard work time updating system having a configuration in which the workers 15 declare the work time points of the work contents performed by the workers 15 in the work areas 12A to 12E in the station 11 by using the declaring means (PDAs 16) and the standard work times of the respective work contents are updated based on the work times obtained from the work time points of the work contents which are declared by the workers 15, characterized in that the system includes the reliability determination means (reliability determination unit 24) for determining whether the work times obtained from the work time points of the work contents which are declared by the workers 15 each deviate from the predetermined range (range of ±3σ) in the distribution of work time data of a corresponding one of the work contents which is stored in a database, when determining that none of the work times (declared work times) deviate from the predetermined range, the reliability determination means updates the standard work times of the work contents to the standard work times calculated based on the work times obtained from the work time points of the work contents which are declared by the workers 15, and when determining that any of the work times (declared work times) deviates from the predetermined range, the reliability determination means updates the standard work times of the work contents to the standard work times calculated based on the work times obtained from the work time points of the work contents which are declared by the workers 15, exclusive of the work time determined to deviate from the predetermined range. Accordingly, the workers 15 can make declaration without an observer or a classifier. In addition, when a false or erroneous declaration is made by the workers 15, the system can find out this declaration and update the standard work times after excluding the declaration data of the work time having a low reliability. This prevents the update of the standard work times on the basis of the declaration data of the work time having a low reliability. Hence, the reliability of the update data of the standard work times is improved.

Moreover, the standard work time updating system of Embodiment 1 is a standard work time updating system having a configuration in which the workers 15 declare the work time points of the work contents performed by the workers 15 in the work areas 12A to 12E in the station 11 by using the declaring means (PDAs 16) and the standard work times of the respective work contents are updated based on the work times obtained from the work time points of the work contents which are declared by the workers 15, characterized in that the system includes the reliability determination means (reliability determination unit 24) for determining whether the work times obtained from the work time points of the work contents which are declared by the workers 15 each exceed from a predetermined value (+3σ) in the distribution of work time data of a corresponding one of the work contents which is stored in a database, when determining that none of the work times (declared work times) exceed from the predetermined value, the reliability determination means updates the standard work times of the work contents to the standard work times calculated based on the work times obtained from the work time points of the work contents which are declared by the workers 15, and when determining that any of the work times (declared work times) exceeds from the predetermined value, the reliability determination means does not update the standard work times of the work contents. Accordingly, the workers 15 can make declaration without an observer or a classifier. In addition, when a false or erroneous declaration is made by the workers 15, the system can find out this declaration and update the standard work times after excluding the declaration data of the work time having a low reliability. This prevents the update of the standard work times on the basis of the declaration data of the work time having a low reliability. Hence, the reliability of the update data of the standard work times is improved.

Furthermore, the standard work time updating system of Embodiment 1 is a standard work time updating system having a configuration in which the workers 15 declare the work time points of the work contents performed by the workers 15 in the work areas 12A to 12E in the station 11 by using the declaring means (PDAs 16) and the standard work times of the respective work contents are updated based on the work times obtained from the work time points of the work contents which are declared by the workers 15, characterized in that the system includes the reliability determination means (reliability determination unit 24) for determining whether the work times obtained from the work time points of the work contents which are declared by the workers 15 each exceed from a predetermined value (+3σ) in the distribution of work time data of a corresponding one of the work contents which is stored in a database, when determining that none of the work times (declared work times) exceed from the predetermined value, the reliability determination means updates the standard work times of the work contents to the standard work times calculated based on the work times obtained from the work time points of the work contents which are declared by the workers 15, and when determining that any of the work times (declared work times) exceeds from the predetermined value, the reliability determination means updates the standard work times of the work contents to the standard work times calculated based on the work times obtained from the work time points of the work contents which are declared by the workers 15, exclusive of the work time determined to exceed the predetermined value. Accordingly, the workers 15 can make declaration without an observer or a classifier. In addition, when a false or erroneous declaration is made by the workers 15, the system can find out this declaration and update the standard work times after excluding the declaration data of the work time having a low reliability. This prevents the update of the standard work times on the basis of the declaration data of the work time having a low reliability. Hence, the reliability of the update data of the standard work times is improved.

Moreover, the standard work time updating system of Embodiment 1 is a standard work time updating system having a configuration in which the workers 15 declare the work time points of the work contents performed by the workers 15 in the work areas 12A to 12E in the station 11 by using the declaring means (PDAs 16) and the standard work times of the respective work contents are updated based on the work times obtained from the work time points of the work contents which are declared by the workers 15, characterized in that the system includes the update processing means (reliability determination unit 24) for calculating the standard work times on the basis of the work times obtained from the work time points of the work contents which are declared by the workers 15 and the work times of the work contents which are stored in the database, and thereby updating the standard work times of the work contents to the calculated standard work times. In this system, even when there is data having a low reliability in the declared work time data of the workers 15, it is possible to reduce the effect of the declared work time data having a low reliability on the update data of the standard work times. This is because the standard work times are calculated by using not only the declared work time data but also the work time data stored in the database. This prevents (reduces) deterioration in reliability of the update data of the standard work times which is caused by the declared data of the work time having a low reliability. Hence, the reliability of the update data of the standard work times is improved.

Furthermore, the standard work time updating system of Embodiment 1 is a standard work time updating system having a configuration in which the workers 15 declare the work time points of the work contents performed by the workers 15 in the work areas 12A to 12E in the station 11 by using the declaring means (PDAs 16) and the standard work times of the respective work contents are updated based on the work times obtained from the work time points of the work contents which are declared by the workers 15, characterized in that the system includes the work area identification means (receivers 13A to 13E and work area identification unit 23) for identifying the work area in which each of the workers 15 exist; and the reliability determination means (reliability determination unit 24) for determining whether the identified work areas identified by the work area identification means coincide with the declared work areas declared by the workers 15 by use of the declaring means, when determining that the identified work areas coincide with the declared work areas, the reliability determination means updates the standard work times of the work contents to the standard work times calculated based on the work times obtained from the work time points of the work contents which are declared by the workers 15, and when determining that any of the identified work areas does not coincide with a corresponding one of the declared work areas, the reliability determination means does not update the standard work time of the relevant work content. Accordingly, the workers 15 can make declaration without an observer or a classifier. In addition, when a false or erroneous declaration is made by the workers 15, the system can find out this declaration and cancel the update of the standard work time. This prevents the update of the standard work times on the basis of the declaration data of the work time having a low reliability. Hence, the reliability of the update data of the standard work times is improved.

In addition, the standard work time updating system of Embodiment 1 is a standard work time updating system having a configuration in which the workers 15 declare the work time points of the work contents performed by the workers 15 in the work areas 12A to 12E in the station 11 by using the declaring means (PDAs 16) and the standard work times of the respective work contents are updated based on the work times obtained from the work time points of the work contents which are declared by the workers 15, characterized in that the system includes: the work area identification means (receivers 13A to 13E and work area identification unit 23) for identifying the work area in which each of the workers 15 exist; and the reliability determination means (reliability determination unit 24) for determining whether the identified work areas identified by the work area identification means coincide with the declared work areas declared by the workers 15 by use of the declaring means, when determining that the identified work areas coincide with the declared work areas, the reliability determination means updates the standard work times of the work contents to the standard work times calculated based on the work times obtained from the work time points of the work contents which are declared by the workers 15, and when determining that any of the identified work areas does not coincide with a corresponding one of the declared work areas, the reliability determination means updates the standard work times of the work contents to the standard work times calculated based on the work times obtained from the work time points of the work contents which are declared by the workers 15, exclusive of the work time for which the identified work area does not coincide with the declared work area. Accordingly, the workers 15 can make declaration without an observer or a classifier. In addition, when a false or erroneous declaration is made by the workers 15, the system can find out this declaration and update the standard work times after excluding the declaration data of the work times having a low reliability. This prevents the update of the standard work times on the basis of the declaration data of the work time having a low reliability. Hence, the reliability of the update data of the standard work times is improved.

The standard work time updating system of Embodiment 1 is characterized in that the work area identification means includes: the receivers 13A to 13E provided respectively in the multiple positions in the station 11 and configured to receive the radio waves transmitted from the declaring means (PDAs 16); and the work area identification unit 23 configured to identify in which of the work areas 12A to 12E each of the workers 15 exists, on the basis of the radio wave reception information from the receivers 13A to 13E. Accordingly, the system can surely identify in which of the work areas 12A to 12E each of the workers 15 exists, with a simple configuration.

Moreover, the standard work time updating system of Embodiment 1 is a standard work time updating system having a configuration in which the workers 15 declare the work time points of the work contents performed by the workers 15 in the work areas 12A to 12E in the station 11 by using the declaring means (PDAs 16) and the standard work times of the respective work contents are updated based on the work times obtained from the work time points of the work contents which are declared by the workers 15, characterized in that the system includes: the multiple reliability determination means (first to third reliability determination means) for determining whether the work times obtained from the work time points of the work contents which are declared by the workers 15 are reliable; and the update processing means (reliability determination unit 24) for calculating the standard work times by performing the weighted average calculation on the average values of the work times subjected to the reliability determination by the multiple reliability determination means and updating the standard work times of the work contents to the calculated standard work times, and, when any of the work times is determined to be unreliable by any of the multiple reliability determination means, the update processing means performs the weighted average calculation with the weighting factor set to 0, the weighting factor being one for the average value of the work times subjected to the reliability determination by the any reliability determination means. Accordingly, the workers 15 can make declaration without an observer or a classifier. In addition, when a false or erroneous declaration is made by the workers 15, the system can find out this declaration by any of the multiple reliability determination means and update the standard work times after excluding the declaration data of the work times having a low reliability. This prevents the update of the standard work times on the basis of the declaration data of the work time point having a low reliability. Hence, the reliability of the update data of the standard work times is improved.

<Embodiment 2>

As shown in part (a) of FIG. 5, an inside of an assembly station 31 in which assembly work of a product such as an aircraft or a ship is performed is divided into multiple (four in the illustrated example) work areas 32A, 32B, 32C, 32D, and 32E for respective multiple work contents. Workers 35 perform work of the work contents in the work areas 32A to 32E.

At this time, in the work areas 32A to 32E, each of the workers 35 operates a PDA 36 (declaring means) carried by the worker 35 to record work time points (work start time point and work completion time point) of the respective work contents in a storage device included in the PDA 36. As shown in Parts (b) and (c) of FIG. 5, the work content, the work time point (work start time point and work completion time point), and the work area are displayed in a display screen 37 of the PDA 36. In addition, operation buttons 38A, 38B, and 38C respectively for start, interruption, and completion of work are also displayed in the display screen 37.

Specifically, when the worker 35 performs touch operation on the start button 38A at the start of the work of a certain work content, the work start time point of the work contents is recorded in the PDA 36 and is displayed in the display screen 37. Moreover, when the worker 35 performs touch operation on the completion button 38C at the completion of the work of a certain work content, the work completion time point of the work content is recorded in the PDA 36 and is displayed in the display screen 37. When the worker 35 performs touch operation on the interruption button 38B for some reason during the work of a certain work content, the recording of the work time point of the work content is cancelled.

In Embodiment 2, multiple RFID (Radio Frequency IDentification) readers 33A, 33B, 33C, 33D, and 33E and a transmitter 34 are installed in the station 31. The RFID readers 33A to 33E are installed respectively in the work areas 32A to 32E and the transmitter 34 is installed in a place other than the work areas 32A to 32E.

Meanwhile, the PDAs 36 carried by the respective workers 35 are each provided with a RFID tag 39 in which identification information (identification information of the PDA 36 and identification information of the worker 35) is recorded for each PDA 36. In the work areas 32A to 32E, when the workers 35 bring the PDAs 36 (RFID tags 39) close to the RFID readers 33A to 33E, the RFID readers 33A to 33E read the identification information which is recorded in the RFID tag 39 for each PDA 36 and transmits the identification information together with work area information to the transmitter 34 wirelessly or by a wire. The transmitter 34 sends the identification information and the work area information to a work time management server (personal computer) 40. Note that the position of each PDA 36 (RFID tag 39) can be measures by disposing multiple antennas in each of the RFID readers 33A to 33E.

As shown in Parts (a) to (c) of FIG. 5 and FIG. 6, information such as the work time points (work start time point and work completion time point) of the work contents recorded by the PDA 36 (i.e. information on the work contents, the work time points, and the work areas declared (transmitted) by the worker 35 by using the PDA 36) is transmitted to the work time management server 40. The work time management server 40 has a storage unit 41 in which work procedures, the work contents, standard work times, the work areas, and the like are stored as a database, a standard work time calculation unit 42, a work area identification unit 43, and a reliability determination unit 44 (reliability determining means, update processing means). Data of the standard work time recorded in the database is calculated for each work content as an average value (or, alternatively, a minimum value, a median value, or the like: see FIG. 4) of the work times, on the basis of data of the past work times of the work content which is stored as the database. Note that, the functions of the standard work time calculation unit 42, the work area identification unit 43, and the reliability determination unit 44 are implemented by software (program) and are executed by a CPU (central processing unit) of the work time management server 40.

The standard work time calculation unit 42 obtains the work time (work completion time point−work start time point) of each work content from the information (i.e. the information on the work content and the work time point) on the work time point (work start time point and work completion time point) of the work content which is inputted from the PDA 36 of each worker 35. The standard work time calculation unit 42 then calculates the average value (or, alternatively, a minimum value, a median value, or the like) of the work times for each work content and sets the calculated value as the standard work time of the work content. In this case, when there is work time data greatly deviating from the average value (i.e. work time data having a low reliability), the average value is greatly affected by this greatly-deviating work time data. In view of this, it is preferable to use the median value which is relatively less affected by the greatly-deviating work time data. Moreover, when the calculated standard work times of the respective work contents are shorter than the standard work times of the work contents which are stored in the storage unit 41 as the database, the standard work time calculation unit 42 outputs the calculated standard work times of the work contents to the reliability determination unit 44 as the standard work times for update. Moreover, the data on the work areas declared (transmitted from the PDAs 36) by the workers 35 is also outputted to the reliability determination unit 44 via the standard work time calculation unit 42.

The work area identification unit 43 identifies in which of the work areas 32A to 32E each of the PDAs 36 (i.e. the positions of the workers 35 carrying the PDAs 36) exists, on the basis of the work area information transmitted from the RFID readers 33A to 33E via the transmitter 34, and then outputs information on the identified work areas to the reliability determination unit 44. Specifically, the RFID tags 39, the RFID readers 33A to 33E, the work area identification unit 43, and the like form work area identification means.

The reliability determination unit 44 determines whether the work times of the work contents which are obtained from the work time points of the work contents declared (transmitted from the PDAs 36) by the workers 35 each deviate from a predetermined range (range of ±3σ in the example of FIG. 3: σ is a standard deviation) in distribution of the work time data of a corresponding one of the work contents which is stored in the database (first reliability determination means). When determining that none of the work times (declared work times) deviate from the predetermined range for each work content, the reliability determination unit 44 updates the standard work times of the work contents to the standard work times of the work contents which is calculated by the standard work time calculation unit 42 and outputs the updated standard work times. Meanwhile, when determining that any of the work times (declared work times) deviates from the predetermined range for any of work contents, the reliability determination unit 44 does not update the standard work time of the relevant work content to the standard work time of the relevant work content which is calculated by the standard work time calculation unit 42 and leaves the standard work time of the relevant work content to be the standard work time of the relevant work content which is recorded as the database.

Moreover, the reliability determination unit 44 determines whether the work areas (actual work areas) identified by the work area identification unit 43 coincide with the work areas declared by the workers 35 (third reliability determination means).

When the work areas identified by the work area identification unit 43 coincide with the work areas declared by the workers 35 in the determination, the information on the work time points declared by the workers 35 is reliable. Accordingly, when determining that the work areas identified by the work area identification unit 43 coincide with the work areas declared by the workers 35, the reliability determination unit 44 updates the standard work times of the work contents to the standard work times of the work contents which are calculated by the standard work time calculation unit 42 and outputs the updated standard work times.

Meanwhile, when any of the work areas identified by the work area identification unit 43 does not coincide with a corresponding one of the work areas declared by the workers 35, the information on the work time point which is related to the non-coincident work area and which is declared by the worker 35 may be a false or erroneous input by the worker 35 and is unreliable. Accordingly, when determining that any of the work areas identified by the work area identification unit 43 does not coincide with the corresponding work area declared by the worker 35, the reliability determination unit 44 does not update the standard work time of the work content related to the non-coincident work area to the standard work time of the work content which is calculated by the standard work time calculation unit 42 and leave the standard work time to be the standard work time of the work content which is recorded as the database.

The following processes may be performed in the reliability determination unit 44 in addition to the processes described above.

For example, the reliability determination unit 44 determines whether the work times of the work contents which are obtained from the work time points of the work contents declared (transmitted from the PDA 36) by the workers 35 each deviate from the predetermined range (range of $\pm 3\sigma$) in distribution of the work time data of a corresponding one of the work contents which is stored in the database (first reliability determination means). When determining that none of the work times (declared work times) deviate from the predetermined range for each work content, the reliability determination unit 44 updates the standard work times of the work contents to the standard work times of the work contents which are calculated by the standard work time calculation unit 42 (i.e. the standard work times calculated based on all of the work times declared for each of the work contents) and outputs the updated standard work times. Meanwhile, when determining that any of the work times (declared work times) deviates from the predetermined range for any of the work contents, the reliability determination unit 44 updates the standard work times of the work contents to the standard work times calculated based on the work times obtained from the work time points of the work contents declared by the workers 35, exclusive of the work time determined to deviate from the predetermined range. The reliability determination unit 44 then outputs the updated standard work time.

Moreover, the following processes may be performed. The reliability determination unit 44 determines whether the work times of the work contents which are obtained from the work time points of the work contents declared (transmitted from the PDAs 36) by the workers 35 each exceed a predetermined value ($+3\sigma$ in the example of FIG. 4: $\sigma$ is a standard deviation) in distribution of the work time data of a corresponding one of the work contents which is stored in the database (second reliability determination means). When determining that none of the work times (declared work times) exceed the predetermined value for each work content, the reliability determination unit 44 updates the standard work times of the work contents to the standard work times of the work contents calculated by the standard work time calculation unit 42 and outputs the updated standard work times. Meanwhile, when determining that any of the work times (declared work times) exceeds the predetermined value for any of the work contents, the reliability determination unit 44 does not update the standard work times of the relevant work content to the standard work time of the relevant work content which is calculated by the standard work time calculation unit 42 and leaves the standard work time to be the standard work time of the relevant work content which is recorded as the database.

Furthermore, the following processes may be performed. The reliability determination unit 44 determines whether the work times of the work contents which are obtained from the work time points of the work contents declared (transmitted from the PDAs 36) by the worker 35 each exceed a predetermined value ($+3\sigma$) in distribution of the work time data of a corresponding one of the work contents which is stored in the database (second reliability determination means). When determining that none of the work times (declared work times) exceed the predetermined value for each work content, the reliability determination unit 44 updates the standard work times of the work contents to the standard work times of the work contents which are calculated by the standard work time calculation unit 42 and outputs the updated standard work times. Meanwhile, when determining that any of the work times (declared work times) exceeds the predetermined value for any of the work contents, the reliability determination unit 44 updates the standard work times of the work contents to the standard work times calculated based on the work times obtained from the work time points of the work contents declared by the workers 35, exclusive of the work time determined to exceed the predetermined value. The reliability determination unit 44 then outputs the updated standard work time.

In addition the following processed may be performed. The reliability determination unit 44 (functioning as the update processing means in this case) calculates the standard work times on the basis of the work times of the work contents which are obtained from the work time points of the work contents declared by the workers 35 and the work times of the work contents which are stored in the database and updates the standard work times of the work contents to the calculated standard work times.

Moreover, the following processes may be performed. The reliability determination unit 44 determines whether the identified work areas identified by the work area identification unit 43 coincide with the declared work areas declared by the workers 35 by use of the declaring means (PDAs 36) (third reliability determination means). When determining that the identified work areas coincide with the declared work areas, the reliability determination unit 44 updates the standard work time of the work contents to the standard work times of the work contents which are calculated by the standard work time calculation unit 42 and outputs the updated standard work times. Meanwhile, when determining that any of the identified work areas does not coincide with a corresponding one of the declared work areas, the reliability determination unit 44 updates the standard work time of the work content related to the non-coincident work area to the standard work time calculated based on the work times obtained from the work time points of the work content declared by the worker 35, exclusive of the work time for which the identified work area does not coincide with the declared work area. The reliability determination unit 44 then outputs the updated standard work time.

Moreover, in the case of simultaneously performing the update processing for the standard work times on the basis of the reliability determinations of the first to third reliability determination means, the processes may be performed, for example, in such a way that the priorities are set for these reliability determination means in advance. When there is a difference in the update data of the standard work time between the first to third reliability determination means, the update data of the standard work time of the reliability determination means with a higher priority is used and the update processing is performed based on this update data. Instead, the update processes may be performed such that the average value, the median value, or the smallest value of the pieces of update data of the standard work time in the first to third reliability determination means is calculated and the update processing is performed based on this calculated value.

Furthermore, in the case of simultaneously performing the reliability determinations of the first to third reliability determination means, standard work times (update data) may be calculated by performing weighted average calculation.

Specifically, the reliability determination unit 44 simultaneously performs: the reliability determination by the first reliability determination means for determining whether the work times of the work contents which are obtained from the work time points of the work contents declared by the workers 35 each deviate from the predetermined range (range of ±3σ) in the distribution of work time data of a corresponding one of the work contents which is stored in the database; the reliability determination by the second reliability determination means for determining whether the work times obtained from the work time points of the work contents declared by the workers 35 each exceed the predetermined value (+3σ) in the distribution of work time data of a corresponding one of the work contents which is stored in the database; and the reliability determination by the third reliability determination means for determining whether the identified work areas which are identified by the work area identification unit 43 and in which the workers 45 exist coincide with the declared work areas declared by the workers 35 by use of the declaring means (PDAs 36).

Then, the reliability determination unit 44 calculates the standard work times by performing the weighted average calculation on the average values of the work times subjected to the reliability determinations by the first to third reliability determination means and updates the standard work time of the work contents to the calculated standard work times. Moreover, when determining that any of the work times is unreliable by any of the first to third reliability determination means, the reliability determination unit 44 performs the weighted average calculation with a weighting factor set to 0, the weighting factor being one for the average value of the work times subjected to the reliability determination by the any reliability determination means.

Specifically, in the first reliability determination means, when any of the work times of the work contents which are obtained from the work time points of the work contents declared by the workers 35 is determined to deviate from the predetermined range (range of ±3σ) in the distribution of work time data of a corresponding one of the work contents which is stored in the database, the weighted average calculation for updating the standard work time of the relevant work content is performed with the weighting factor set to 0, the weighting factor being one for the average value of the work times (declared work times) of the relevant work content which are subjected to the reliability determination by the first reliability determination means. In the second reliability determination means, when any of the work times which are obtained from the work time points of the work contents declared by the workers 35 is determined to exceed the predetermined value (+3σ) in the distribution of work time data of a corresponding one of the work contents which is stored in the database, the weighted average calculation for updating the standard work time of the relevant work content is performed with the weighting factor set to 0, the weighting factor being one for the average value of the work times (declared work times) of the relevant work content which are subjected to the reliability determination by the second reliability determination means. In the third reliability determination means, when any of the identified work areas which are identified by the work area identification unit 43 and in which the workers 35 exist is determined to not coincide with a corresponding one of the declared work areas declared by the workers 35 by use of the declaring means (PDAs 36), the weighted average calculation for updating the standard work time of the relevant work content is performed with the weighting factor set to 0, the weighting factor being one for the average value of the work times (declared work times) of the relevant work content which are subjected to the reliability determination by the third reliability determination means.

A specific example is described in further detail. When data of the work times (declared work times) of each of the work contents which are subjected to the reliability determination by the first to third reliability determination means is $x_i \pm \delta_i$, the weighting factor $w_i$ for the average value $x_i$ of the work times subjected to the reliability determination by the first to third reliability determination means is obtained by using Formula (1) shown above. Then, the weighted average calculation is performed by using, for example, Formula (2) shown above on the average value $x_i$ of the work times of each work content which are subjected to the reliability determination by each of the first to third reliability determination means and the standard work time (weighted average value) $x_{wav}$ is thereby calculated. The standard work time of each work content is then updated to the calculated standard work time $x_{wav}$. Moreover, when any of the work times is determined to be unreliable by any of the first to third reliability determination means at this time, the weighted average calculation is performed with the scattering (standard deviation) $\delta$ of the work times subjected to the reliability determination by the any reliability determination means set to ∞ and with the weighting factor $w_i$ for the average value $x_i$ of the work times subjected to the reliability determination by this reliability determination means set to 0.

Note that the work times of each work content which are newly measured in this update and the standard work time updated based on these work times are stored in the storage unit 41 as a database used for the next standard work time update. At this time, data of the work time deviating from the predetermined range, data of the work time exceeding the predetermined value, and the like are also stored in the storage unit 41.

As described above, the standard work time updating system of Embodiment 2 is a standard work time updating system having a configuration in which the workers 35 declare the work time points of the work contents performed by the workers 35 in the work areas 32A to 32E in the station 11 by using the declaring means (PDAs 36) and the standard work times of the respective work contents are updated based on the work times obtained from the work time points of the work contents which are declared by the workers 35, characterized in that the system includes the reliability determination means (reliability determination unit 44) for determining whether the work times obtained from the work time points of the work contents which are declared by the workers 35 each deviate from the predetermined range (range of ±3σ) in the distribution of work time data of a corresponding one of the work contents which is stored in a database, when determining that none of the work times (declared work times) deviate from the predetermined range, the reliability determination means updates the standard work times of the work contents to the standard work times of the work contents calculated based on the work times obtained from the work time points of the work contents which are declared by the workers 35, and when determining that any of the work times (declared work times) deviates from the predetermined range, the reliability determination means does not update the standard work time of the relevant work content. Accordingly, the workers 35 can make declaration without an observer or a classifier. In addition, when a false or erroneous declaration is made by the workers 35, the system can find out this declaration and cancel the update of the standard work time. This prevents the update of the standard work times on the basis of the declaration data of the work time having a low reliability. Hence, the reliability of the update data of the standard work times is improved.

In addition, as described above, the standard work time updating system of Embodiment 2 is a standard work time updating system having a configuration in which the workers 35 declare the work time points of the work contents performed by the workers 35 in the work areas 32A to 32E in the station 31 by using the declaring means (PDAs 36) and the standard work times of the respective work contents are updated based on the work times obtained from the work time points of the work contents which are declared by the workers 35, characterized in that the system includes the reliability determination means (reliability determination unit 44) for determining whether the work times obtained from the work time points of the work contents which are declared by the workers 35 each deviate from the predetermined range (range of ±3σ) in the distribution of work time data of a corresponding one of the work contents which is stored in a database, when determining that none of the work times (declared work times) deviate from the predetermined range, the reliability determination means updates the standard work times of the work contents to the standard work times calculated based on the work times obtained from the work time points of the work contents which are declared by the workers 35, and when determining that any of the work times (declared work times) deviates from the predetermined range, the reliability determination means updates the standard work times of the work contents to the standard work times calculated based on the work times obtained from the work time points of the work contents which are declared by the workers 35, exclusive of the work time determined to deviate from the predetermined range. Accordingly, the workers 35 can make declaration without an observer or a classifier. In addition, when a false or erroneous declaration is made by the workers 35, the system can find out this declaration and update the standard work times after excluding the declaration data of the work time having a low reliability. This prevents the update of the standard work times on the basis of the declaration data of the work time having a low reliability. Hence, the reliability of the update data of the standard work times is improved.

Furthermore, the standard work time updating system of Embodiment 2 is a standard work time updating system having a configuration in which the workers 35 declare the work time points of the work contents performed by the workers 35 in the work areas 32A to 32E in the station 31 by using the declaring means (PDAs 36) and the standard work times of the respective work contents are updated based on the work times obtained from the work time points of the work contents which are declared by the workers 35, characterized in that the system includes the reliability determination means (reliability determination unit 44) for determining whether the work times obtained from the work time points of the work contents which are declared by the workers 35 each exceed the predetermined value (+3σ) in the distribution of work time data of a corresponding one of the work contents which is stored in the database, when determining that none of the work times (declared work times) exceed the predetermined value, the reliability determination means updates the standard work times of the work contents to the standard work times calculated based on the work times obtained from the work time points of the work contents which are declared by the workers 35, and when determining that any of the work times (declared work time) exceeds the predetermined value, the reliability determination means does not update the standard work time of the relevant work content. Accordingly, the workers 35 can make declaration without an observer or a classifier. In addition, when a false or erroneous declaration is made by the workers 35, the system can find out this declaration and cancel the update of the standard work time. This prevents the update of the standard work times on the basis of the declaration data of the work time having a low reliability. Hence, the reliability of the update data of the standard work times is improved.

Furthermore, the standard work time updating system of Embodiment 2 is a standard work time updating system having a configuration in which the workers 35 declare the work time points of the work contents performed by the workers 35 in the work areas 32A to 32E in the station 31 by using the declaring means (PDAs 36) and the standard work times of the respective work contents are updated based on the work times obtained from the work time points of the work contents which are declared by the workers 35, characterized in that the system includes the reliability determination means (reliability determination unit 44) for determining whether the work times obtained from the work time points of the work contents which are declared by the workers 35 each exceed from the predetermined value (+3σ) in the distribution of work time data of a corresponding one of the work contents which is stored in a database, when determining that none of the work times (declared work times) exceed from the predetermined value, the reliability determination means updates the standard work times of the work contents to the standard work times calculated based on the work times obtained from the work time points of the work contents which are declared by the workers 35, and when determining that any of the work times (declared work times) exceeds from the predetermined value, the reliability determination means updates the standard work times of the work contents to the standard work times calculated based on the work times obtained from the work time points of the work contents which are declared by the workers 35, exclusive of the work time determined to exceed the predetermined value. Accordingly, the workers 35 can make declaration without an observer or a classifier. In addition, when a false or erroneous declaration is made by the workers 35, the system can find out this declaration and update the standard work times after excluding the declaration data of the work time having a low reliability. This prevents the update of the standard work times on the basis of the declaration data of the work time having a low reliability. Hence, the reliability of the update data of the standard work times is improved.

Moreover, the standard work time updating system of Embodiment 2 is a standard work time updating system having a configuration in which the workers 35 declare the work time points of the work contents performed by the workers 35 in the work areas 32A to 32E in the station 31 by using the declaring means (PDAs 36) and the standard work times of the respective work contents are updated based on the work times obtained from the work time points of the work contents which are declared by the workers 35, characterized in that the system includes the update processing means (reliability determination unit 44) for calculating the standard work times on the basis of the work times obtained from the work time points of the work contents which are declared by the workers 35 and the work times of the work contents which are stored in the database, and thereby updating the standard work times of the work contents to the calculated standard work times. In this system, even when there is data having a low reliability in the declared work time data of the workers 35, it is possible to reduce the effect of the declared work time data having a low reliability on the update data of the standard work times. This is because the standard work times are calculated by using not only the declared work time data but also the work time data stored in the database. This prevents (reduces) deterioration in reliability of the update data of the standard work times which is caused by the declared data of the work time having a low reliability. Hence, the reliability of the update data of the standard work times is improved.

Furthermore, the standard work time updating system of Embodiment 2 is a standard work time updating system having a configuration in which the workers 35 declare the work time points of the work contents performed by the workers 35 in the work areas 32A to 32E in the station 31 by using the declaring means (PDAs 36) and the standard work times of the respective work contents are updated based on the work times obtained from the work time points of the work contents which are declared by the workers 35, characterized in that the system includes: the work area identification means (RFID tag 39, RFID readers 33A to 33E and work area identification unit 43) for identifying the work area in which each of the workers 35 exist; and the reliability determination means (reliability determination unit 44) for determining whether the identified work areas identified by the work area identification means coincide with the declared work areas declared by the workers 35 by use of the declaring means, when determining that the identified work areas coincide with the declared work areas, the reliability determination means updates the standard work times of the work contents to the standard work times calculated based on the work times obtained from the work time points of the work contents which are declared by the workers 35, and when determining that any of the identified work areas does not coincide with a corresponding one of the declared work areas, the reliability determination means does not update the standard work time of the relevant work content. Accordingly, the workers 35 can make declaration without an observer or a classifier. In addition, when a false or erroneous declaration is made by the workers 35, the system can find out this declaration and cancel the update of the standard work time. This prevents the update of the standard work times on the basis of the declaration data of the work time having a low reliability. Hence, the reliability of the update data of the standard work times is improved.

In addition, the standard work time updating system of Embodiment 2 is a standard work time updating system having a configuration in which the workers 35 declare the work time points of the work contents performed by the workers 35 in the work areas 32A to 32E in the station 31 by using the declaring means (PDAs 36) and the standard work times of the respective work contents are updated based on the work times obtained from the work time points of the work contents which are declared by the workers 35, characterized in that the system includes: the work area identification means (RFID tag 39, RFID readers 33A to 33E and work area identification unit 43) for identifying the work area in which each of the workers 35 exist; and the reliability determination means (reliability determination unit 44) for determining whether the identified work areas identified by the work area identification means coincide with the declared work areas declared by the workers 35 by use of the declaring means, when determining that the identified work areas coincide with the declared work areas, the reliability determination means updates the standard work times of the work contents to the standard work times calculated based on the work times obtained from the work time points of the work contents which are declared by the workers 35, and when determining that any of the identified work areas does not coincide with a corresponding one of the declared work areas, the reliability determination means updates the standard work times of the work contents to the standard work times calculated based on the work times obtained from the work time points of the work contents which are declared by the workers 35, exclusive of the work time for which the identified work area does not coincide with the declared work area. Accordingly, the workers 35 can make declaration without an observer or a classifier. In addition, when a false or erroneous declaration is made by the workers 35, the system can find out this declaration and update the standard work times after excluding the declaration data of the work times having a low reliability. This prevents the update of the standard work times on the basis of the declaration data of the work time having a low reliability. Hence, the reliability of the update data of the standard work times is improved.

The standard work time updating system of Embodiment 2 is characterized in that the work area identification means includes: the RFID tags 39 provided respectively in the declaring means (PDAs 36); the RFID readers 33A to 33E installed respectively in the work areas 32A to 32E and configured to read the records of the RFID tags 39 and to transmit the work area information; and the work area identification unit 43 configured to identify in which of the work areas 32A to 32E each of the workers 35 exists, on the basis of the work area information transmitted from the RFID readers 33A to 33E. Accordingly, the system can surely identify in which of the work areas 32A to 32E each of the workers 35 exists, with a simple configuration.

Moreover, the standard work time updating system of Embodiment 2 is a standard work time updating system having a configuration in which the workers 35 declare the work time points of the work contents performed by the workers 35 in the work areas 32A to 32E in the station 31 by using the declaring means (PDAs 36) and the standard work times of the respective work contents are updated based on the work times obtained from the work time points of the work contents which are declared by the workers 35, characterized in that the system includes: the multiple reliability determination means (first to third reliability determination means) for determining whether the work times obtained from the work time points of the work contents which are declared by the workers 35 are reliable; and the update processing means (reliability determination unit 44) for calculating the standard work times by performing the weighted average calculation on the average values of the work times subjected to the reliability determination by the multiple reliability determination means and updating the standard work times of the work contents to the calculated standard work times, and, when any of the work times is determined to be unreliable by any of the multiple reliability determination means, the update processing means performs the weighted average calculation with the weighting factor set to 0, the weighting factor being one for the average value of the work times subjected to the reliability determination by the any reliability determination means. Accordingly, the workers 35 can make declaration without an observer or a classifier. In addition, when a false or erroneous declaration is made by the workers 35, the system can find out this declaration by any of the multiple reliability determination means and update the standard work times after excluding the declaration data of the work times having a low reliability. This prevents the update of the standard work times on the basis of the declaration data of the work time point having a low reliability. Hence, the reliability of the update data of the standard work times is improved.

<Embodiment 3>

As shown in part (a) of FIG. 7, an inside of an assembly station 51 in which assembly work of a product such as an aircraft or a ship is performed is divided into multiple (four in the illustrated example) work areas 52A, 52B, 52C, 52D, and 52E for respective multiple work contents. Workers 55 perform work of the work contents in the work areas 52A to 52E.

At this time, in the work areas 52A to 52E, each of the workers 55 operates a PDA 56 (declaring means) carried by the worker 55 to record work time points (work start time point and work completion time point) of the respective work contents in a storage device included in the PDA 56. As shown in Parts (b) and (c) of FIG. 7, the work content, the work time point (work start time point and work completion time point), and the work area are displayed in a display screen 57 of the PDA 56. In addition, operation buttons 58A, 58B, and 58C respectively for start, interruption, and completion of work are also displayed in the display screen 57.

Specifically, when the worker 55 performs touch operation on the start button 58A at the start of the work of a certain work content, the work start time point of the work contents is recorded in the PDA 56 and is displayed in the display screen 57. Moreover, when the worker 55 performs touch operation on the completion button 58C at the completion of the work of a certain work content, the work completion time point of the work content is recorded in the PDA 56 and is displayed in the display screen 57. When the worker 55 performs touch operation on the interruption button 58B for some reason during the work of a certain work content, the recording of the work time point of the work content is cancelled.

In Embodiment 3, multiple receivers 53A, 53B, 53C, 53D, and 53E and a transmitter 54 are installed in the station 51. The receivers 53A to 53E are installed respectively in the work areas 52A to 52E and the transmitter 54 is installed in a place other than the work areas 52A to 52E.

The photoelectric sensors 53A to 53E detect the workers 55 entering the work areas 52A to 52E from entrances of the work areas 52A to 52E and transmit worker detection information to the transmitter 54 wirelessly or by a wire. The transmitter 54 sends the worker detection information to a work time management server (personal computer) 60. The method using the photoelectric sensors 53A to 53E at the work area entrances as described above is effective when the workers 55 enter the work areas 52A to 52E one at a time and perform work. The photoelectric sensors 53A to 53E may be installed on any of the top, bottom, right, or left of the entrances of the work areas 52A to 52B. Moreover, the illumination direction of the light from the photoelectric sensors 53A to 53E to the workers 55 may be vertical, horizontal, or oblique.

Figure 8:
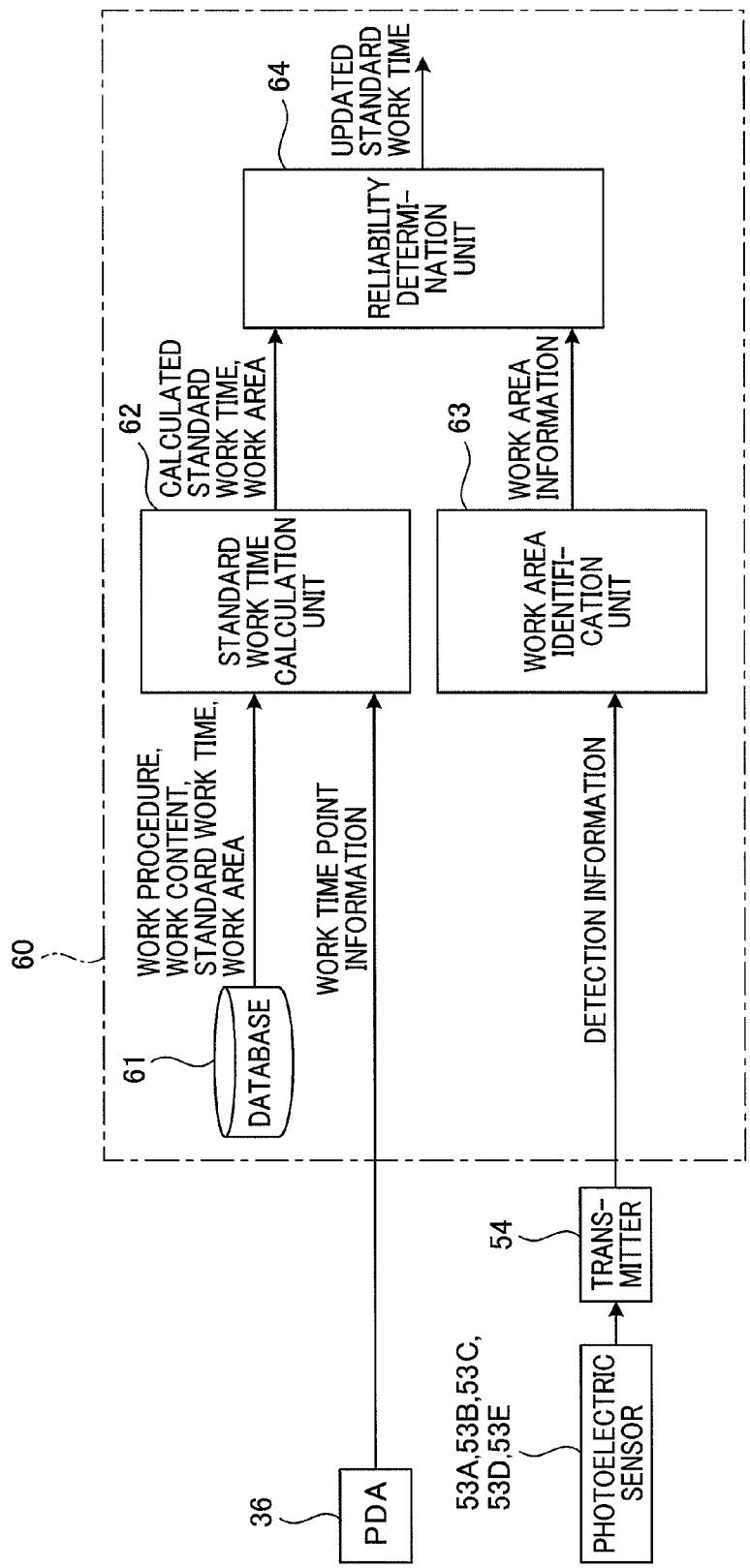
FIG. 8 is a block diagram of the standard work time updating system in Embodiment 3 of the present invention.

As shown in Parts (a) to (c) of FIG. 7 and FIG. 8, information such as the work time points (work start time point and work completion time point) of the work contents recorded by the PDA 56 (i.e. information on the work contents, the work time points, and the work areas declared (transmitted) by the worker 55 by using the PDA 56) is transmitted to the work time management server 60. The work time management server 60 has a storage unit 61 in which work procedures, the work contents, standard work times, the work areas, and the like are stored as a database, a standard work time calculation unit 62, a work area identification unit 63, and a reliability determination unit 64 (reliability determining means, update processing means). Data of the standard work time recorded in the database is calculated for each work content as an average value (or, alternatively, a minimum value, a median value, or the like: see FIG. 4) of the work times, on the basis of data of the past work times of the work content which is stored as the database. Note that, the functions of the standard work time calculation unit 62, the work area identification unit 63, and the reliability determination unit 64 are implemented by software (program) and are executed by a CPU (central processing unit) of the work time management server 60.

The standard work time calculation unit 62 obtains the work time (work completion time point–work start time point) of each work content from the information (i.e. the information on the work content and the work time point) on the work time point (work start time point and work completion time point) of the work content which is inputted from the PDA 56 of each worker 55. The standard work time calculation unit 62 then calculates the average value (or, alternatively, a minimum value, a median value, or the like) of the work times for each work content and sets the calculated value as the standard work time of the work content. In this case, when there is work time data greatly deviating from the average value (i.e. work time data having a low reliability), the average value is greatly affected by this greatly-deviating work time data. In view of this, it is preferable to use the median value which is relatively less affected by the greatly-deviating work time data. Moreover, when the calculated standard work times of the respective work contents are shorter than the standard work times of the work contents which are stored in the storage unit 61 as the database, the standard work time calculation unit 62 outputs the calculated standard work times of the work contents to the reliability determination unit 64 as the standard work times for update. Moreover, the data on the work areas declared (transmitted from the PDAs 56) by the workers 55 is also outputted to the reliability determination unit 64 via the standard work time calculation unit 62.

The work area identification unit 63 identifies in which of the work areas 52A to 52E each of the workers 55 exists, on the basis of the worker detection information transmitted from the photoelectric sensors 53A to 53E via the transmitter 54, and then outputs information on the identified work areas to the reliability determination unit 64. In other words, the photoelectric sensors 53A to 53E, the work area identification unit 63, and the like form the work area identification means.

The reliability determination unit 64 determines whether the work times of the work contents which are obtained from the work time points of the work contents declared (transmitted from the PDAs 56) by the workers 55 each deviate from a predetermined range (range of ±3σ in the example of FIG. 3: σ is a standard deviation) in distribution of the work time data of a corresponding one of the work contents which is stored in the database (first reliability determination means). When determining that none of the work times (declared work times) deviate from the predetermined range for each work content, the reliability determination unit 64 updates the standard work times of the work contents to the standard work times of the work contents which is calculated by the standard work time calculation unit 62 and outputs the updated standard work times. Meanwhile, when determining that any of the work times (declared work times) deviates from the predetermined range for any of work contents, the reliability determination unit 64 does not update the standard work time of the relevant work content to the standard work time of the relevant work content which is calculated by the standard work time calculation unit 62 and leaves the standard work time of the relevant work content to be the standard work time of the relevant work content which is recorded as the database.

Moreover, the reliability determination unit 64 determines whether the work areas (actual work areas) identified by the work area identification unit 63 coincide with the work areas declared by the workers 55 (third reliability determination means).

When the work areas identified by the work area identification unit 63 coincide with the work areas declared by the workers 55 in the determination, the information on the work time points declared by the workers 55 is reliable. Accordingly, when determining that the work areas identified by the work area identification unit 63 coincide with the work areas declared by the workers 55, the reliability determination unit 64 updates the standard work times of the work contents to the standard work times of the work contents which are calculated by the standard work time calculation unit 62 and outputs the updated standard work times.

Meanwhile, when any of the work areas identified by the work area identification unit 63 does not coincide with a corresponding one of the work areas declared by the workers 55, the information on the work time point which is related to the non-coincident work area and which is declared by the worker 55 may be a false or erroneous input by the worker 55 and is unreliable. Accordingly, when determining that any of the work areas identified by the work area identification unit 63 does not coincide with the corresponding work area declared by the worker 55, the reliability determination unit 64 does not update the standard work time of the work content related to the non-coincident work area to the standard work time of the work content which is calculated by the standard work time calculation unit 62 and leave the standard work time to be the standard work time of the work content which is recorded as the database.

The following processes may be performed in the reliability determination unit 64 in addition to the processes described above.

For example, the reliability determination unit 64 determines whether the work times of the work contents which are obtained from the work time points of the work contents declared (transmitted from the PDA 56) by the workers 55 each deviate from the predetermined range (range of ±3σ) in distribution of the work time data of a corresponding one of the work contents which is stored in the database (first reliability determination means). When determining that none of the work times (declared work times) deviate from the predetermined range for each work content, the reliability determination unit 64 updates the standard work times of the work contents to the standard work times of the work contents which are calculated by the standard work time calculation unit 62 (i.e. the standard work times calculated based on all of the work times declared for each of the work contents) and outputs the updated standard work times. Meanwhile, when determining that any of the work times (declared work times) deviates from the predetermined range for any of the work contents, the reliability determination unit 64 updates the standard work times of the work contents to the standard work times calculated based on the work times obtained from the work time points of the work contents declared by the workers 55, exclusive of the work time determined to deviate from the predetermined range. The reliability determination unit 64 then outputs the updated standard work time.

Moreover, the following processes may be performed. The reliability determination unit 64 determines whether the work times of the work contents which are obtained from the work time points of the work contents declared (transmitted from the PDAs 56) by the workers 55 each exceed a predetermined value (+3σ in the example of FIG. 4: σ is a standard deviation) in distribution of the work time data of a corresponding one of the work contents which is stored in the database (second reliability determination means). When determining that none of the work times (declared work times) exceed the predetermined value for each work content, the reliability determination unit 64 updates the standard work times of the work contents to the standard work times of the work contents calculated by the standard work time calculation unit 62 and outputs the updated standard work times. Meanwhile, when determining that any of the work times (declared work times) exceeds the predetermined value for any of the work contents, the reliability determination unit 64 does not update the standard work times of the relevant work content to the standard work time of the relevant work content which is calculated by the standard work time calculation unit 62 and leaves the standard work time to be the standard work time of the relevant work content which is recorded as the database.

Furthermore, the following processes may be performed. The reliability determination unit 64 determines whether the work times of the work contents which are obtained from the work time points of the work contents declared (transmitted from the PDAs 56) by the worker 15 each exceed a predetermined value (+3σ) in distribution of the work time data of a corresponding one of the work contents which is stored in the database (second reliability determination means). When determining that none of the work times (declared work times) exceed the predetermined value for each work content, the reliability determination unit 64 updates the standard work times of the work contents to the standard work times of the work contents which are calculated by the standard work time calculation unit 62 and outputs the updated standard work times. Meanwhile, when determining that any of the work times (declared work times) exceeds the predetermined value for any of the work contents, the reliability determination unit 64 updates the standard work times of the work contents to the standard work times calculated based on the work times obtained from the work time points of the work contents declared by the workers 55, exclusive of the work time determined to exceed the predetermined value. The reliability determination unit 64 then outputs the updated standard work time.

In addition the following processed may be performed. The reliability determination unit 64 (functioning as the update processing means in this case) calculates the standard work times on the basis of the work times of the work contents which are obtained from the work time points of the work contents declared by the workers 55 and the work times of the work contents which are stored in the database and updates the standard work times of the work contents to the calculated standard work times.

Moreover, the following processes may be performed. The reliability determination unit 64 determines whether the identified work areas identified by the work area identification unit 63 coincide with the declared work areas declared by the workers 55 by use of the declaring means (PDAs 56) (third reliability determination means). When determining that the identified work areas coincide with the declared work areas, the reliability determination unit 64 updates the standard work time of the work contents to the standard work times of the work contents which are calculated by the standard work time calculation unit 62 and outputs the updated standard work times. Meanwhile, when determining that any of the identified work areas does not coincide with a corresponding one of the declared work areas, the reliability determination unit 64 updates the standard work time of the work content related to the non-coincident work area to the standard work time calculated based on the work times obtained from the work time points of the work content declared by the worker 55, exclusive of the work time for which the identified work area does not coincide with the declared work area. The reliability determination unit 64 then outputs the updated standard work time.

Moreover, in the case of simultaneously performing the update processing for the standard work times on the basis of the reliability determinations of the first to third reliability determination means, the processes may be performed, for example, in such a way that the priorities are set for these reliability determination means in advance. When there is a difference in the update data of the standard work time between the first to third reliability determination means, the update data of the standard work time of the reliability determination means with a higher priority is used and the update processing is performed based on this update data. Instead, the update processes may be performed such that the average value, the median value, or the smallest value of the pieces of update data of the standard work time in the first to third reliability determination means is calculated and the update processing is performed based on this calculated value.

Furthermore, in the case of simultaneously performing the reliability determinations of the first to third reliability determination means, standard work times (update data) may be calculated by performing weighted average calculation.

Specifically, the reliability determination unit 64 simultaneously performs: the reliability determination by the first reliability determination means for determining whether the work times of the work contents which are obtained from the work time points of the work contents declared by the workers 55 each deviate from the predetermined range (range of ±3σ) in the distribution of work time data of a corresponding one of the work contents which is stored in the database; the reliability determination by the second reliability determination means for determining whether the work times obtained from the work time points of the work contents declared by the workers 55 each exceed the predetermined value (+3σ) in the distribution of work time data of a corresponding one of the work contents which is stored in the database; and the reliability determination by the third reliability determination means for determining whether the identified work areas which are identified by the work area identification unit 63 and in which the workers 55 exist coincide with the declared work areas declared by the workers 55 by use of the declaring means (PDAs 56).

Then, the reliability determination unit 64 calculates the standard work times by performing the weighted average calculation on the average values of the work times subjected to the reliability determinations by the first to third reliability determination means and updates the standard work time of the work contents to the calculated standard work times. Moreover, when determining that any of the work times is unreliable by any of the first to third reliability determination means, the reliability determination unit 24 performs the weighted average calculation with a weighting factor set to 0, the weighting factor being one for the average value of the work times subjected to the reliability determination by the any reliability determination means.

Specifically, in the first reliability determination means, when any of the work times of the work contents which are obtained from the work time points of the work contents declared by the workers 55 is determined to deviate from the predetermined range (range of ±3σ) in the distribution of work time data of a corresponding one of the work contents which is stored in the database, the weighted average calculation for updating the standard work time of the relevant work content is performed with the weighting factor set to 0, the weighting factor being one for the average value of the work times (declared work times) of the relevant work content which are subjected to the reliability determination by the first reliability determination means. In the second reliability determination means, when any of the work times which are obtained from the work time points of the work contents declared by the workers 55 is determined to exceed the predetermined value (+3σ) in the distribution of work time data of a corresponding one of the work contents which is stored in the database, the weighted average calculation for updating the standard work time of the relevant work content is performed with the weighting factor set to 0, the weighting factor being one for the average value of the work times (declared work times) of the relevant work content which are subjected to the reliability determination by the second reliability determination means. In the third reliability determination means, when any of the identified work areas which are identified by the work area identification unit 63 and in which the workers 55 exist is determined to not coincide with a corresponding one of the declared work areas declared by the workers 55 by use of the declaring means (PDAs 56), the weighted average calculation for updating the standard work time of the relevant work content is performed with the weighting factor set to 0, the weighting factor being one for the average value of the work times (declared work times) of the relevant work content which are subjected to the reliability determination by the third reliability determination means.

A specific example is described in further detail. When data of the work times (declared work times) of each of the work contents which are subjected to the reliability determination by the first to third reliability determination means is $x_i \pm \delta_i$, the weighting factor $w_i$ for the average value $x_i$ of the work times subjected to the reliability determination by the first to third reliability determination means is obtained by using Formula (1) shown above. Then, the weighted average calculation is performed by using, for example, Formula (2) shown above on the average value $x_i$ of the work times of each work content which are subjected to the reliability determination by each of the first to third reliability determination means and the standard work time (weighted average value) $x_{wav}$ is thereby calculated. The standard work time of each work content is then updated to the calculated standard work time $x_{wav}$. Moreover, when any of the work times is determined to be unreliable by any of the first to third reliability determination means at this time, the weighted average calculation is performed with the scattering (standard deviation) $\delta$ of the work times subjected to the reliability determination by the any reliability determination means set to $\infty$ and with the weighting factor $w_i$ for the average value $x_i$ of the work times subjected to the reliability determination by this reliability determination means set to 0.

Note that the work times of each work content which are newly measured in this update and the standard work time updated based on these work times are stored in the storage unit 61 as a database used for the next standard work time update. At this time, data of the work time deviating from the predetermined range, data of the work time exceeding the predetermined value, and the like are also stored in the storage unit 41.

As described above, the standard work time updating system of Embodiment 3 is a standard work time updating system having a configuration in which the workers 55 declare the work time points of the work contents performed by the workers 55 in the work areas 52A to 52E in the station 51 by using the declaring means (PDAs 56) and the standard work times of the respective work contents are updated based on the work times obtained from the work time points of the work contents which are declared by the workers 55, characterized in that the system includes the reliability determination means (reliability determination unit 64) for determining whether the work times obtained from the work time points of the work contents which are declared by the workers 55 each deviate from the predetermined range (range of $\pm 3\sigma$) in the distribution of work time data of a corresponding one of the work contents which is stored in a database, when determining that none of the work times (declared work times) deviate from the predetermined range, the reliability determination means updates the standard work times of the work contents to the standard work times of the work contents calculated based on the work times obtained from the work time points of the work contents which are declared by the workers 55, and when determining that any of the work times (declared work times) deviates from the predetermined range, the reliability determination means does not update the standard work time of the relevant work content. Accordingly, the workers 55 can make declaration without an observer or a classifier. In addition, when a false or erroneous declaration is made by the workers 55, the system can find out this declaration and cancel the update of the standard work time. This prevents the update of the standard work times on the basis of the declaration data of the work time having a low reliability. Hence, the reliability of the update data of the standard work times is improved.

In addition, as described above, the standard work time updating system of Embodiment 3 is a standard work time updating system having a configuration in which the workers 55 declare the work time points of the work contents performed by the workers 55 in the work areas 52A to 52E in the station 51 by using the declaring means (PDAs 56) and the standard work times of the respective work contents are updated based on the work times obtained from the work time points of the work contents which are declared by the workers 55, characterized in that the system includes the reliability determination means (reliability determination unit 64) for determining whether the work times obtained from the work time points of the work contents which are declared by the workers 55 each deviate from the predetermined range (range of $\pm 3\sigma$) in the distribution of work time data of a corresponding one of the work contents which is stored in a database, when determining that none of the work times (declared work times) deviate from the predetermined range, the reliability determination means updates the standard work times of the work contents to the standard work times calculated based on the work times obtained from the work time points of the work contents which are declared by the workers 55, and when determining that any of the work times (declared work times) deviates from the predetermined range, the reliability determination means updates the standard work times of the work contents to the standard work times calculated based on the work times obtained from the work time points of the work contents which are declared by the workers 55, exclusive of the work time determined to deviate from the predetermined range. Accordingly, the workers 55 can make declaration without an observer or a classifier. In addition, when a false or erroneous declaration is made by the workers 55, the system can find out this declaration and update the standard work times after excluding the declaration data of the work time having a low reliability. This prevents the update of the standard work times on the basis of the declaration data of the work time having a low reliability. Hence, the reliability of the update data of the standard work times is improved.

Moreover, the standard work time updating system of Embodiment 3 is a standard work time updating system having a configuration in which the workers 55 declare the work time points of the work contents performed by the workers 55 in the work areas 52A to 52E in the station 51 by using the declaring means (PDAs 56) and the standard work times of the respective work contents are updated based on the work times obtained from the work time points of the work contents which are declared by the workers 55, characterized in that the system includes the reliability determination means (reliability determination unit 64) for determining whether the work times obtained from the work time points of the work contents which are declared by the workers 55 each exceed from the predetermined value ($+3\sigma$) in the distribution of work time data of a corresponding one of the work contents which is stored in a database, when determining that none of the work times (declared work times) exceed from the predetermined value, the reliability determination means updates the standard work times of the work contents to the standard work times calculated based on the work times obtained from the work time points of the work contents which are declared by the workers 55, and when determining that any of the work times (declared work times) exceeds from the predetermined value, the reliability determination means does not update the standard work times of the work contents. Accordingly, the workers 55 can make declaration without an observer or a classifier. In addition, when a false or erroneous declaration is made by the workers 55, the system can find out this declaration and update the standard work times after excluding the declaration data of the work time having a low reliability. This prevents the update of the standard work times on the basis of the declaration data of the work time having a low reliability. Hence, the reliability of the update data of the standard work times is improved.

Furthermore, the standard work time updating system of Embodiment 3 is a standard work time updating system having a configuration in which the workers 55 declare the work time points of the work contents performed by the workers 55 in the work areas 52A to 52E in the station 51 by using the declaring means (PDAs 56) and the standard work times of the respective work contents are updated based on the work times obtained from the work time points of the work contents which are declared by the workers 55, characterized in that the system includes the reliability determination means (reliability determination unit 64) for determining whether the work times obtained from the work time points of the work contents which are declared by the workers 55 each exceed from the predetermined value (+3σ) in the distribution of work time data of a corresponding one of the work contents which is stored in a database, when determining that none of the work times (declared work times) exceed from the predetermined value, the reliability determination means updates the standard work times of the work contents to the standard work times calculated based on the work times obtained from the work time points of the work contents which are declared by the workers 55, and when determining that any of the work times (declared work times) exceeds from the predetermined value, the reliability determination means updates the standard work times of the work contents to the standard work times calculated based on the work times obtained from the work time points of the work contents which are declared by the workers 55, exclusive of the work time determined to exceed the predetermined value. Accordingly, the workers 55 can make declaration without an observer or a classifier. In addition, when a false or erroneous declaration is made by the workers 55, the system can find out this declaration and update the standard work times after excluding the declaration data of the work time having a low reliability. This prevents the update of the standard work times on the basis of the declaration data of the work time having a low reliability. Hence, the reliability of the update data of the standard work times is improved.

Moreover, the standard work time updating system of Embodiment 3 is a standard work time updating system having a configuration in which the workers 55 declare the work time points of the work contents performed by the workers 55 in the work areas 52A to 52E in the station 51 by using the declaring means (PDAs 56) and the standard work times of the respective work contents are updated based on the work times obtained from the work time points of the work contents which are declared by the workers 55, characterized in that the system includes the update processing means (reliability determination unit 64) for calculating the standard work times on the basis of the work times obtained from the work time points of the work contents which are declared by the workers 55 and the work times of the work contents which are stored in the database, and thereby updating the standard work times of the work contents to the calculated standard work times. In this system, even when there is data having a low reliability in the declared work time data of the workers 55, it is possible to reduce the effect of the declared work time data having a low reliability on the update data of the standard work times. This is because the standard work times are calculated by using not only the declared work time data but also the work time data stored in the database. This prevents (reduces) deterioration in reliability of the update data of the standard work times which is caused by the declared data of the work time having a low reliability. Hence, the reliability of the update data of the standard work times is improved.

Furthermore, the standard work time updating system of Embodiment 3 is a standard work time updating system having a configuration in which the workers 55 declare the work time points of the work contents performed by the workers 55 in the work areas 52A to 52E in the station 51 by using the declaring means (PDAs 56) and the standard work times of the respective work contents are updated based on the work times obtained from the work time points of the work contents which are declared by the workers 55, characterized in that the system includes: the work area identification means (photoelectric sensors 53A to 53E and work area identification unit 63) for identifying the work area in which each of the workers 55 exist; and the reliability determination means (reliability determination unit 64) for determining whether the identified work areas identified by the work area identification means coincide with the declared work areas declared by the workers 55 by use of the declaring means, when determining that the identified work areas coincide with the declared work areas, the reliability determination means updates the standard work times of the work contents to the standard work times calculated based on the work times obtained from the work time points of the work contents which are declared by the workers 55, and when determining that any of the identified work areas does not coincide with a corresponding one of the declared work areas, the reliability determination means does not update the standard work time of the relevant work content. Accordingly, the workers 55 can make declaration without an observer or a classifier. In addition, when a false or erroneous declaration is made by the workers 55, the system can find out this declaration and cancel the update of the standard work time. This prevents the update of the standard work times on the basis of the declaration data of the work time having a low reliability. Hence, the reliability of the update data of the standard work times is improved.

In addition, the standard work time updating system of Embodiment 3 is a standard work time updating system having a configuration in which the workers 55 declare the work time points of the work contents performed by the workers 55 in the work areas 52A to 52E in the station 51 by using the declaring means (PDAs 56) and the standard work times of the respective work contents are updated based on the work times obtained from the work time points of the work contents which are declared by the workers 55, characterized in that the system includes: the work area identification means (photoelectric sensors 53A to 53E and work area identification unit 63) for identifying the work area in which each of the workers 55 exist; and the reliability determination means (reliability determination unit 64) for determining whether the identified work areas identified by the work area identification means coincide with the declared work areas declared by the workers 55 by use of the declaring means, when determining that the identified work areas coincide with the declared work areas, the reliability determination means updates the standard work times of the work contents to the standard work times calculated based on the work times obtained from the work time points of the work contents which are declared by the workers 55, and when determining that any of the identified work areas does not coincide with a corresponding one of the declared work areas, the reliability determination means updates the standard work times of the work contents to the standard work times calculated based on the work times obtained from the work time points of the work contents which are declared by the workers 55, exclusive of the work time for which the identified work area does not coincide with the declared work area. Accordingly, the workers 55 can make declaration without an observer or a classifier. In addition, when a false or erroneous declaration is made by the workers 55, the system can find out this declaration and update the standard work times after excluding the declaration data of the work times having a low reliability. This prevents the update of the standard work times on the basis of the declaration data of the work time having a low reliability. Hence, the reliability of the update data of the standard work times is improved.

The standard work time updating system of Embodiment 3 is characterized in that the work area identification means includes: photoelectric sensors 53A to 53E installed at the entrances of the work areas 52A to 52E and configured to detect the workers 55 entering the work areas 52A to 52E; and the work area identification unit 63 configured to identify the work area in which each of the workers 55 exists, on the basis of the worker detection information from the photoelectric sensors 53A to 53E. Accordingly, the system can surely identify in which of the work areas 52A to 52E each of the workers 55 exists, with a simple configuration.

Moreover, the standard work time updating system of Embodiment 3 is a standard work time updating system having a configuration in which the workers 55 declare the work time points of the work contents performed by the workers 55 in the work areas 52A to 52E in the station 51 by using the declaring means (PDAs 56) and the standard work times of the respective work contents are updated based on the work times obtained from the work time points of the work contents which are declared by the workers 55, characterized in that the system includes: the multiple reliability determination means (first to third reliability determination means) for determining whether the work times obtained from the work time points of the work contents which are declared by the workers 55 are reliable; and the update processing means (reliability determination unit 64) for calculating the standard work times by performing the weighted average calculation on the average values of the work times subjected to the reliability determination by the multiple reliability determination means and updating the standard work times of the work contents to the calculated standard work times, and, when any of the work times is determined to be unreliable by any of the multiple reliability determination means, the update processing means performs the weighted average calculation with the weighting factor set to 0, the weighting factor being one for the average value of the work times subjected to the reliability determination by the any reliability determination means. Accordingly, the workers 55 can make declaration without an observer or a classifier. In addition, when a false or erroneous declaration is made by the workers 55, the system can find out this declaration by any of the multiple reliability determination means and update the standard work times after excluding the declaration data of the work times having a low reliability. This prevents the update of the standard work times on the basis of the declaration data of the work time point having a low reliability. Hence, the reliability of the update data of the standard work times is improved.

<Embodiment 4>

Figure 9:
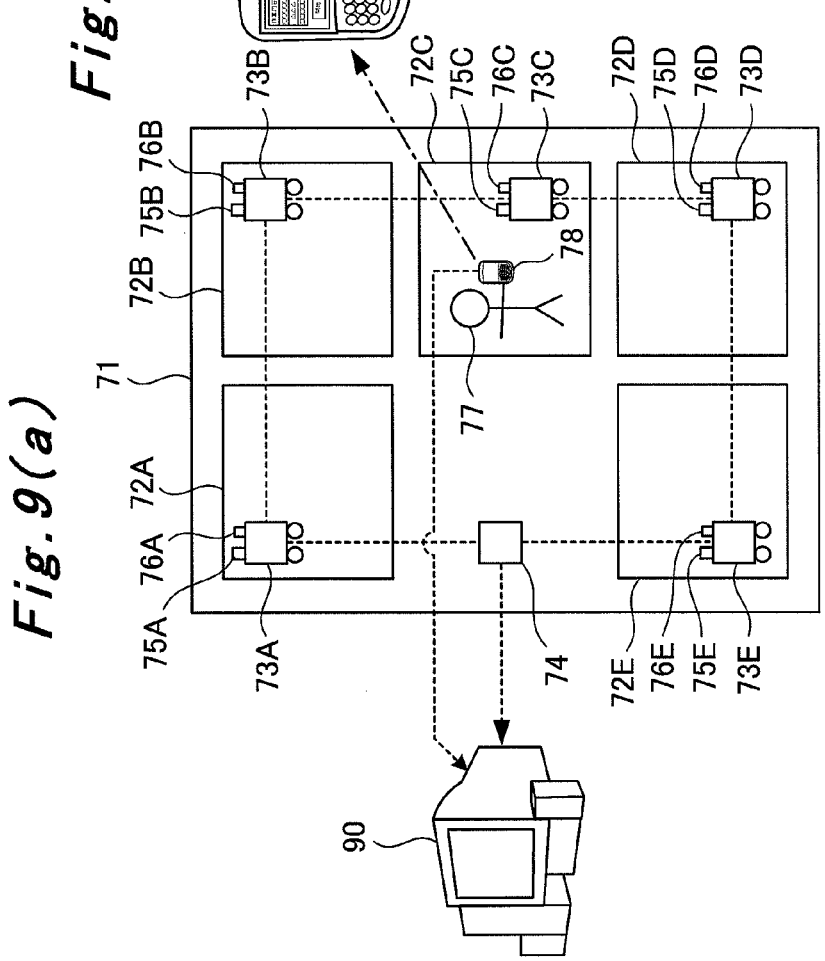
FIG. 9 Part (a) is a configuration diagram of a standard work time updating system in Embodiment 4 of the present invention, Part (b) is an enlarged view of a PDA, and Part (c) is an enlarged view of a display screen of the PDA.

As shown in part (a) of FIG. 9, an inside of an assembly station 71 in which assembly work of a product such as an aircraft or a ship is performed is divided into multiple (four in the illustrated example) work areas 72A, 72B, 72C, 72D, and 72E for respective multiple work contents. Workers 77 perform work of the work contents in the work areas 72A to 72E.

At this time, in the work areas 72A to 72E, each of the workers 77 operates a PDA 78 (declaring means) carried by the worker 77 to record work time points (work start time point and work completion time point) of the respective work contents in a storage device included in the PDA 78. As shown in Parts (b) and (c) of FIG. 9, the work content, the work time point (work start time point and work completion time point), and the work area are displayed in a display screen 79 of the PDA 78. In addition, operation buttons 80A, 80B, and 80C respectively for start, interruption, and completion of work are also displayed in the display screen 79.

Specifically, when the worker 77 performs touch operation on the start button 80A at the start of the work of a certain work content, the work start time point of the work contents is recorded in the PDA 78 and is displayed in the display screen 79. Moreover, when the worker 77 performs touch operation on the completion button 80C at the completion of the work of a certain work content, the work completion time point of the work content is recorded in the PDA 78 and is displayed in the display screen 79. When the worker 77 performs touch operation on the interruption button 80B for some reason during the work of a certain work content, the recording of the work time point of the work content is cancelled.

In Embodiment 4, multiple photoelectric sensors 76A, 76B, 76C, 76D, and 76E and a transmitter 74 are installed in the station 71. Work tool tables 73A, 73B, 73C, 73D, and 73E are installed respectively in the work areas 72A to 72E. Work tools 75A, 75A, 75C, 75D, and 75E for performing work of the work contents in the work areas 72A to 72E are placed respectively on the work tool tables 73A to 73E. The photoelectric sensors 76A to 76E are installed respectively in the work tool tables 73A to 73E. The transmitter 74 is installed in a place other than the work areas 72A to 72E.

The photoelectric sensors 76A to 76E detect the work tools 75A to 75E when the work tools 75A to 75E are placed on the work tool tables 73A to 73E (i.e. when the workers 77 are not using the work tools 75A to 75E), and are thereby set to a ON state. When the workers 77 pick up the work tools 75A to 75B from the work tool tables 73A to 73E to perform work (i.e. when the workers 77 use the work tools 75A to 75E), the photoelectric sensors 76A to 76E do not detect the work tools 75A to 75B and are thereby set to a OFF state. An OFF signal is transmitted to the transmitter 74 wirelessly or by a wire as work tool usage information. The transmitter 74 sends the work tool usage information to a work time management server (personal computer) 90.

Note that the workers 77 always return the work tools 75A to 75E to fixed positions (positions which can be detected by the photoelectric sensors 76A to 76E) on the work tool tables 73A to 73E after usage. Moreover, when the positions of the work tool tables 73A to 73E in the work areas 72A to 72E are fixed, the positions of the work tools 75A to 75E placed on the work tool tables 73A to 73E are also fixed. The photoelectric sensors 76A to 76E may be thus installed at positions other than the work tool tables 73A to 73E.

Figure 10:
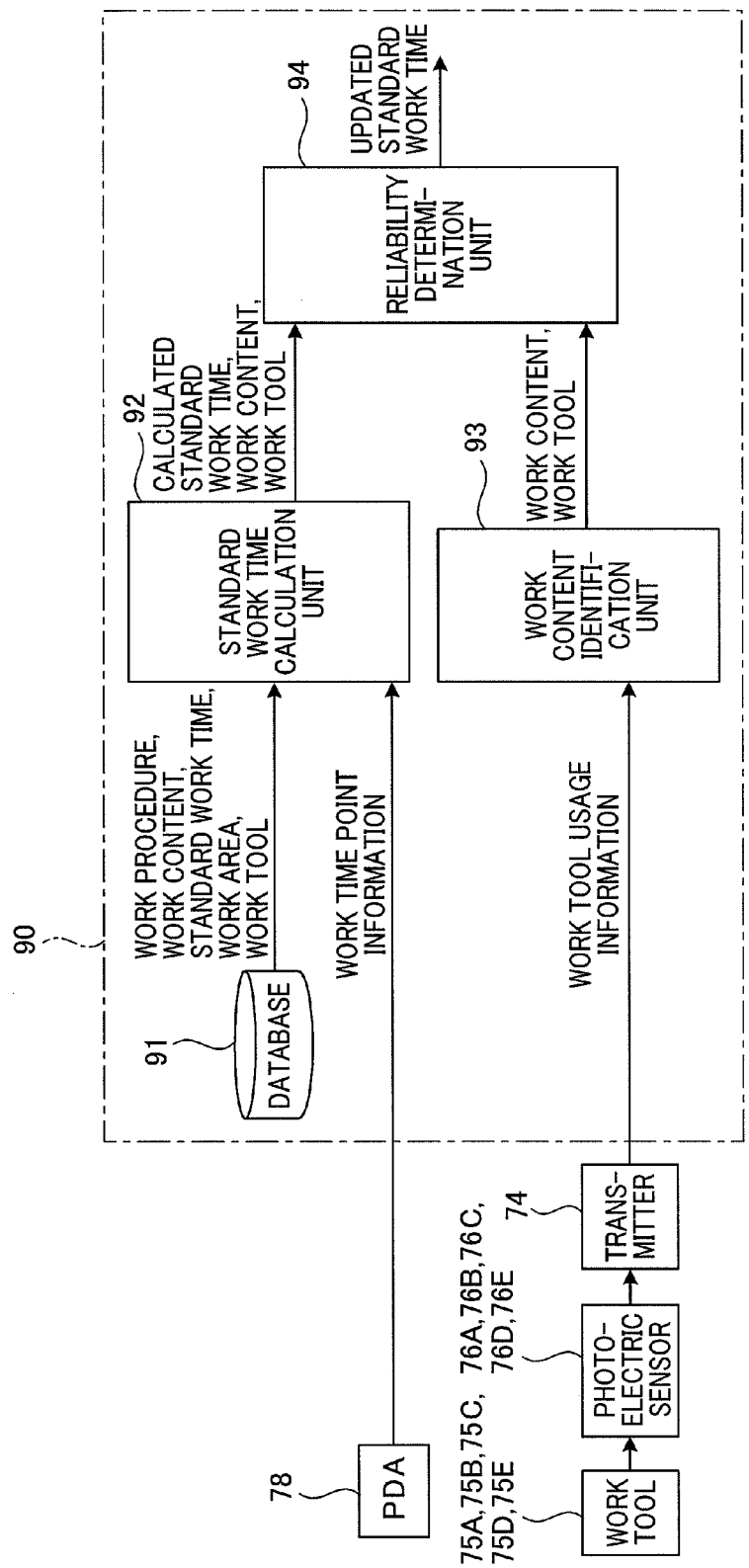
FIG. 10 is a block diagram of the standard work time updating system in Embodiment 4 of the present invention.

As shown in Parts (a) to (c) of FIG. 9 and FIG. 10, information such as the work time points (work start time point and work completion time point) of the work contents recorded by the PDA 78 (i.e. information on the work contents, the work time points, and the work tools declared (transmitted) by the worker 77 by using the PDA 78) is transmitted to the work time management server 90. The work time management server 90 has a storage unit 91 in which work procedures, the work contents, standard work times, the work areas, the work tools, and the like are stored as a database, a standard work time calculation unit 92, a work content identification unit 93, and a reliability determination unit 94 (reliability determining means, update processing means). Data of the standard work time recorded in the database is calculated for each work content as an average value (or, alternatively, a minimum value, a median value, or the like: see FIG. 4) of the work times, on the basis of data of the past work times of the work content which is stored as the database. Note that, the functions of the standard work time calculation unit 92, the work content identification unit 93, and the reliability determination unit 94 are implemented by software (program) and are executed by a CPU of the work time management server 90.

The standard work time calculation unit 92 obtains the work time (work completion time point−work start time point) of each work content from the information (i.e. the information on the work content and the work time point) on the work time point (work start time point and work completion time point) of the work content which is inputted from the PDA 78 of each worker 77. The standard work time calculation unit 92 then calculates the average value (or, alternatively, a minimum value, a median value, or the like) of the work times for each work content and sets the calculated value as the standard work time of the work content. In this case, when there is work time data greatly deviating from the average value (i.e. work time data having a low reliability), the average value is greatly affected by this greatly-deviating work time data. In view of this, it is preferable to use the median value which is relatively less affected by the greatly-deviating work time data. Moreover, when the calculated standard work times of the respective work contents are shorter than the standard work times of the work contents which are stored in the storage unit 91 as the database, the standard work time calculation unit 92 outputs the calculated standard work times of the work contents to the reliability determination unit 94 as the standard work times for update. Moreover, the data on the work contents and the work tools declared (transmitted from the PDAs 78) by the workers 77 is also outputted to the reliability determination unit 94 via the standard work time calculation unit 92.

The work content identification unit 93 identifies the work contents performed by the workers 77, on the basis of the work tool usage information transmitted from the photoelectric sensors 76A to 76E via the transmitter 74. Specifically, the work tool (any of the work tools 75A to 75E) used by each of the workers 77 is determined from the work tool usage information and the work content is determined (identified) from the determined work tool (any of the work tools 75A to 75E). The photoelectric sensors 76A to 76E are included as work tool usage information acquisition means and the work tool usage information acquisition means, the work content identification unit 93, and the like form the work content identification means. Information on the work contents identified by the work content identification unit 93 is outputted to the reliability determination unit 94 together with information on the work tools.

The reliability determination unit 94 determines whether the work times of the work contents which are obtained from the work time points of the work contents declared (transmitted from the PDAs 78) by the workers 77 each deviate from a predetermined range (range of ±3σ in the example of FIG. 3: σ is a standard deviation) in distribution of the work time data of a corresponding one of the work contents which is stored in the database (first reliability determination means). When determining that none of the work times (declared work times) deviate from the predetermined range for each work content, the reliability determination unit 94 updates the standard work times of the work contents to the standard work times of the work contents which is calculated by the standard work time calculation unit 92 and outputs the updated standard work times. Meanwhile, when determining that any of the work times (declared work times) deviates from the predetermined range for any of work contents, the reliability determination unit 94 does not update the standard work time of the relevant work content to the standard work time of the relevant work content which is calculated by the standard work time calculation unit 92 and leaves the standard work time of the relevant work content to be the standard work time of the relevant work content which is recorded as the database.

Moreover, the reliability determination unit 94 determines whether the work contents (actual work contents) identified by the work content identification unit 93 coincide with the work contents declared by the workers 77 (fourth reliability determination means).

At this time, when the work contents identified by the work content identification unit 93 coincide with the work contents declared by the workers 77, the declarations of the workers 77 are reliable. Accordingly, when determining that the work contents identified by the work content identification unit 93 coincide with the work contents declared by the workers 77, the reliability determination unit 94 updates the standard work times of the work contents to the standard work times of the work contents which are calculated by the standard work time calculation unit 92 and outputs the updated standard work times.

Meanwhile, when any of the work contents identified by the work content identification unit 93 does not coincide with a corresponding one of the work contents declared by the workers 77, information on the work time point declared by the worker 77 in association with the non-coincident work content may be a false or erroneous input by the worker 77 and is thereby unreliable. Accordingly, when determining that any of the work contents identified by the work content identification unit 93 does not coincide with a corresponding one of the work contents declared by the workers 77, the reliability determination unit 94 does not update the standard work time of the non-coincident work content to the standard work time of the work content which is calculated by the standard work time calculation unit 92, and leave the standard work time to be the standard work time of the work content which is recorded as the database.

The following processes may be performed in the reliability determination unit 94 in addition to the processes described above.

For example, the reliability determination unit 94 determines whether the work times of the work contents which are obtained from the work time points of the work contents declared (transmitted from the PDA 78) by the workers 77 each deviate from the predetermined range (range of ±3σ) in distribution of the work time data of a corresponding one of the work contents which is stored in the database (first reliability determination means). When determining that none of the work times (declared work times) deviate from the predetermined range for each work content, the reliability determination unit 94 updates the standard work times of the work contents to the standard work times of the work contents which are calculated by the standard work time calculation unit 92 (i.e. the standard work times calculated based on all of the work times declared for each of the work contents) and outputs the updated standard work times. Meanwhile, when determining that any of the work times (declared work times) deviates from the predetermined range for any of the work contents, the reliability determination unit 94 updates the standard work times of the work contents to the standard work times calculated based on the work times obtained from the work time points of the work contents declared by the workers 77, exclusive of the work time determined to deviate from the predetermined range. The reliability determination unit 94 then outputs the updated standard work time.

Moreover, the following processes may be performed. The reliability determination unit 94 determines whether the work times of the work contents which are obtained from the work time points of the work contents declared (transmitted from the PDAs 78) by the workers 77 each exceed a predetermined value (+3σ in the example of FIG. 4: σ is a standard deviation) in distribution of the work time data of a corresponding one of the work contents which is stored in the database (second reliability determination means). When determining that none of the work times (declared work times) exceed the predetermined value for each work content, the reliability determination unit 94 updates the standard work times of the work contents to the standard work times of the work contents calculated by the standard work time calculation unit 49 and outputs the updated standard work times. Meanwhile, when determining that any of the work times (declared work times) exceeds the predetermined value for any of the work contents, the reliability determination unit 94 does not update the standard work times of the relevant work content to the standard work time of the relevant work content which is calculated by the standard work time calculation unit 92 and leaves the standard work time to be the standard work time of the relevant work content which is recorded as the database.

Furthermore, the following processes may be performed. The reliability determination unit 94 determines whether the work times of the work contents which are obtained from the work time points of the work contents declared (transmitted from the PDAs 78) by the worker 77 each exceed a predetermined value (+3σ) in distribution of the work time data of a corresponding one of the work contents which is stored in the database (second reliability determination means). When determining that none of the work times (declared work times) exceed the predetermined value for each work content, the reliability determination unit 94 updates the standard work times of the work contents to the standard work times of the work contents which are calculated by the standard work time calculation unit 92 and outputs the updated standard work times. Meanwhile, when determining that any of the work times (declared work times) exceeds the predetermined value for any of the work contents, the reliability determination unit 94 updates the standard work times of the work contents to the standard work times calculated based on the work times obtained from the work time points of the work contents declared by the workers 77, exclusive of the work time determined to exceed the predetermined value. The reliability determination unit 94 then outputs the updated standard work time.

In addition the following processed may be performed. The reliability determination unit 94 (functioning as the update processing means in this case) calculates the standard work times on the basis of the work times of the work contents which are obtained from the work time points of the work contents declared by the workers 77 and the work times of the work contents which are stored in the database and updates the standard work times of the work contents to the calculated standard work times.

Moreover, the following processes may be performed. The reliability determination unit 94 determines whether the identified work contents identified by the work content identification unit 93 coincide with the declared work contents declared by the workers 77 by use of the declaring means (PDAs 78) (fourth reliability determination means). When determining that the identified work contents coincide with the declared work contents, the reliability determination unit 94 updates the standard work time of the work contents to the standard work times of the work contents which are calculated by the standard work time calculation unit 92 and outputs the updated standard work times. Meanwhile, when determining that any of the identified work contents does not coincide with a corresponding one of the declared work contents, the reliability determination unit 94 updates the standard work time of the work content related to the non-coincident work content to the standard work time calculated based on the work times obtained from the work time points of the work content declared by the worker 77, exclusive of the work time for which the identified work content does not coincide with the declared work content. The reliability determination unit 94 then outputs the updated standard work time.

Moreover, in the case of simultaneously performing the update processing for the standard work times on the basis of the reliability determinations of the first, second, and fourth reliability determination means, the processes may be performed, for example, in such a way that the priorities are set for these reliability determination means in advance. When there is a difference in the update data of the standard work time between the first, second, and fourth reliability determination means, the update data of the standard work time of the reliability determination means with a higher priority is used and the update processing is performed based on this update data. Instead, the update processes may be performed such that the average value, the median value, or the smallest value of the pieces of update data of the standard work time in the first, second, and fourth reliability determination means is calculated and the update processing is performed based on this calculated value.

Furthermore, in the case of simultaneously performing the reliability determinations of the first, second, and fourth reliability determination means, standard work times (update data) may be calculated by performing weighted average calculation.

Specifically, the reliability determination unit 94 simultaneously performs: the reliability determination by the first reliability determination means for determining whether the work times of the work contents which are obtained from the work time points of the work contents declared by the workers 77 each deviate from the predetermined range (range of ±3σ) in the distribution of work time data of a corresponding one of the work contents which is stored in the database; the reliability determination by the second reliability determination means for determining whether the work times obtained from the work time points of the work contents declared by the workers 77 each exceed the predetermined value (+3σ) in the distribution of work time data of a corresponding one of the work contents which is stored in the database; and the reliability determination by the fourth reliability determination means for determining whether the identified work contents which are identified by the work content identification unit 93 and which are performed by the workers 77 coincide with the declared work contents declared by the workers 77 by use of the declaring means (PDAs 78).

Then, the reliability determination unit 94 calculates the standard work times by performing the weighted average calculation on the average values of the work times subjected to the reliability determinations by the first, second, and fourth reliability determination means and updates the standard work time of the work contents to the calculated standard work times. Moreover, when determining that any of the work times is unreliable by any of the first, second, and fourth reliability determination means, the reliability determination unit 94 performs the weighted average calculation with a weighting factor set to 0, the weighting factor being one for the average value of the work times subjected to the reliability determination by the any reliability determination means.

Specifically, in the first reliability determination means, when any of the work times of the work contents which are obtained from the work time points of the work contents declared by the workers 77 is determined to deviate from the predetermined range (range of ±3σ) in the distribution of work time data of a corresponding one of the work contents which is stored in the database, the weighted average calculation for updating the standard work time of the relevant work content is performed with the weighting factor set to 0, the weighting factor being one for the average value of the work times (declared work times) of the relevant work content which are subjected to the reliability determination by the first reliability determination means. In the second reliability determination means, when any of the work times which are obtained from the work time points of the work contents declared by the workers 77 is determined to exceed the predetermined value (+3σ) in the distribution of work time data of a corresponding one of the work contents which is stored in the database, the weighted average calculation for updating the standard work time of the relevant work content is performed with the weighting factor set to 0, the weighting factor being one for the average value of the work times (declared work times) of the relevant work content which are subjected to the reliability determination by the second reliability determination means. In the fourth reliability determination means, when any of the identified work contents which are identified by the work content identification unit 93 and which are performed by the workers 77 is determined to not coincide with a corresponding one of the declared work contents declared by the workers 77 by use of the declaring means (PDAs 78), the weighted average calculation for updating the standard work time of the relevant work content is performed with the weighting factor set to 0, the weighting factor being one for the average value of the work times (declared work times) of the relevant work content which are subjected to the reliability determination by the fourth reliability determination means.

A specific example is described in further detail. When data of the work times (declared work times) of each of the work contents which are subjected to the reliability determination by the first, second, and fourth reliability determination means is $x_i \pm \delta_i$, the weighting factor $w_i$ for the average value $x_i$ of the work times subjected to the reliability determination by the first, second, and fourth reliability determination means is obtained by using Formula (1) shown above. Then, the weighted average calculation is performed by using, for example, formula (2) shown above on the average value $x_i$ of the work times of each work content which are subjected to the reliability determination by each of the first, second, and fourth reliability determination means and the standard work time (weighted average value) $x_{wav}$ is thereby calculated. The standard work time of each work content is then updated to the calculated standard work time $x_{wav}$. Moreover, when any of the work times is determined to be unreliable by any of the first, second, and fourth reliability determination means at this time, the weighted average calculation is performed with the scattering (standard deviation) $\delta$ of the work times subjected to the reliability determination by the any reliability determination means set to ∞ and with the weighting factor $w_i$ for the average value $x_i$ of the work times subjected to the reliability determination by this reliability determination means set to 0.

Note that the work times of each work content which are newly measured in this update and the standard work time updated based on these work times are stored in the storage unit 91 as a database used for the next standard work time update. At this time, data of the work time deviating from the predetermined range, data of the work time exceeding the predetermined value, and the like are also stored in the storage unit 91.

Moreover, each of the workers 77 can be determined by using the work time point information and the work tool usage information obtained by the photoelectric sensors 76A to 76E and by using the work time point information and the work tool usage information declared by the worker 77.

Although the photoelectric sensors 76A to 76E are used as the work tool usage information acquisition means in the above description, the present invention is not limited to this. For example, electric power meters, cameras, the RFID tags and the RFID readers, piezoelectric sensors, or the like may be used as the work tool usage information acquisition means.

Figure 11:
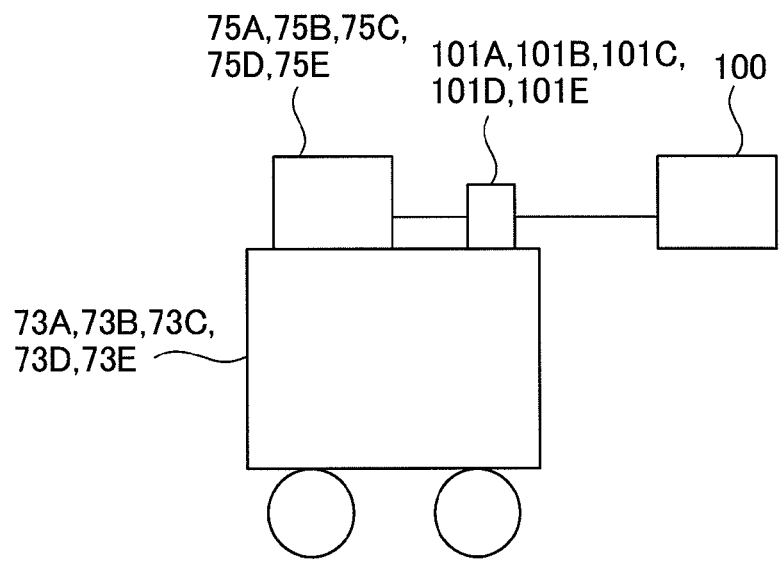
FIG. 11 is an explanation diagram of the case where electric power meters are used as a different type of work tool usage information acquisition means.

First, the case of using the electric power meters is described based on FIGS. 9, 10, and 11. When the work tools 75A to 75B are electric work tools (for example, electric drills or the like) requiring supply of electric power from a power source 100 as shown in FIG. 11, electric power meters 101A, 101B, 101C, 101D, and 101E can be used instead of the photoelectric sensors 76A to 76E in the system shown in FIGS. 9 and 10. The electric power meters 101A to 101E each measure the electric power supplied from the power source 100 to a corresponding one of the work tools 75A to 75B. The power source 100 may be provided for each of the work areas 72A to 72E or may be common to the work areas 72A to 72E. The electric power meters 101A to 101E may be installed respectively in the work tool tables 73A to 73E or may be installed in other places.

When the workers 77 use the work tools 75A to 75B in the work areas 72A to 72E, the electric power meters 101A to 101E measure the electric power consumptions of the work tools 75A to 75E and transmit signals of the electric power consumptions to the transmitter 74 wirelessly or by a wire as the work tool usage information. The transmitter 74 sends the work tool usage information to the work time management server 90.

Other configurations are the same as those in the case of using the photoelectric sensors 76A to 76E.

Figure 12:
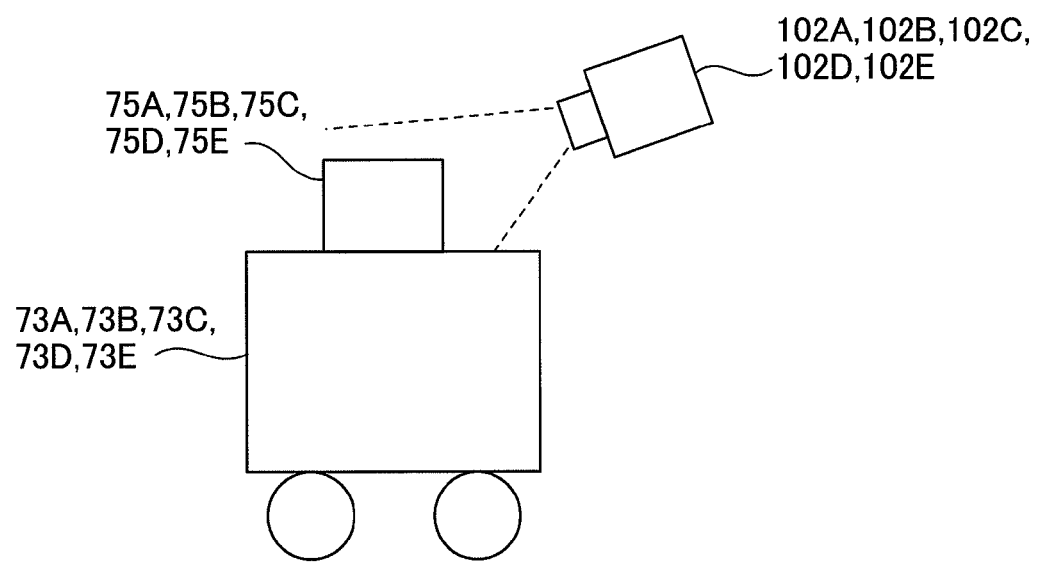
FIG. 12 is an explanation diagram of the case where cameras are used as a different type of work tool usage information acquisition means.

Next, the case of using the cameras is described based on FIGS. 9, 10, and 12. Cameras 102A, 102B, 102C, 102D, and 102E shown in FIG. 12 are used instead of the photoelectric sensors 76A to 76E in the system shown in FIGS. 9 and 10. When the positions of the work tool tables 73A to 73E in the work areas 72A to 72E are not fixed, the cameras 102A to 102E are installed respectively in the work tool tables 73A to 73E to always capture images of the work tools 75A to 75E on the work tool tables 73A to 73E. When the positions of the work tool tables 73A to 73E in the work areas 72A to 72E are fixed, the positions of the cameras 102A to 102E are not limited to the work tool tables 73A to 73E and may be installed at any positions in the work areas 72A to 72E from which the images of the work tools 75A to 75E on the work tool tables 73A to 73E can be captured.

The cameras 102A to 102E transmit the captured images of top portions of the work tool tables 73A to 73E to the transmitter 74 wirelessly or by a wire. The transmitter 74 transmits the images to the work time management server 90. The work time management server 90 performs image processing such as background subtraction on the images and thereby determines whether the work tools 75A to 75E have disappeared from the work tool tables 73A to 73E (i.e. the work tools 75A to 75E are used by the workers 77). The work time management server 90 can obtain the work tool usage information by determining whether the work tools 75A to 75E have disappeared from the work tool tables 73A to 73E (image processing means). Alternatively, the configuration may be such that the cameras 102A to 102E perform the image processing to obtain the work tool usage information (image processing means) and the obtained work tool usage information is transmitted to the work time management server 90 via the transmitter 74.

Other configurations are the same as those in the case of using the photoelectric sensors 76A to 76E.

Figure 13:
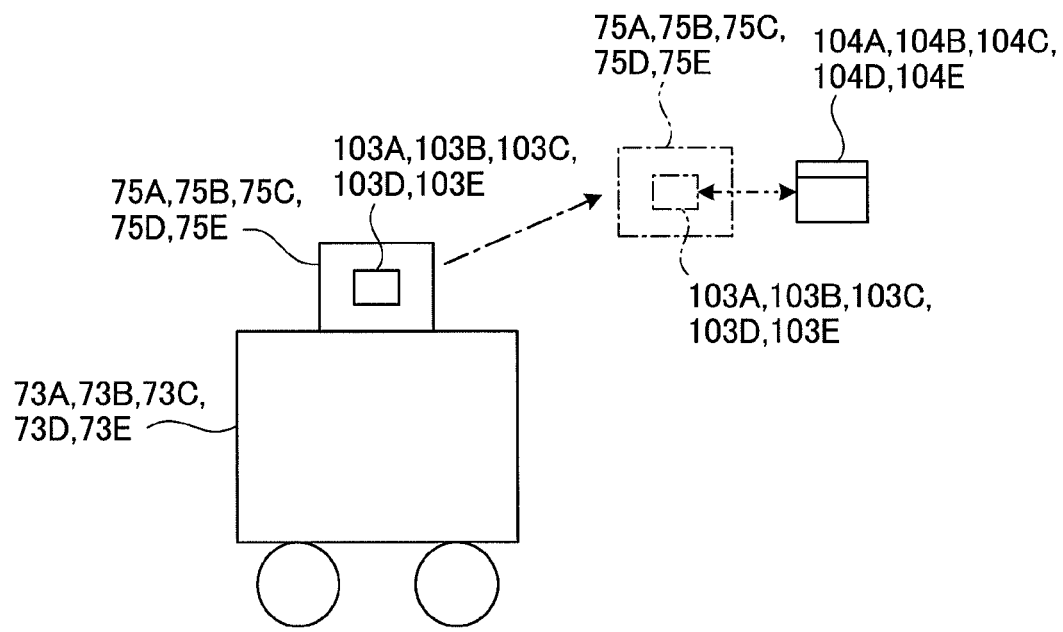
FIG. 13 is an explanation diagram of the case where RFID tags and RFID tag readers are used as a different type of work tool usage information acquisition means.

Next, the case of using the RFID tags and the RFID readers is described based on FIGS. 9, 10, and 13. RFID tags 103A, 103B, 103C, 103D, and 103E and RFID readers 104A, 104B, 104C, 104D, and 104E shown in FIG. 13 are used instead of the photoelectric sensors 76A to 76E in the system shown in FIGS. 9 and 10. The RFID tags 103A to 103E are provided respectively in the work tools 75A to 75E and pieces of identification information of the work tools 75A to 75E are recorded respectively in the RFID tags 103A to 103E. The RFID readers 104A to 104E are installed respectively in the work areas 72A to 72E. Moreover, the workers 77 may carry RFID readers (not illustrated).

When using the work tools 75A to 75E, the workers 77 bring the RFID tags 103A to 103E close to the RFID readers 104A to 104E or to the RFID readers which they carry. The RFID readers 104A to 104E or the RFID readers which they carry thereby read the identification information recorded in the RFID tags 103A to 103E and thus transmit the read identification information to the transmitter 74 wirelessly or by a wire as the work tool usage information. The transmitter 74 transmits the work tool usage information to the work time management server 90.

Other configurations are the same as those in the case of using the photoelectric sensors 76A to 76E.

Figure 14:
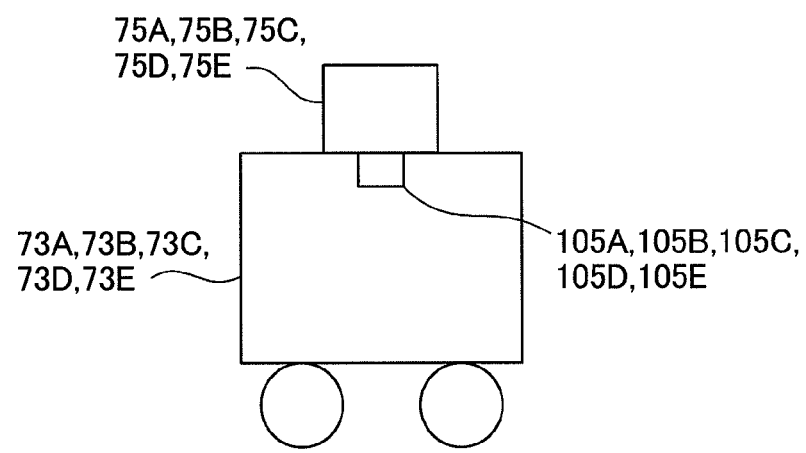
FIG. 14 is an explanation diagram of the case where piezoelectric sensors are used as a different type of work tool usage information acquisition means.
Figure 15:
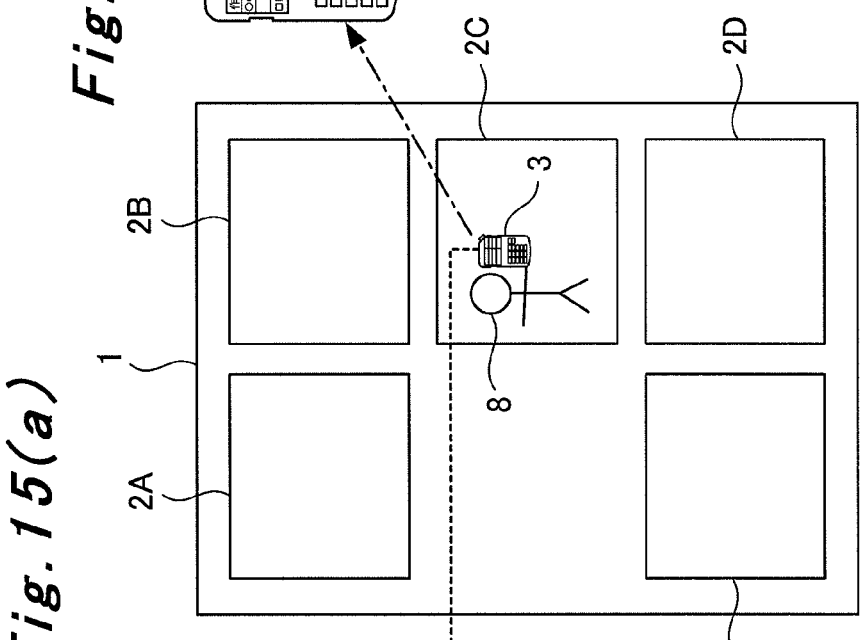
FIG. 15 Part (a) is a configuration diagram of a conventional standard work time updating system, Part (b) is an enlarged view of a stopwatch, and Part (c) is an enlarged view of a display screen of the stopwatch.
Figure 16:
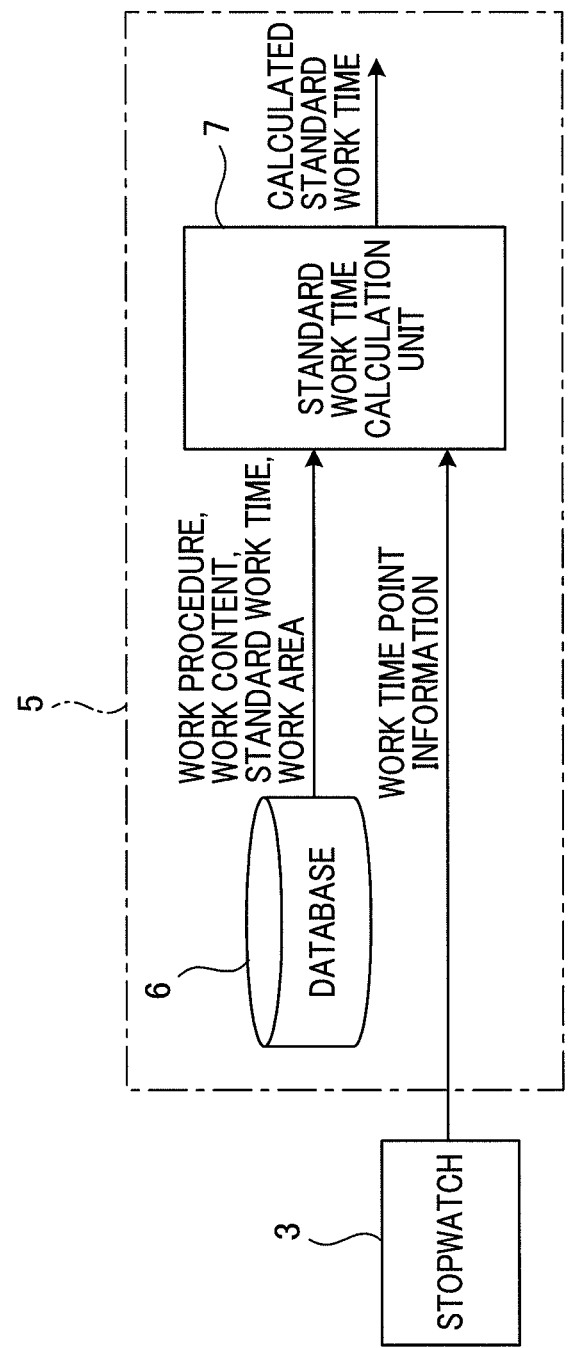
FIG. 16 is a block diagram of the conventional standard work time updating system.

Next, the case of using the piezoelectric sensors is described based on FIGS. 9, 10, and 14. Piezoelectric sensors 105A, 105B, 105C, 105D, and 105E shown in FIG. 14 are used instead of the photoelectric sensors 76A to 76E in the system shown in FIGS. 9 and 10. The piezoelectric sensors 105A to 105E are provided respectively in the work tool tables 73A to 73E in such a way that the loads of the work tools 75A to 75E act on the piezoelectric sensors 105A to 105E when the work tools 75A to 75E are placed on the work tool tables 73A to 73E.

Accordingly, when the workers 77 pick up the work tools 75A to 75E from the work tool tables 73A to 73E to use the work tools 75A to 75E, the loads of the work tools 75A to 75E do not act on the piezoelectric sensors 105A to 105E. Hence, the piezoelectric sensors 105A to 105E detect that the work tools 75A to 75E are picked up (used) from the work tool tables 73A to 73E by the workers 77 and work tool detection signals are transmitted to the transmitter 74 wirelessly or by a wire as the work tool usage information. The transmitter 74 transmits the work tool usage information to the work time management server 90.

Other configurations are the same as those in the case of using the photoelectric sensors 76A to 76E.

As described above, the standard work time updating system of Embodiment 4 is a standard work time updating system having a configuration in which the workers 77 declare the work time points of the work contents performed by the workers 77 in the work areas 72A to 72E in the station 71 by using the declaring means (PDAs 78) and the standard work times of the respective work contents are updated based on the work times obtained from the work time points of the work contents which are declared by the workers 77, characterized in that the system includes the reliability determination means (reliability determination unit 94) for determining whether the work times obtained from the work time points of the work contents which are declared by the workers 77 each deviate from the predetermined range (range of $\pm 3\sigma$) in the distribution of work time data of a corresponding one of the work contents which is stored in a database, when determining that none of the work times (declared work times) deviate from the predetermined range, the reliability determination means updates the standard work times of the work contents to the standard work times of the work contents calculated based on the work times obtained from the work time points of the work contents which are declared by the workers 77, and when determining that any of the work times (declared work times) deviates from the predetermined range, the reliability determination means does not update the standard work time of the relevant work content. Accordingly, the workers 77 can make declaration without an observer or a classifier. In addition, when a false or erroneous declaration is made by the workers 77, the system can find out this declaration and cancel the update of the standard work time. This prevents the update of the standard work times on the basis of the declaration data of the work time having a low reliability. Hence, the reliability of the update data of the standard work times is improved.

In addition, as described above, the standard work time updating system of Embodiment 4 is a standard work time updating system having a configuration in which the workers 77 declare the work time points of the work contents performed by the workers 77 in the work areas 72A to 72E in the station 71 by using the declaring means (PDAs 78) and the standard work times of the respective work contents are updated based on the work times obtained from the work time points of the work contents which are declared by the workers 77, characterized in that the system includes the reliability determination means (reliability determination unit 94) for determining whether the work times obtained from the work time points of the work contents which are declared by the workers 77 each deviate from the predetermined range (range of ±3σ) in the distribution of work time data of a corresponding one of the work contents which is stored in a database, when determining that none of the work times (declared work times) deviate from the predetermined range, the reliability determination means updates the standard work times of the work contents to the standard work times calculated based on the work times obtained from the work time points of the work contents which are declared by the workers 77, and when determining that any of the work times (declared work times) deviates from the predetermined range, the reliability determination means updates the standard work times of the work contents to the standard work times calculated based on the work times obtained from the work time points of the work contents which are declared by the workers 77, exclusive of the work time determined to deviate from the predetermined range. Accordingly, the workers 77 can make declaration without an observer or a classifier. In addition, when a false or erroneous declaration is made by the workers 77, the system can find out this declaration and update the standard work times after excluding the declaration data of the work time having a low reliability. This prevents the update of the standard work times on the basis of the declaration data of the work time having a low reliability. Hence, the reliability of the update data of the standard work times is improved.

Moreover, the standard work time updating system of Embodiment 4 is a standard work time updating system having a configuration in which the workers 77 declare the work time points of the work contents performed by the workers 77 in the work areas 72A to 72E in the station 71 by using the declaring means (PDAs 78) and the standard work times of the respective work contents are updated based on the work times obtained from the work time points of the work contents which are declared by the workers 77, characterized in that the system includes the reliability determination means (reliability determination unit 94) for determining whether the work times obtained from the work time points of the work contents which are declared by the workers 77 each exceed from the predetermined value (+3σ) in the distribution of work time data of a corresponding one of the work contents which is stored in a database, when determining that none of the work times (declared work times) exceed from the predetermined value, the reliability determination means updates the standard work times of the work contents to the standard work times calculated based on the work times obtained from the work time points of the work contents which are declared by the workers 77, and when determining that any of the work times (declared work times) exceeds from the predetermined value, the reliability determination means does not update the standard work times of the work contents. Accordingly, the workers 77 can make declaration without an observer or a classifier. In addition, when a false or erroneous declaration is made by the workers 77, the system can find out this declaration and update the standard work times after excluding the declaration data of the work time having a low reliability. This prevents the update of the standard work times on the basis of the declaration data of the work time having a low reliability. Hence, the reliability of the update data of the standard work times is improved.

Furthermore, the standard work time updating system of Embodiment 4 is a standard work time updating system having a configuration in which the workers 77 declare the work time points of the work contents performed by the workers 77 in the work areas 72A to 72E in the station 11 by using the declaring means (PDAs 78) and the standard work times of the respective work contents are updated based on the work times obtained from the work time points of the work contents which are declared by the workers 77, characterized in that the system includes the reliability determination means (reliability determination unit 94) for determining whether the work times obtained from the work time points of the work contents which are declared by the workers 77 each exceed from a predetermined value (+3σ) in the distribution of work time data of a corresponding one of the work contents which is stored in a database, when determining that none of the work times (declared work times) exceed from the predetermined value, the reliability determination means updates the standard work times of the work contents to the standard work times calculated based on the work times obtained from the work time points of the work contents which are declared by the workers 77, and when determining that any of the work times (declared work times) exceeds from the predetermined value, the reliability determination means updates the standard work times of the work contents to the standard work times calculated based on the work times obtained from the work time points of the work contents which are declared by the workers 77, exclusive of the work time determined to exceed the predetermined value. Accordingly, the workers 77 can make declaration without an observer or a classifier. In addition, when a false or erroneous declaration is made by the workers 77, the system can find out this declaration and update the standard work times after excluding the declaration data of the work time having a low reliability. This prevents the update of the standard work times on the basis of the declaration data of the work time having a low reliability. Hence, the reliability of the update data of the standard work times is improved.

Moreover, the standard work time updating system of Embodiment 4 is a standard work time updating system having a configuration in which the workers 77 declare the work time points of the work contents performed by the workers 77 in the work areas 72A to 72E in the station 71 by using the declaring means (PDAs 78) and the standard work times of the respective work contents are updated based on the work times obtained from the work time points of the work contents which are declared by the workers 77, characterized in that the system includes the update processing means (reliability determination unit 94) for calculating the standard work times on the basis of the work times obtained from the work time points of the work contents which are declared by the workers 77 and the work times of the work contents which are stored in the database, and thereby updating the standard work times of the work contents to the calculated standard work times. In this system, even when there is data having a low reliability in the declared work time data of the workers 77, it is possible to reduce the effect of the declared work time data having a low reliability on the update data of the standard work times. This is because the standard work times are calculated by using not only the declared work time data but also the work time data stored in the database. This prevents (reduces) deterioration in reliability of the update data of the standard work times which is caused by the declared data of the work time having a low reliability. Hence, the reliability of the update data of the standard work times is improved.

Furthermore, the standard work time updating system of Embodiment 4 is a standard work time updating system having a configuration in which the workers 77 declare the work time points of the work contents performed by the workers 77 in the work areas 72A to 72E in the station 71 by using the declaring means (PDAs 78) and the standard work times of the respective work contents are updated based on the work times obtained from the work time points of the work contents which are declared by the workers 77, characterized in that the system includes: the work content identification means (photoelectric sensors 76A to 76E and work area identification unit 93) for identifying the work content performed by each of the workers 77; and the reliability determination means (reliability determination unit 94) for determining whether the identified work contents identified by the work content identification means coincide with the declared work contents declared by the workers 77 by use of the declaring means, when determining that the identified work contents coincide with the declared work contents, the reliability determination means updates the standard work times of the work contents to the standard work times calculated based on the work times obtained from the work time points of the work contents which are declared by the workers 77, and when determining that any of the identified work contents does not coincide with a corresponding one of the declared work contents, the reliability determination means does not update the standard work time of the relevant work content. Accordingly, the workers 77 can make declaration without an observer or a classifier. In addition, when a false or erroneous declaration is made by the workers 77, the system can find out this declaration and cancel the update of the standard work time. This prevents the update of the standard work times on the basis of the declaration data of the work time having a low reliability. Hence, the reliability of the update data of the standard work times is improved.

In addition, the standard work time updating system of Embodiment 4 is a standard work time updating system having a configuration in which the workers 77 declare the work time points of the work contents performed by the workers 77 in the work areas 72A to 72E in the station 71 by using the declaring means (PDAs 78) and the standard work times of the respective work contents are updated based on the work times obtained from the work time points of the work contents which are declared by the workers 77, characterized in that the system includes: the work content identification means (photoelectric sensors 76A to 76E and work area identification unit 93) for identifying the work content performed by each of the workers 77; and the reliability determination means (reliability determination unit 94) for determining whether the identified work contents identified by the work content identification means coincide with the declared work contents declared by the workers 77 by use of the declaring means, when determining that the identified work contents coincide with the declared work contents, the reliability determination means updates the standard work times of the work contents to the standard work times calculated based on the work times obtained from the work time points of the work contents which are declared by the workers 77, and when determining that any of the identified work contents does not coincide with a corresponding one of the declared work contents, the reliability determination means updates the standard work times of the work contents to the standard work times calculated based on the work times obtained from the work time points of the work contents which are declared by the workers 77, exclusive of the work time for which the identified work content does not coincide with the declared work content. Accordingly, the workers 77 can make declaration without an observer or a classifier. In addition, when a false or erroneous declaration is made by the workers 77, the system can find out this declaration and update the standard work times after excluding the declaration data of the work times having a low reliability. This prevents the update of the standard work times on the basis of the declaration data of the work time having a low reliability. Hence, the reliability of the update data of the standard work times is improved.

Moreover, the standard work time updating system of Embodiment 4 is characterized in that the work content identification means includes: the work tool usage information acquisition means (photoelectric sensors 76A to 76E) for acquiring the work tool usage information by detecting the work tools 75A to 75E used by the workers 77; and the work area identification unit 93 configured to identify the work contents performed by the workers 77 on the basis of the work tool usage information from the work tool usage information acquisition means. Accordingly, the work contents of work performed by the workers 77 can be surely identified with a simple configuration. Moreover, since it is possible to know the usage states of the work tools 75A to 75E, whether the work tools 75A to 75E are put away can be also determined.

Furthermore, the standard work time updating system of Embodiment 4 is characterized in that the work tool usage information acquisition means is the photoelectric sensors 76A to 76E which are installed in the work tool tables 73A to 73E installed in the work areas 72A to 72E to be capable of detecting the work tools 75A to 75E placed on the work tool tables 73A to 73E, and transmits the OFF signals as the work tool usage information, the OFF signals obtained when the work tools 75A to 75E are picked up from the work tool tables 73A to 73E by the workers 77. Accordingly, the work tool usage information can be surely obtained with a simple configuration. Moreover, since it is possible to know the usage states of the work tools 75A to 75E, whether the work tools 75A to 75E are put away can be also determined.

Alternatively, the standard work time updating system of Embodiment 4 is characterized in that the work tool usage information acquisition means is the electric power meters 101A to 101E configured to measure the power consumptions of the work tools 75A to 75E and transmit the measured signals of the power consumption as the work tool usage information. Accordingly, the work tool usage information can be surely obtained with a simple configuration. Moreover, since it is possible to know the usage states of the work tools 75A to 75E, whether the work tools 75A to 75E are put away can be also determined.

Alternatively, the standard work time updating system of Embodiment 4 is characterized in that the work tool usage information acquisition means includes: the cameras 102A to 102E installed to be capable of capturing the images of the work tools 75A to 75E on the work tool tables 73A to 73E installed in the work areas 72A to 72E; and the image processing means (work time management server 90 or cameras 102A to 102E) for determining whether the work tools 75A to 75E have disappeared from the work tool tables 73A to 73E by performing image processing on the images captured by the cameras 102A to 102E and for obtaining the work tool usage information by determining whether the work tools 75A to 75E have disappeared from the work tool tables 73A to 73E. Accordingly, the work tool usage information can be surely obtained with a simple configuration. Moreover, since it is possible to know the usage states of the work tools 75A to 75E, whether the work tools 75A to 75E are put away can be also determined.

Alternatively, the standard work time updating system of Embodiment 4 is characterized in that the work tool usage information acquisition means includes; the RFID tags 103A to 103E provided in the work tools 75A to 75E; and the RFID readers 104A to 104E configured to read the records in the RFID tags 103A to 103E and transmit the information of the read records as the work tool usage information. Accordingly, the work tool usage information can be surely obtained with a simple configuration. Moreover, since it is possible to know the usage states of the work tools 75A to 75E, whether the work tools 75A to 75E are put away can be also determined.

Alternatively, the standard work time updating system of Embodiment 4 is characterized in that the work tool usage information acquisition means is the piezoelectric sensors 105A to 105E provided in the work tool tables 73A to 73E installed in the work areas 72A to 72E in such a way that the loads of the work tools 75A to 75E act on the piezoelectric sensors 105A to 105E when the work tools 73A to 73E are placed on the work tool tables 73A to 73E, the piezoelectric sensors 105A to 105E configured to detect that the work tools 73A to 73E are picked up from the work tool tables 73A to 73E by the workers 77 and transmit the work tool detection signal as the work tool usage information. Accordingly, the work tool usage information can be surely obtained with a simple configuration. Moreover, since it is possible to know the usage states of the work tools 75A to 75E, whether the work tools 75A to 75E are put away can be also determined.

Moreover, the standard work time updating system of Embodiment 4 is a standard work time updating system having a configuration in which the workers 77 declare the work time points of the work contents performed by the workers 77 in the work areas 72A to 72E in the station 71 by using the declaring means (PDAs 78) and the standard work times of the respective work contents are updated based on the work times obtained from the work time points of the work contents which are declared by the workers 77, characterized in that the system includes: the multiple reliability determination means (first, second, and fourth reliability determination means) for determining whether the work times obtained from the work time points of the work contents which are declared by the workers 77 are reliable; and the update processing means (reliability determination unit 94) for calculating the standard work times by performing the weight average calculation on the average values of the work times subjected to the reliability determination by the multiple reliability determination means and updating the standard work times of the work contents to the calculated standard work times, and, when any of the work times is determined to be unreliable by any of the multiple reliability determination means, the update processing means performs the weighted average calculation with the weighting factor being set to 0, the weighting factor being one for the average value of the work times subjected to the reliability determination by the any reliability determination means. Accordingly, the workers 77 can make declaration without an observer or a classifier. In addition, when a false or erroneous declaration is made by the workers 77, the system can find out this declaration by any of the multiple reliability determination means and update the standard work times after excluding the declared data of the work times having a low reliability. This prevents the update of the standard work times on the basis of the declaration data of the work time point having a low reliability. Hence, the reliability of the update data of the standard work times is improved.

The aforementioned method of calculating the standard work times (update data) by using the weighted average can be applied to the case of using the third determination means described in Embodiments 1 to 3 in addition to the first, second, fourth reliability determination means. Moreover, the aforementioned method of calculating the standard work times (update data) by using the weighted average can be applied to the case where reliability determination means other than the first to fourth reliability determination means is used.

Moreover, although the work time management server performs the standard work time calculation, the work area identification, the work content identification, and the reliability determination in Embodiments 1 to 4, the present invention is not limited to this. For example, these operations may be performed in a personal computer other than the work time management server or a PDA.

INDUSTRIAL APPLICABILITY

The present invention is related to a standard work time updating method and a standard work time updating system for updating standard work times of workers and can be applied to a computer-assisted work analyzing apparatus which is used in the field of industrial engineering to perform a work analysis and a movement analysis of objects, for example.

EXPLANATION OF THE REFERENCE NUMERALS

11 station
12A, 12B, 12C, 12D, 12E work area
13A, 13B, 13C, 13D, 13E receiver
14 transmitter
15 worker
16 PDA
17 display screen
18A start button
18B interruption button
18C completion button
20 work time management server
21 storage unit
22 standard work time calculation unit
23 work area identification unit
24 reliability determination unit
31 station
32A, 32B, 32C, 32D, 32E work area
33A, 33B, 33C, 33D, 33E RFID reader
34 transmitter
35 worker
36 PDA
37 display screen
38A start button
38B interruption button
38C completion button
39 RFID tag
40 work time management server
41 storage unit
42 standard work time calculation unit
43 work area identification unit
44 reliability determination unit
51 station
52A, 52B, 52C, 52D, 52E work area
53A, 53B, 53C, 53D, 53E photoelectric sensor
54 transmitter
55 worker
56 PDA
57 display screen
58A start button
58B interruption button 58C completion button
60 work time management server
61 storage unit
62 standard work time calculation unit
63 work area identification unit
64 reliability determination unit
71 station
72A, 72B, 72C, 72D, 72E work area
73A, 73B, 73C, 73D, 73E work tool table
74 transmitter
75A, 75B, 75C, 75D, 75E work tool
76A, 76B, 76C, 76D, 76E photoelectric sensor
77 worker
78 PDA
79 display screen
80A start button
80B interruption button
80C completion button
90 work time management server
91 storage unit
92 standard work time calculation unit
93 work area identification unit
94 reliability determination unit
100 power source
101A, 101B, 101C, 101D, 101E electric power meter
102A, 102B, 102C, 102D, 102E camera
103A, 103B, 103C, 103D, 103E RFID tag
104A, 104B, 104C, 104D, 104E RFID reader
105A, 105B, 105C, 105D, 105E piezoelectric sensor

The invention claimed is:

1. A standard work time updating method in which workers declare work time points of a work content performed by the workers in work areas in a station by using personal digital assistants, each of the personal digital assistants including a transmitter that transmits a radio wave for declaring at least one of the work time points, and a standard work time of the work content is updated based on work times obtained from the work time points of the work content which are declared by the workers, the standard work time updating method comprising:

causing a work time management server, which includes receivers provided in multiple locations in the work areas to receive the radio waves from the personal digital assistants, to determine whether the work times obtained from the work time points of the work content which are declared by the workers each deviate from a predetermined range of ±3σ, σ being a standard deviation, in a distribution of work time data of the work content which is stored in a database;

when determining that none of the work times deviate from the predetermined range, causing the work time management server to update the standard work time of the work content to the standard work time calculated based on the work times obtained from the work time points of the work content which are declared by the workers;

when determining that any of the work times deviates from the predetermined range, causing the work time management server to create first update data by not updating the standard work time of the work content;

causing a work area identification unit to identify in which one of the work areas each of the workers is located, based on radio wave reception information, work area information, or worker detection information, the radio wave reception information being information obtained by receiving the radio waves transmitted from the personal digital assistants with the receivers, the work area information being information obtained by reading records in RFID tags provided in the personal digital assistants with RFID readers provided in the work areas, and the worker detection information being information obtained by detecting the workers entering the work areas with photoelectric sensors installed at entrances of the work areas;

causing the work time management server to determine whether identified work areas identified by the work area identification unit coincide with declared work areas declared by the workers by use of the personal digital assistants;

when determining that the identified work areas coincide with the declared work areas, causing the work time management server to update the standard work time of the work content to the standard work time calculated based on the work times obtained from the work time points of the work content which are declared by the workers; and when determining that any of the identified work areas does not coincide with a corresponding one of the declared work areas, not causing the work time management server to update the standard work time of the work content, or causing the work time management server to create second update data by updating the standard work time of the work content to the standard work time calculated based on the work times obtained from the work time points of the work content which are declared by the workers, exclusive of the work time for which the identified work area does not coincide with the declared work area, and updating the standard work time of the work content to an average value, a median value, or a smallest value of the first update data and the second update data, wherein the standard work time is a time taken to perform assembly work of a product, which is updated depending on a skill level of each of the workers performing the work.

2. A standard work time updating method in which workers declare work time points of a work content performed by the workers in work areas in a station by using personal digital assistants, each of the personal digital assistants including a transmitter that transmits a radio wave for declaring at least one of the work time points, and a standard work time of the work content is updated based on work times obtained from the work time points of the work content which are declared by the workers, the standard work time updating method comprising:

causing a work time management server, which includes receivers provided in multiple locations in the work areas to receive the radio waves from the personal digital assistants, to determine whether the work times obtained from the work time points of the work content which are declared by the workers each deviate from a predetermined range of ±3σ, σ being a standard deviation, in a distribution of work time data of the work content which is stored in a database;

when determining that none of the work times deviate from the predetermined range, causing the work time management server to update the standard work time of the work content to the standard work time calculated based on the work times obtained from the work time points of the work content which are declared by the workers;

when determining that any of the work times deviates from the predetermined range, causing the work time management server to create first update data by updating the standard work time of the work content to the standard work time calculated based on the work times obtained from the work time points of the work content which are declared by the workers, exclusive of the work time determined to deviate from the predetermined range;

causing a work area identification unit to identify in which one of the work areas each of the workers is located, based on radio wave reception information, work area information, or worker detection information, the radio wave reception information being information obtained by receiving the radio waves transmitted from the personal digital assistants with the receivers, the work area information being information obtained by reading records in RFID tags provided in the personal digital assistants with RFID readers provided in the work areas, and the worker detection information being information obtained by detecting the workers entering the work areas with photoelectric sensors installed at entrances of the work areas;

causing the work time management server to determine whether identified work areas identified by the work area identification unit coincide with declared work areas declared by the workers by use of the personal digital assistants;

when determining that the identified work areas coincide with the declared work areas, causing the work time management server to update the standard work time of the work content to the standard work time calculated based on the work times obtained from the work time points of the work content which are declared by the workers; and when determining that any of the identified work areas does not coincide with a corresponding one of the declared work areas, not causing the work time management server to update the standard work time of the work content, or causing the work time management server to create second update data by updating the standard work time of the work content to the standard work time calculated based on the work times obtained from the work time points of the work content which are declared by the workers, exclusive of the work time for which the identified work area does not coincide with the declared work area, and updating the standard work time of the work content to an average value, a median value, or a smallest value of the first update data and the second update data, wherein the standard work time is a time taken to perform assembly work of a product, which is updated depending on a skill level of each of the workers performing the work.

3. A standard work time updating method in which workers declare work time points of a work content performed by the workers in work areas in a station by using personal digital assistants, each of the personal digital assistants including a transmitter that transmits a radio wave for declaring at least one of the work time points, and a standard work time of the work content is updated based on work times obtained from the work time points of the work content which are declared by the workers, the standard work time updating method comprising:

causing a work time management server, which includes receivers provided in multiple locations in the work areas to receive the radio waves from the personal digital assistants, to determine whether the work times obtained from the work time points of the work content which are declared by the workers each exceed a predetermined value of +3σ, σ being a standard deviation, in a distribution of work time data of the work content which is stored in a database;

when determining that none of the work times exceed the predetermined value, causing the work time management server to update the standard work time of the work content to the standard work time calculated based on the work times obtained from the work time points of the work content which are declared by the workers;

when determining that any of the work times exceeds the predetermined value, causing the work time management server to create first update data by not updating the standard work time of the work content;

causing a work area identification unit to identify in which one of the work areas each of the workers is located, based on radio wave reception information, work area information, or worker detection information, the radio wave reception information being information obtained by receiving the radio waves transmitted from the personal digital assistants with the receivers, the work area information being information obtained by reading records in RFID tags provided in the personal digital assistants with RFID readers provided in the work areas, and the worker detection information being information obtained by detecting the workers entering the work areas with photoelectric sensors installed at entrances of the work areas;

causing the work time management server to determine whether identified work areas identified by the work area identification unit coincide with declared work areas declared by the workers by use of the personal digital assistants;

when determining that the identified work areas coincide with the declared work areas, causing the work time management server to update the standard work time of the work content to the standard work time calculated based on the work times obtained from the work time points of the work content which are declared by the workers; and when determining that any of the identified work areas does not coincide with a corresponding one of the declared work areas, not causing the work time management server to update the standard work time of the work content, or causing the work time management server to create second update data by updating the standard work time of the work content to the standard work time calculated based on the work times obtained from the work time points of the work content which are declared by the workers, exclusive of the work time for which the identified work area does not coincide with the declared work area, and updating the standard work time of the work content to an average value, a median value, or a smallest value of the first update data and the second update data, wherein the standard work time is a time taken to perform assembly work of a product, which is updated depending on a skill level of each of the workers performing the work.

4. A standard work time updating method in which workers declare work time points of a work content performed by the workers in work areas in a station by using personal digital assistants, each of the personal digital assistants including a transmitter that transmits a radio wave for declaring at least one of the work time points, and a standard work time of the work content is updated based on work times obtained from the work time points of the work content which are declared by the workers, the standard work time updating method comprising:

causing a work time management server, which includes receivers provided in multiple locations in the work areas to receive the radio waves from the personal digital assistants, to determine whether the work times obtained from the work time points of the work content which are declared by the workers each exceed a predetermined value of +3σ, σ being a standard deviation, in a distribution of work time data of the work content which is stored in a database;

when determining that none of the work times exceed the predetermined value, causing the work time management server to update the standard work time of the work content to the standard work time calculated based on the work times obtained from the work time points of the work content which are declared by the workers;

when determining that any of the work times exceeds the predetermined value, causing the work time management server to create first update data by updating the standard work time of the work content to the standard work time calculated based on the work times obtained from the work time points of the work content which are declared by the workers, exclusive of the work time determined to exceed the predetermined value;

causing a work area identification unit to identify in which one of the work areas each of the workers is located, based on radio wave reception information, work area information, or worker detection information, the radio wave reception information being information obtained by receiving the radio waves transmitted from the personal digital assistants with the receivers, the work area information being information obtained by reading records in RFID tags provided in the personal digital assistants with RFID readers provided in the work areas, and the worker detection information being information obtained by detecting the workers entering the work areas with photoelectric sensors installed at entrances of the work areas;

causing the work time management server to determine whether identified work areas identified by the work area identification unit coincide with declared work areas declared by the workers by use of the personal digital assistants;

when determining that the identified work areas coincide with the declared work areas, causing the work time management server to update the standard work time of the work content to the standard work time calculated based on the work times obtained from the work time points of the work content which are declared by the workers; and when determining that any of the identified work areas does not coincide with a corresponding one of the declared work areas, not causing the work time management server to update the standard work time of the work content, or causing the work time management server to create second update data by updating the standard work time of the work content to the standard work time calculated based on the work times obtained from the work time points of the work content which are declared by the workers, exclusive of the work time for which the identified work area does not coincide with the declared work area, and updating the standard work time of the work content to an average value, a median value, or a smallest value of the first update data and the second update data, wherein the standard work time is a time taken to perform assembly work of a product, which is updated depending on a skill level of each of the workers performing the work.

5. A standard work time updating system in which workers declare work time points of a work content performed by the workers in work areas in a station by using personal digital assistants, each of the personal digital assistants including a transmitter that transmits a radio wave for declaring at least one of the work time points, and a standard work time of the work content is updated based on work times obtained from the work time points of the work content which are declared by the workers, the standard work time updating system comprising:

a work time management server, which includes receivers provided in multiple locations in the work areas to receive the radio waves from the personal digital assistants, that determines whether the work times obtained from the work time points of the work content which are declared by the workers each deviate from a predetermined range of ±3σ, σ being a standard deviation, in a distribution of work time data of the work content which is stored in a database; and a work area identification unit to identify in which one of the work areas each of the workers is located, based on radio wave reception information, work area information, or worker detection information, the radio wave reception information being information obtained by receiving the radio waves transmitted from the personal digital assistants with the receivers, the work area information being information obtained by reading records in RFID tags provided in the personal digital assistants with RFID readers provided in the work areas, and the worker detection information being information obtained by detecting the workers entering the work areas with photoelectric sensors installed at entrances of the work areas, wherein when determining that none of the work times deviate from the predetermined range, the work time management server updates the standard work time of the work content to the standard work time calculated based on the work times obtained from the work time points of the work content which are declared by the workers, when determining that any of the work times deviates from the predetermined range, the work time management server creates first update data by not updating the standard work time of the work content, the standard work time is a time taken to perform assembly work of a product, which is updated depending on a skill level of each of the workers performing the work, the work time management server determines whether identified work areas identified by the work area identification unit coincide with declared work areas declared by the workers by use of the personal digital assistants, when determining that the identified work areas coincide with the declared work areas, the work time management server updates the standard work time of the work content to the standard work time calculated based on the work times obtained from the work time points of the work content which are declared by the workers, and when determining that any of the identified work areas does not coincide with a corresponding one of the declared work areas, the work time management server does not update the standard work time of the work content, or the work time management server creates second update data by updating the standard work time of the work content to the standard work time calculated based on the work times obtained from the work time points of the work content which are declared by the workers, exclusive of the work time for which the identified work area does not coincide with the declared work area, and updates the standard work time of the work content to an average value, a median value, or a smallest value of the first update data and the second update data.

6. A standard work time updating system in which workers declare work time points of a work content performed by the workers in work areas in a station by using personal digital assistants, each of the personal digital assistants including a transmitter that transmits a radio wave for declaring at least one of the work time points, and a standard work time of the work content is updated based on work times obtained from the work time points of the work content which are declared by the workers, the standard work time updating system comprising:

a work time management server, which includes receivers provided in multiple locations in the work areas to receive the radio waves from the personal digital assistants, that determines whether the work times obtained from the work time points of the work content which are declared by the workers each deviate from a predetermined range of ±3σ, σ being a standard deviation, in a distribution of work time data of the work content which is stored in a database; and a work area identification unit to identify in which one of the work areas each of the workers is located, based on radio wave reception information, work area information, or worker detection information, the radio wave reception information being information obtained by receiving the radio waves transmitted from the personal digital assistants with the receivers, the work area information being information obtained by reading records in RFID tags provided in the personal digital assistants with RFID readers provided in the work areas, and the worker detection information being information obtained by detecting the workers entering the work areas with photoelectric sensors installed at entrances of the work areas, wherein when determining that none of the work times deviate from the predetermined range, the work time management server updates the standard work time of the work content to the standard work time calculated based on the work times obtained from the work time points of the work content which are declared by the workers, when determining that any of the work times deviates from the predetermined range, the work time management server creates first update data by updating the standard work time of the work content to the standard work time calculated based on the work times obtained from the work time points of the work content which are declared by the workers, exclusive of the work time determined to deviate from the predetermined range, the standard work time is a time taken to perform assembly work of a product, which is updated depending on a skill level the of each of the workers performing the work, the work time management server determines whether identified work areas identified by the work area identification unit coincide with declared work areas declared by the workers by use of the personal digital assistants, when determining that the identified work areas coincide with the declared work areas, the work time management server updates the standard work time of the work content to the standard work time calculated based on the work times obtained from the work time points of the work content which are declared by the workers, and when determining that any of the identified work areas does not coincide with a corresponding one of the declared work areas, the work time management server does not update the standard work time of the work content, or the work time management server creates second update data by updating the standard work time of the work content to the standard work time calculated based on the work times obtained from the work time points of the work content which are declared by the workers, exclusive of the work time for which the identified work area does not coincide with the declared work area, and updates the standard work time of the work content to an average value, a median value, or a smallest value of the first update data and the second update data.

7. A standard work time updating system in which workers declare work time points of a work content performed by the workers in work areas in a station by using personal digital assistants, each of the personal digital assistants including a transmitter that transmits a radio wave for declaring at least one of the work time points, and a standard work time of the work content is updated based on work times obtained from the work time points of the work content which are declared by the workers, the standard work time updating system comprising:

a work time management server, which includes receivers provided in multiple locations in the work areas to receive the radio waves from the personal digital assistants, that determines whether the work times obtained from the work time points of the work content which are declared by the workers each exceed a predetermined value of +3σ, σ being a standard deviation, in a distribution of work time data of the work content which is stored in a database; and a work area identification unit to identify in which one of the work areas each of the workers is located, based on radio wave reception information, work area information, or worker detection information, the radio wave reception information being information obtained by receiving the radio waves transmitted from the personal digital assistants with the receivers, the work area information being information obtained by reading records in RFID tags provided in the personal digital assistants with RFID readers provided in the work areas, and the worker detection information being information obtained by detecting the workers entering the work areas with photoelectric sensors installed at entrances of the work areas, wherein when determining that none of the work times exceed the predetermined value, the work time management server updates the standard work time of the work content to the standard work time calculated based on the work times obtained from the work time points of the work content which are declared by the workers, when determining that any of the work times exceeds the predetermined value, the work time management server creates first update information by not updating the standard work time of the work content, the standard work time is a time taken to perform assembly work of a product, which is updated depending on a skill level of each of the workers performing the work, the work time management server determines whether identified work areas identified by the work area identification unit coincide with declared work areas declared by the workers by use of the personal digital assistants, when determining that the identified work areas coincide with the declared work areas, the work time management server updates the standard work time of the work content to the standard work time calculated based on the work times obtained from the work time points of the work content which are declared by the workers, and when determining that any of the identified work areas does not coincide with a corresponding one of the declared work areas, the work time management server does not update the standard work time of the work content, or the work time management server creates second update data by updating the standard work time of the work content to the standard work time calculated based on the work times obtained from the work time points of the work content which are declared by the workers, exclusive of the work time for which the identified work area does not coincide with the declared work area, and updates the standard work time of the work content to an average value, a median value, or a smallest value of the first update data and the second update data.

8. A standard work time updating system in which workers declare work time points of a work content performed by the workers in work areas in a station by using personal digital assistants, each of the personal digital assistants including a transmitter that transmits a radio wave for declaring at least one of the work time points, and a standard work time of the work content is updated based on work times obtained from the work time points of the work content which are declared by the workers, the standard work time updating system comprising:

a work time management server, which includes receivers provided in multiple locations in the work areas to receive the radio waves from the personal digital assistants, that determines whether the work times obtained from the work time points of the work content which are declared by the workers each exceed a predetermined value of +3σ, σ being a standard deviation, in a distribution of work time data of the work content which is stored in a database; and a work area identification unit to identify in which one of the work areas each of the workers is located, based on radio wave reception information, work area information, or worker detection information, the radio wave reception information being information obtained by receiving the radio waves transmitted from the personal digital assistants with the receivers, the work area information being information obtained by reading records in RFID tags provided in the personal digital assistants with RFID readers provided in the work areas, and the worker detection information being information obtained by detecting the workers entering the work areas with photoelectric sensors installed at entrances of the work areas, wherein when determining that none of the work times exceed the predetermined value, the work time management server updates the standard work time of the work content to the standard work time calculated based on the work times obtained from the work time points of the work content which are declared by the workers, when determining that any of the work times exceeds the predetermined value, the work time management server creates first update data by updating the standard work time of the work content to the standard work time calculated based on the work times obtained from the work time points of the work content which are declared by the workers, exclusive of the work time determined to be exceeding the predetermined value, the standard work time is a time taken to perform assembly work of a product, which is updated depending on a skill level of each of the workers performing the work, the work time management server determines whether identified work areas identified by the work area identification unit coincide with declared work areas declared by the workers by use of the personal digital assistants, when determining that the identified work areas coincide with the declared work areas, the work time management server updates the standard work time of the work content to the standard work time calculated based on the work times obtained from the work time points of the work content which are declared by the workers, and when determining that any of the identified work areas does not coincide with a corresponding one of the declared work areas, the work time management server does not update the standard work time of the work content, or the work time management server creates second update data by updating the standard work time of the work content to the standard work time calculated based on the work times obtained from the work time points of the work content which are declared by the workers, exclusive of the work time for which the identified work area does not coincide with the declared work area, and updates the standard work time of the work content to an average value, a median value, or a smallest value of the first update data and the second update data.

* * * * *